US005364689A

United States Patent [19]

Kashiwagi et al.

[11] Patent Number: 5,364,689

[45] Date of Patent: Nov. 15, 1994

[54] PAINTING WITH MAGNETICALLY FORMED PATTERN AND PAINTED PRODUCT WITH MAGNETICALLY FORMED PATTERN

[75] Inventors: Takeshi Kashiwagi; Tutsuya Tamura; Mitsuaki Narita, all of Yokohama, Japan

[73] Assignee: Hashimoto Forming Industry Co., Ltd., Yokohama, Japan

[21] Appl. No.: 964,141

[22] Filed: Oct. 21, 1992

[30] Foreign Application Priority Data

| | | | |
|---|---|---|---|
| Feb. 21, 1992 | [JP] | Japan | 4-035220 |
| Feb. 21, 1992 | [JP] | Japan | 4-035225 |
| Apr. 10, 1992 | [JP] | Japan | 4-090764 |
| May 13, 1992 | [JP] | Japan | 4-120667 |
| Jun. 11, 1992 | [JP] | Japan | 4-151968 |
| Jun. 11, 1992 | [JP] | Japan | 4-152049 |

[51] Int. Cl.[5] .......... B32B 9/00

[52] U.S. Cl. .......... 428/195; 428/40; 428/206; 428/208; 428/528; 428/354; 428/920; 427/128; 427/596; 359/296

[58] Field of Search .......... 428/195, 354, 900, 206, 428/208, 40, 328; 427/26; 350/302

[56] References Cited

U.S. PATENT DOCUMENTS

| | | | |
|---|---|---|---|
| 2,418,479 | 4/1947 | Pratt et al. | 117/64 |
| 3,512,876 | 5/1970 | Marks | 350/267 |
| 3,709,828 | 1/1973 | Marks | 252/300 |
| 3,791,864 | 2/1974 | Steingroever | 117/238 |
| 3,813,265 | 5/1974 | Marks | 117/211 |
| 3,845,499 | 10/1974 | Ballinger | 360/56 |
| 3,972,715 | 8/1976 | Okumura | 96/1 |
| 4,076,387 | 2/1978 | Haas et al. | 360/362 |
| 4,187,332 | 2/1980 | Fouche, Jr. | 427/47 |
| 4,911,947 | 3/1990 | Melcher et al. | 427/26 |
| 5,079,058 | 1/1992 | Tomiyama et al. | 428/40 |
| 5,104,210 | 4/1992 | Tokas | 369/296 |
| 5,192,611 | 3/1993 | Tomiyama et al. | 428/364 |

FOREIGN PATENT DOCUMENTS

| | | |
|---|---|---|
| 406667 | 1/1991 | European Pat. Off. . |
| 0406667 | 1/1991 | European Pat. Off. . |
| 2113650 | 6/1972 | France . |
| 406667 | of 0000 | Japan . |
| 51-137733 | 11/1976 | Japan . |
| 59-012942 | 10/1984 | Japan . |
| 63-175670 | 7/1988 | Japan . |
| 63-176670 | 7/1988 | Japan . |
| 63-176870 | 7/1988 | Japan . |
| 2-229875 | 9/1990 | Japan . |
| 3-62874 | 3/1991 | Japan . |
| 3-151083 | 6/1991 | Japan . |
| 4-244268 | 9/1992 | Japan . |
| 4-244269 | 9/1992 | Japan . |
| 5-15840 | 1/1993 | Japan . |
| 5-15841 | 1/1993 | Japan . |

*Primary Examiner*—Patrick J. Ryan
*Assistant Examiner*—Abraham Bahta
*Attorney, Agent, or Firm*—Foley & Lardner

[57] ABSTRACT

A method and an apparatus for producing a product having a magnetically formed pattern, capable of forming any desired pattern in diversely different shapes with a clear visual recognizability, at high speed, by a simple procedure, and a painted product produced by these method and apparatus. The product is produced by forming a paint layer from a paint medium mixed with magnetic non-spherical particles, and applying a magnetic field containing the lines of magnetic field in a shape corresponding to the desired pattern to be formed. The desired pattern becomes visible on the surface of the painted product as the light rays incident on the paint layer are reflected or absorbed differently by those magnetic non-spherical particles which are oriented to be substantially parallel to a surface of the paint layer and arranged in a shape corresponding to the desired pattern to be formed on the painted product form the contour of the desired pattern, and those magnetic non-spherical particles which are oriented to be substantially non-parallel to the surface of the paint layer.

58 Claims, 39 Drawing Sheets

FIG. 21A
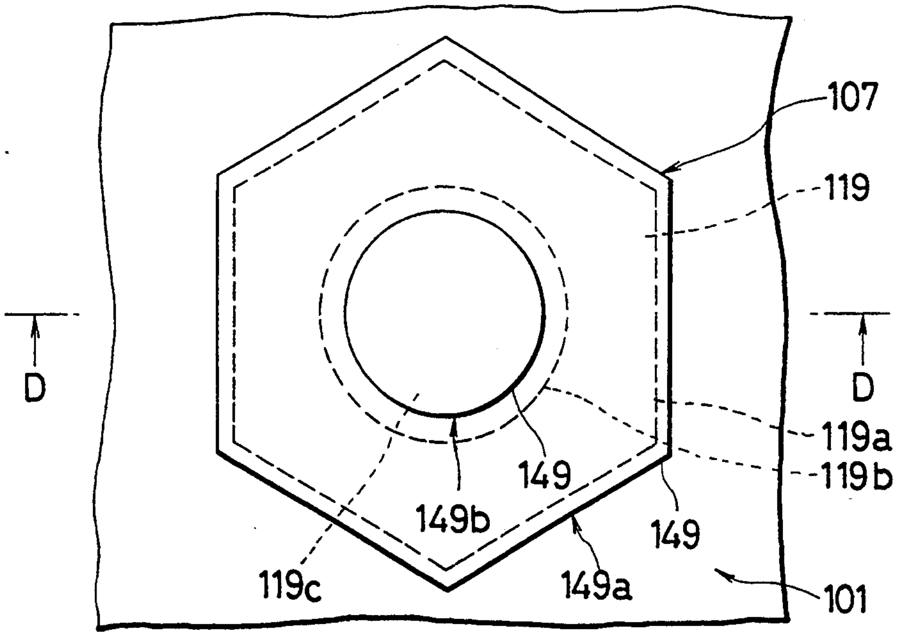
FIG. 21B
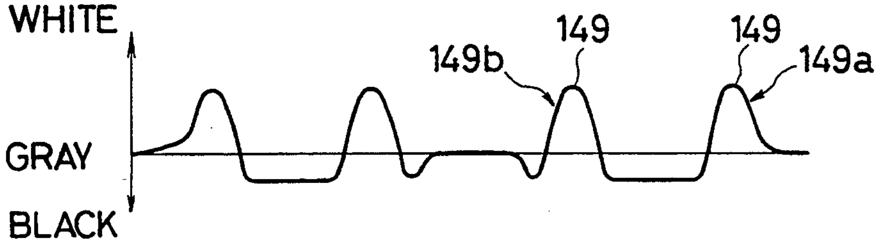
FIG. 21C
XX/−\|||/−\X X/−\|||/−\XX
FIG. 21D
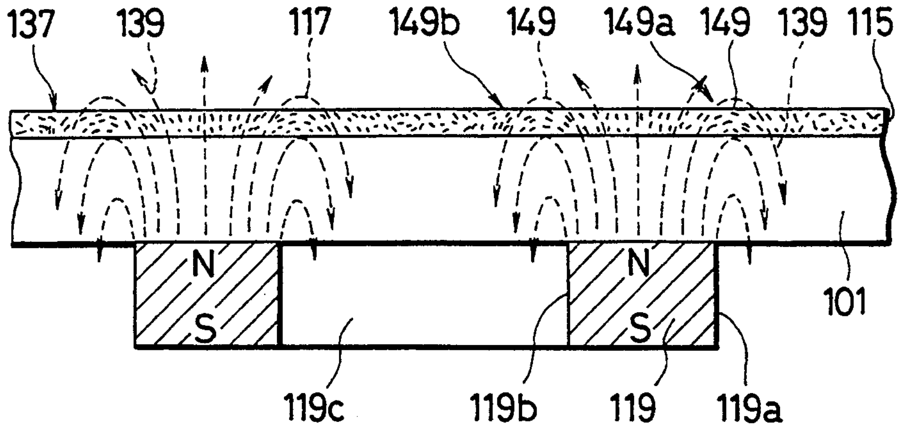

FIG. 44

| LOCATIONS | ORIENTATION $\theta$ OF MAGNETIC FLAKES | LINES OF MAGNETIC FORCE AT PAINT LAYER | EFFECT ON INCIDENT LIGHTS | COLOR & CONVEXITY/CONCAVITY |
|---|---|---|---|---|
| L0 | AT RANDOM | TOO WEAK TO INFLUENCE MAGNETIC FLAKES | SCATTERED REFECTION | GRAY; NO CONVEXITY/CONCAVITY |
| L1 | MOSTLY AT RANDOM SOME GENTLY OBLIQUE TOWARD LEFT | SMALL INFLUENCE ON MAGNETIC FLAKES | MOSTLY SCATTERED REFLECTION | GRAY (SLIGHTLY BLACKISH); LITTLE CONVEXITY/CONCAVITY |
| L2 | GENTLY OBLIQUE TOWARD LEFT | STRONG IN ↘ | SOME REFLECTION IN ↗ | BLACKISH GRAY; SOME CONCAVITY |
| L3, L4, L9 | SUBSTANTIALLY PARALLEL ($\theta = 0°$) | STRONG IN ⇄ | TOTAL REFLECTION | BRIGHT WHITE; VERY CONVEXD L4 MORE CONVEXD THAN L3 |
| L5, L10 | GENTLY OBLIQUE TOWARD RIGHT | STRONG IN ↗ | REFLECTION IN ↖ | PALE WHITE IN FRONTAL VIEW CONCAVED IN CONTRAST TO L3, L4, L9 |
| L6 | STEEPLY OBLIQUE TOWARD RIGHT | STRONG IN ↗ | SOME ABSORPTION | BLACK CONCAVED |
| L7 | MOSTLY SUBSTANTIALLY PERPENDICULAR ($\theta = 90°$) SOME STEEPLY OBLIQUE TOWARD LEFT & RIGHT | STRONG IN ↖↑↗ | LARGE ABSORPTION | DARK BLACK VERY CONCAVED |
| L8 | GENTLY OBLIQUE TOWARD LEFT | STRONG IN ↖ | MOSTLY TOTAL REFLECTION | WHITE (WITH TINGE OF GRAY) EDGE OF CONVEXD PORTION |

PAINTING WITH MAGNETICALLY FORMED PATTERN AND PAINTED PRODUCT WITH MAGNETICALLY FORMED PATTERN

BACKGROUND OF THE INVENTION

1. Field of the Invention

The present invention relates to a painting on a surface of a product such as a wheel cover in which a pattern is magnetically formed by using a paint medium containing magnetic bodies. The invention also relates to the painted product, a method of making the painted product, and an apparatus for painting the product.

2. Description of the Background Art

Conventionally, there has been used a metallic painting coated on a surface of a metallic or plastic product in which a metallic luster is obtained on the painted surface by using a transparent paint medium containing fine powders of aluminum or oxidized iron, where the metallic luster is produced by the reflection of the incident light rays in random directions by the fine powders contained within the paint medium.

On the other hand, conventionally, the pattern of desired shape has been formed on a metallic or plastic product by using a mask painting. In such a mask painting, the product manufactured in a desired form is covered by a masking having either a negative or a positive shape corresponding to the desired pattern to be formed and the spray painting is applied onto the masked product.

However, the pattern formed by such a conventional mask painting procedure has a very poor sense of perspective.

For this reason, in order to obtain the sufficient sense of perspective, it has been necessary conventionally to manufacture the product in a three dimensional shape.

However, when the product is formed in a three dimensional shape by using an injection molding, a flow mark or a weld line is easily formed on a surface of the molded product due to the flow of the molding material such as synthetic resin through the injection portion of the mould during the injection molding process, and the mechanical strength of the product is reduced at such a weld line while the outer appearance is damaged at such a flow mark.

In order to cope with this situation, there has been proposed in Japanese Patent Application Laid Open No. 63-175670 a method of forming a pattern by utilizing the magnetic field. In this method, a product to be painted made of a non-magnetic material such as plastic or a ferromagnetic material such as iron is painted with a paint medium containing fine powders of magnetic bodies in a fluid state first, and then a pattern is formed on the painted product by applying the magnetic field to the painted product while the paint medium is still in the fluid state in which the fine powders of the magnetic bodies contained within the paint medium can freely move within the paint medium.

In this method, the pattern is formed within the paint layer on the painted surface by the application of the magnetic field which changes the orientation of the fine powders of the magnetic bodies contained within the paint medium with respect to the painted surface and moves or concentrates the fine powders of the magnetic bodies along the magnetic field lines.

However, this method requires the thickness of the paint layer to be sufficiently greater than the size of the fine powders of the magnetic bodies because it is necessary to move and change the orientation of the magnetic bodies within the paint layer. In addition, it is also necessary in this method to maintain the fluid state of the paint medium until the move and the change of the orientation of the magnetic bodies are completed.

As a consequence, it is difficult for this method to be carried out at high speed because the drying of the paint medium must be slow, and in addition, it is difficult to apply this method to a surface inclined with respect to the horizontal plane.

Moreover, the pattern that can be formed by using this method is rather limited because it is difficult to manipulate the regularity of the orientation of the magnetic bodies locally. In particular, it has been difficult to form a magnet configuration capable of forming a desired pattern having a desired size, a desired contour line width, and a desired contrast with respect to the other portion. In addition, it has been very difficult to change the width of the contour line freely or continuously.

Furthermore, in this method, there is a possibility of leaving line shaped traces on the painted surface due to the magnetic bodies moved within the paint layer, which can damage the outer appearance of the painted product significantly.

SUMMARY OF THE INVENTION

It is therefore an object of the present invention to provide a method and an apparatus for painting to give magnetically formed pattern, wherein the method and apparatus is capable of forming the pattern at high speed by a simple procedure.

It is another object of the present invention to provide a method and an apparatus for painting to give a magnetically formed pattern, wherein the method and apparatus is capable of forming any desired pattern in diversely different shapes with a clear visual recognizability.

It is another object of the present invention to provide a method and an apparatus for painting to give a magnetically formed pattern, wherein the method and apparatus is suitable for mass production.

It is another object of the present invention to provide a product incorporating the magnetically formed pattern, wherein the pattern appears to have a three-dimensional appearance, due to the orientation of the magnetic paint and additives.

In accordance with the foregoing objectives, there has been provided, in accordance with one aspect of the present invention, a painted product with a desired pattern formed thereon, comprising: a product body; and a paint layer formed on a surface of the product body, the paint layer including: a paint medium capable of transmitting light rays incident on the paint layer; and a multiplicity of magnetic non-spherical particles mixed into the paint medium, wherein the magnetic non-spherical particles include first type magnetic non-spherical particles which are oriented to be substantially parallel to a surface of the paint layer and arranged in a shape corresponding to the desired pattern to be formed on the painted product, and second type magnetic non-spherical particles which are oriented to be substantially non-parallel to the surface of the paint layer and arranged with respect to the first type magnetic non-spherical particles, such that the desired pattern is visible on the surface of the product body as the light rays incident on the paint layer are influenced differently by the first and second type magnetic non-spherical particles.

According to another aspect of the present invention there is provided a method of painting a product with a desired pattern formed on the painted product, comprising the steps of: forming a paint layer in a liquid state on a surface of the product, wherein the paint layer comprises a paint medium capable of transmitting light rays incident on the paint layer; and multiplicity of magnetic non-spherical particles mixed into the paint medium; applying a magnetic field to the product, the magnetic field having a first region containing lines of magnetic force which are oriented to be substantially parallel to a surface of the painted product and arranged in a shape corresponding to the desired pattern to be formed on the painted product, and second region containing lines of magnetic field which are oriented to be substantially non-parallel to the surface of the painted product and arranged around the first region; and solidifying the paint layer in a state in which first type magnetic non-spherical particles located in the first region at the applying step are oriented to be substantially parallel to a surface of the paint layer and arranged in a shape corresponding to the desired pattern to be formed on the painted product, while second type magnetic non-spherical particles located in the second region at the applying step are oriented to be substantially not parallel to the surface of the paint layer and arranged with respect to the first type magnetic non-spherical particles, such that the desired pattern is visible on the surface of the painted product as the light rays incident on the paint layer are influenced differently by the first and second type magnetic non-spherical particles.

According to another aspect of the present invention there is provided an apparatus for painting a product with a desired pattern formed on the painted product, comprising: support means for supporting the product; painting means for forming a paint layer on a surface of the product, the paint layer including: a paint medium capable of transmitting light rays incident on the paint layer; and a multiplicity of magnetic non-spherical particles mixed into the paint medium; magnetic field production means for applying a magnetic field to the paint layer formed by the painting means on the surface of the product supported by the support means, the magnetic field having a first region containing lines of magnetic force which are oriented to be substantially parallel to a surface of the painted product and arranged in a shape corresponding to the desired pattern to be formed on the painted product, and second region containing lines of magnetic field which are oriented to be substantially non-parallel to the surface of the painted product and arranged with respect to the first region.

Other objects, features, and advantages of the present invention will become apparent from the following description taken in conjunction with the accompanying drawings.

BRIEF DESCRIPTION OF THE DRAWINGS

FIG. 21A is a top plan view of a desired nut shaped pattern to be formed on the wheel cover shown in FIGS. 18A and 18B, FIG. 21B is a diagram indicating the colors in which various parts of the desired nut shaped pattern shown in FIG. 21A appear, FIG. 21C is a diagram indicating typical orientations of magnetic flakes at various parts of the desired nut shaped pattern shown in FIG. 21A, and FIG. 21D is a cross sectional view along D—D line indicated in FIG. 21A.

FIG. 44 is a table summarizing the result of the microscope observation of the cross section of the sample shown in FIG. 43A.

DETAILED DESCRIPTION OF THE PREFERRED EMBODIMENTS

First, with reference to FIG. 1, a basic principle of the present invention will be described in detail.

Figure 1:
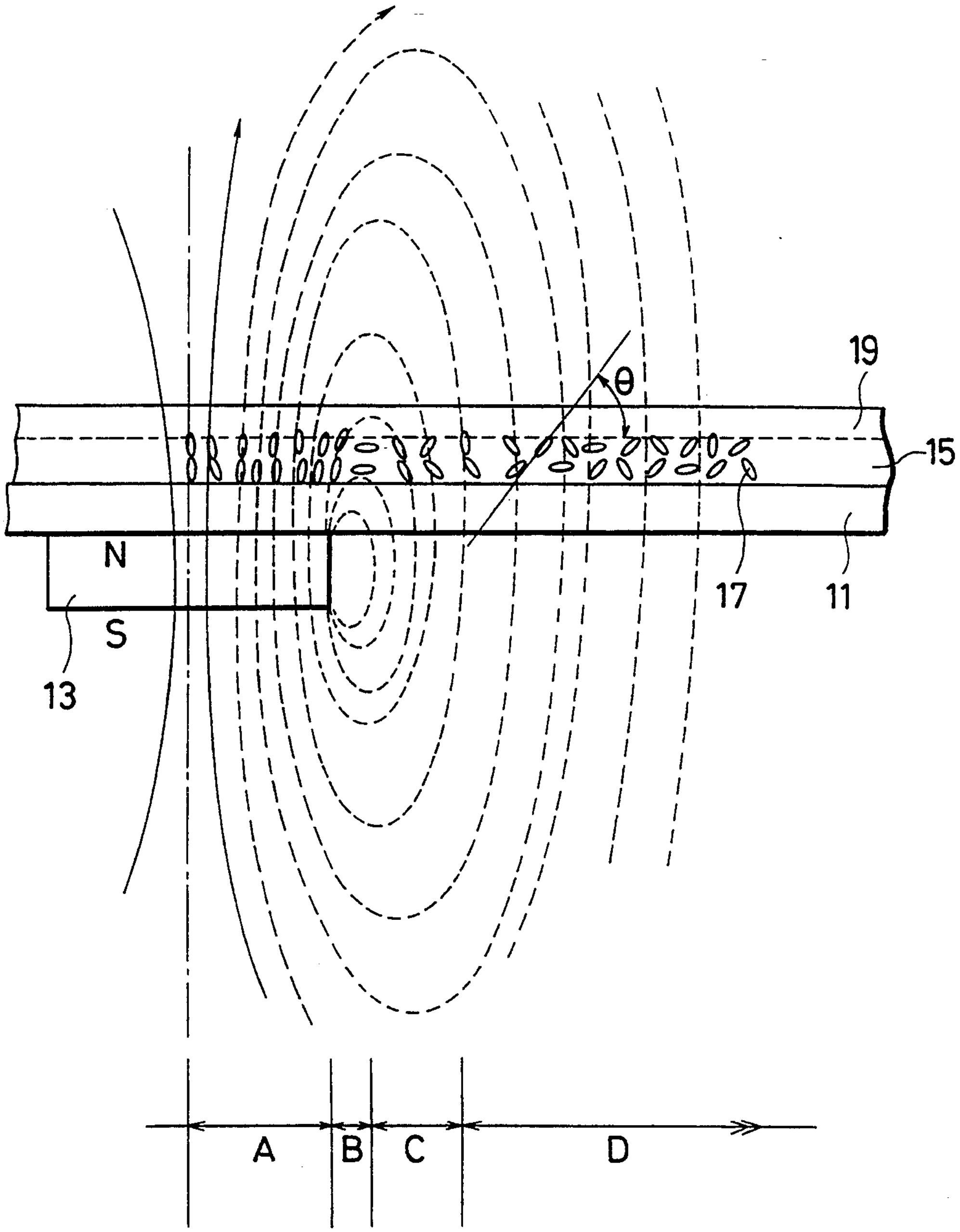
FIG. 1 is a diagram for explaining the basic principle of the product with magnetically formed pattern according to the present invention.

In FIG. 1, there is provided a product 11 to be painted, which is made of a non-magnetic material such as plastic. On a lower side of the product 11, there is provided a magnet 13 such as a permanent magnet which is manufactured in advance in such a shape that the magnetic field corresponding to the desired pattern to be formed on the product 11 is produced on the product 11.

In FIG. 1, the magnet 13 has an N pole on an upper side directly below the product 11 and an S pole on a lower side, and the magnetic field lines due to this magnet 13 are depicted by dashed lines. As shown in FIG. 1, in a region A directly above the magnet 13, the magnetic field lines are directed to be substantially perpendicular to the surface of a paint layer 15 to be formed on the surface of the product 11, while in a region B adjacent to the region A, the magnetic field lines changes their directions abruptly, such that they are directed to be substantially parallel to the surface of the paint layer 15 to be formed on the surface of the product 11 in a middle of the region B. Then, in a region C adjacent to the region B, the magnetic field lines are directed to be uniformly oblique to the surface of the paint layer 15 to be formed on the surface of the product 11. In the region D adjacent to the region C which is sufficiently distance from the magnet 13, the magnetic field strength becomes significantly weaker as the magnetic field strength H changes in inverse proportion to a distance from the magnet 13, according to $H=m/4\pi\mu\cdot R/r^3$ where m is a magnetic moment, $\mu$ is a magnetic permeability, r is a distance from the magnet 13, and capital letters denote the vector quantities.

Then, on an upper side of the product 11 with such a magnetic field as shown in FIG. 1 formed by the magnet 13, the paint layer 15 is formed by the spray painting of a paint mixture prepared in advance which comprises a paint medium, which is preferably transparent, in fluid state in which a multiplicity of tiny non-spherical particles of magnetic bodies 17 (referred hereafter as magnetic flakes), which are preferably made of iron, nickel, cobalt, or their alloys, although any magnetic non-spherical particles can be used, are mixed uniformly by using a volatile solvent. Here, the paint layer 15 may be semi-transparent or colored in white, yellow, or any other desired pale color in order to provide the background in the desired pale color on the surface of the painted product.

Here, each of the magnetic flakes 17 in the paint layer 15 are oriented along its orientation angle $\theta$ determined according to the magnetic field due to the magnet 13, and then maintained and eventually fixed in that orientation angle $\theta$ by the surrounding transparent paint medium. The density of the magnetic flakes 17 in the paint layer 15 depends on the spray speed used in the spray painting of the painting mixture, as well as the magnetic flux density of the magnetic field produced by the magnet 13.

Thus, as shown in FIG. 1, the magnetic flakes 17 in the region A are oriented to be substantially perpendicular to the paint layer 15 formed on the surface of the product 11, while the magnetic flakes 17 in a middle of the region B are oriented to be substantially parallel to the surface of the paint layer 15 formed on the surface of the product 11. Also, the magnetic flakes 17 in the region C are oriented to be uniformly oblique to the surface of the paint layer 15 formed on the surface of the product 11, while the magnetic flakes 17 in the region D are oriented at random as the magnetic field strength becomes significantly weaker in the region D.

Finally, on top of this paint layer 15, a top coat layer 19 is formed by the spray painting of another transparent paint medium which does not contain any tiny flakes of the magnetic bodies 17. Here, the top coat layer 19 may be colored in any desired color in order to provide the background in the desired color on the surface of the painted product.

In further detail, the orientation of the magnetic flakes in the regions A to D appear as shown in FIGS. 2A to 2D, respectively. FIGS. 2A to 2D show a case in which the paint layer 15 are painted in three layers produced by moving the spray gun three times over the surface of the product 11. In general, by reducing an amount of the paint mixture to be sprayed from the spray gun in each spraying and repeating such a spraying for a number of times, the magnetic flakes 17 can be oriented more regularly as the transparent paint medium accompanying with the magnetic flakes 17 can be limited. Also, FIGS. 2A to 2D show a case in which the surface of the product 11 is colored in gray and the magnetic flakes 17 are made from nickel which are usually colored in silver white.

Figure 2A:
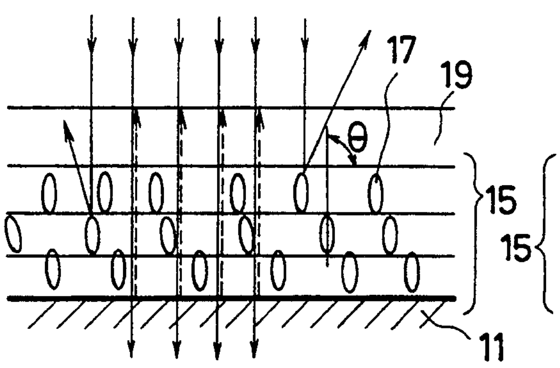
FIGS. 2A, 2B, 2C, and 2D are enlarged views of magnetic flakes in various orientations in the paint layer shown in FIG. 1, for explaining the resulting appearances.

In the region A, the magnetic flakes 17 are oriented to be substantially perpendicular to the surface of the paint layer 15 formed on the surface of the product 11 as shown in FIG. 2A, so that most of the light rays incident from the upper side of the product 11 are either passed through the paint layer 15 or absorbed in the product 11, so that there is very little reflection from the surface of the product 11 in this region A and consequently this region A appears to be colored darker than gray when viewed from the upper side of the product 11.

Figure 2B:
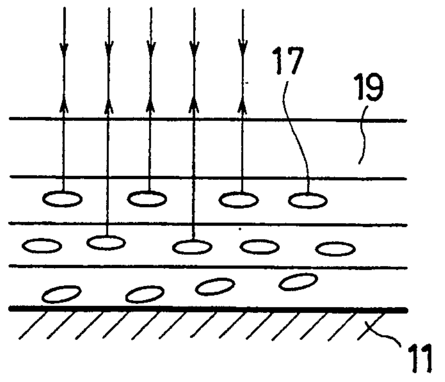

In the middle of the region B, the magnetic flakes 17 are oriented to be substantially parallel to the surface of the paint layer 15 formed on the surface of the product 11 as shown in FIG. 2B, so that most of the light rays incident from the upper side of the product 11 are reflected by the magnetic flakes 17, and consequently this region B appears to be colored lighter than gray when viewed from the upper side of the product 11. Here, this region B appears almost in white as the magnetic flakes 17 made of nickel are colored in silver white. However, this region B can be made to appear in gold by coating each of the magnetic flakes 17 by a coating material colored in gold in advance.

Figure 2C:
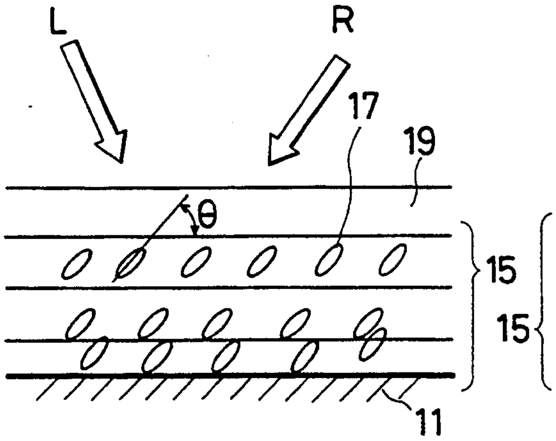

In the region C, the magnetic flakes 17 are oriented to be uniformly oblique to the surface of the paint layer 15 formed on the surface of the product 11 as shown in FIG. 2C, so that the light rays incident from a left upper side L of the product 11 are reflected by the magnetic flakes 17 while the light rays incident from a right upper side of the product 11 are passed through or absorbed by the product 11. Consequently, this region C appears to be colored lighter than gray when viewed from the left upper side L of the product 11 whereas this region C appears to be colored darker than gray when viewed from the right upper side R of the product 11.

Figure 2D:
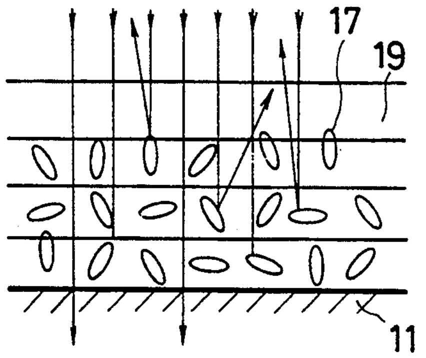

In the region D, the magnetic flakes 17 are oriented at random as shown in FIG. 2D, so that light rays incident from the upper side of the product 11 are scattered in random directions, and consequently this region D appears to be colored in gray.

Now, the following points should be noted in the present invention as described above, which are valid for all the examples to be described below.

First, it is preferable for the product which is to be painted to be made from a non-magnetic material such as plastic or aluminum, but it is also possible for the product to be painted to be made from a magnetic material, such as a ferromagnetic material, e.g., iron or an alloy containing iron.

Also, the shape of the product to be painted is basically unlimited, except that the thickness of the portion to be painted should be thin enough for the magnetic field produced by the magnet placed on the back side of the product to control the orientation of the magnetic flakes contained within the paint layer formed on the front side of the product. However, if the product is thicker, as explained hereinafter, then the magnet can be placed on the front side of the product to control orientation. Accordingly, thicker products of any shape can also be used.

As for the magnetic non-spherical particles to be mixed in the paint mixture, it is preferable for each magnetic flake to have a flake-like thin plate shape. The shape of the flat plane in the flake-like thin plate shape of each magnetic flake is basically unlimited. Here, it is to be noted that even though the multiplicity of tiny magnetic bodies to be mixed in the paint medium are described as "magnetic flakes" in the description of the preferred embodiments, in general, the multiplicity of tiny magnetic bodies to be mixed in the paint mixture can take on any non-spherical particle shapes.

As the magnetic flakes used in the present invention, any known magnetic flakes, in any known size can be used. It is preferable to use magnetic flakes made of ferromagnetic material such as iron, nickel, cobalt, or their alloys, which can easily be magnetized by the externally applied magnetic field. However, it is also possible to use magnetic flakes made of diamagnetic material such as bismuth, antimony, copper, and zinc. Moreover, the magnetic flakes may be coated with various coatings, including with gold plating or silver plating, or colored by non-magnetic colored paint. Furthermore, the magnetic flakes can be non-magnetic flakes which have been coated with a magnetic coating. It is preferable for each magnetic flake to have a size of about 0.1 to about 1.0 μm in thickness, and about 10 to about 100 μm or more preferably about 15 to about 25 μm in length.

As for the paint medium to be used in the paint mixture, any medium capable of transmitting light can be used. It is preferable that the medium contain a resin or mixture of resins which can be dried or hardened by reaction at room temperature. It is also possible to use as the medium one which can be hardened by heating or ultraviolet radiation. For example, one or more of alkyd resins, polyester resins, acrylic resins, polyurethane resins, or vinyl resins can be used for the paint medium. The medium preferably contains a solvent for the resin. For the solvent, generally, either an organic solvent or water can be used. A volatile solvent can also be used in the medium. As for the volatile solvent, it is preferable to use a solvent which is both volatile as well as dilutable, such as a thinner. Here, in particular, faster drying of the medium can be achieved by increasing the amount of the solvent with low boiling point such as methyl ethyl ketone (MEK).

When the paint medium is one which can be hardened by heating, it is necessary to heat the painted product after the magnetic flakes are fixed within the paint layer, by the application of heat, for example, from a heated air blow or infrared radiation. When the paint medium is one which can be hardened by ultraviolet radiation, it is necessary to apply the UV radiation to the painted product by using ultraviolet radiation from, for example, a mercury lamp.

The magnetic flakes may be mixed in the paint medium in any desired amount depending upon the desired pattern to be formed. It is preferable for the paint mixture to have the mixture rate of about 1 to about 60 parts by weight of the magnetic flakes per 100 parts by weight of the vehicle, or more preferably the mixture rate of 30 to 40 parts by weight of the magnetic flakes per 100 parts by weight of the vehicle.

The term paint used throughout the specification refers to the coating containing the magnetic non-spherical particles. This "paint" may optionally contain other additives, for example, additives which give the desired color to the painted product.

The apparatus for carrying out the spray painting of the paint mixture can be realized by using conventionally available spray painting apparatus.

In addition, the painting of the paint mixture can be realized by painting methods other than spraying, such as dipping and flow coating.

It is also preferable to provide a transparent or semi-transparent top coat layer which does not contain any magnetic flakes, on top of the paint layer containing the magnetic flakes. The top coat layer may contain various additives, including colorants which provide the product with the desired color and appearance.

It is also to be noted that the paint layer of the present invention can be applied to diversely different types of products, such as glass products (including not only plate glasses but also those having curved surface such as tumblers), plastic products (such as front panels or casings for electric appliances and furniture), vinyl products (including not only the hard vinyl products but also soft vinyl products), wooden panel products, paper products (such as a cardboard boxes), products made by aluminum or aluminum alloy, as well as products made by magnetic material such as iron or steel (such as outer frames of automobiles and refrigerators).

It is further to be noted the basic principle of the present invention described above can be reversed in a sense that the magnetic flakes can be utilized for absorbing the light rays rather than reflecting the light rays as described above. Namely, by coating each of the magnetic flakes in the paint mixture with a surface coating having a dark color such as black or by using magnetic flakes which have a dark color such as black, the desired pattern can be formed as the magnetic flakes oriented to be substantially parallel to the surface of the paint layer absorb the light rays incident on the paint layer such that the desired pattern formed by these magnetic flakes appears as colored in black in contrast to the surrounding regions appearing as colored in gray. In such a case, it is further preferable to provide a reflective layer between the surface of the product body and the lower surface of the paint layer, such that the light rays transmitted through the paint layer can be reflected back, so as to increase the contrast between the pattern and the background.

Referring now to FIGS. 3 to 10, various exemplary configurations for the magnet to be used in the procedure described above will be described.

Figure 3:
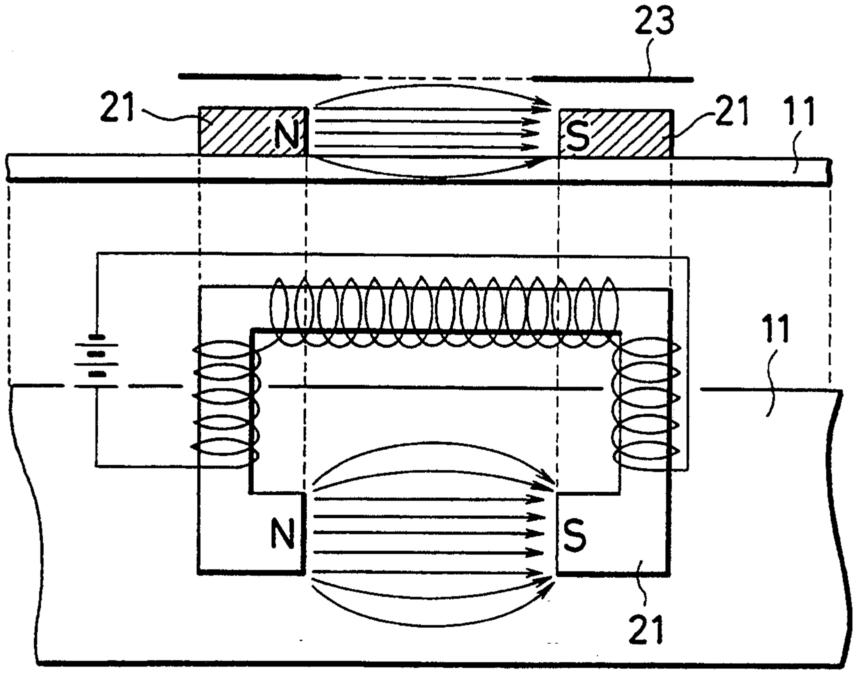
FIG. 3 is a schematic side and top plan views of one example of an arrangement of a magnet for forming the pattern according to the present invention.

The configuration shown in FIG. 3 is a configuration for forming the magnetic field lines which are substantially parallel to the surface of the paint layer 15 to be formed on the surface of the product 11, which is formed by an electromagnet 21 having a gap between its N and S poles located on the upper surface of the product 11. On top of this electromagnet 21, there is provided a mask 23 having a window in a shape corresponding to a desired pattern to be formed on the surface of the product 21. With this configuration of FIG. 3, the spray painting of the paint mixture as described above is applied from an upper side of the mask 23, such that the paint layer 15 with the magnetic flakes 17 oriented to be substantially parallel to the surface of the paint layer 15 is formed in the shape of the desired pattern to be formed on the surface of the product 11.

Figure 4:
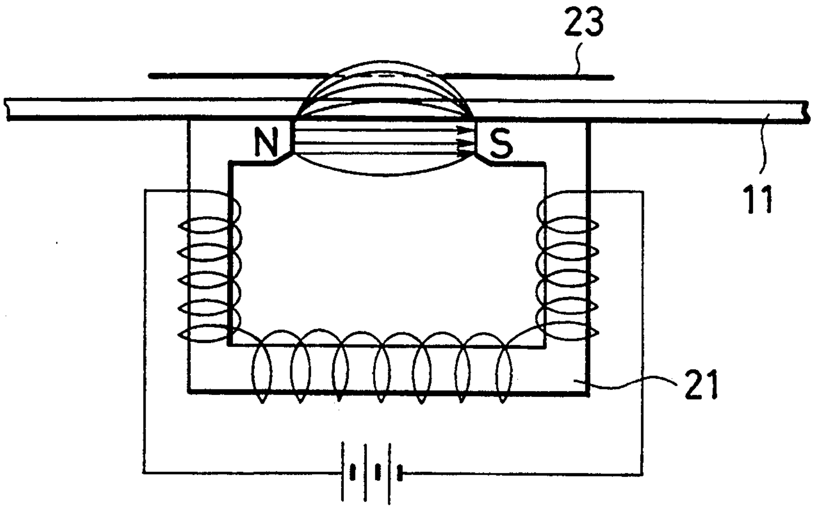
FIG. 4 is a schematic side view of another example of an arrangement of a magnet for forming the pattern according to the present invention.

The configuration of FIG. 4 is another configuration for forming the magnetic field lines which are substantially parallel to the surface of the paint layer 15 to be formed on the surface of the product 11, which is also formed by the electromagnet 21. In this configuration of FIG. 4, the electromagnet 21 is placed below the lower surface of the product 11, with the gap between its N and S poles located directly below the lower surface of the product 11. The mask 23 similar to that used in the configuration of FIG. 3 is also provided above the upper surface of the product 11 in this configuration of FIG. 4, so that the spray painting of the paint mixture as described above is applied from the upper side of the mask 23, just as in the case of FIG. 3.

Figure 5:
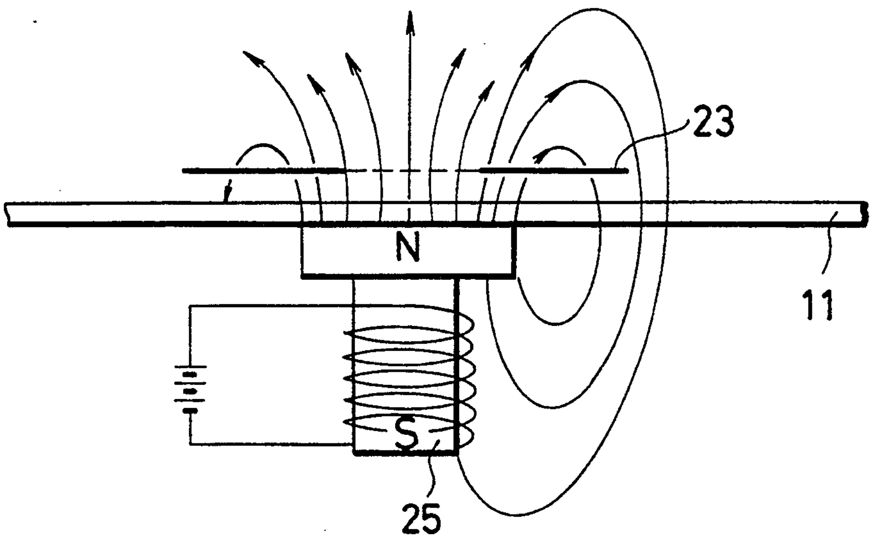
FIG. 5 is a schematic side view of another example of an arrangement of a magnet for forming the pattern according to the present invention.

The configuration of FIG. 5 is a configuration for forming the magnetic field lines which are substantially perpendicular to the surface of the paint layer 15 to be formed on the surface of the product 11. In this case of FIG. 5, an electromagnet 25 having its N and S poles on its opposite ends is placed below the lower surface of the product 11 with the N pole located directly below the lower surface of the product 11. The mask 23 similar to that used in the configuration of FIG. 8 is also provided above the upper surface of the product 21 in this configuration of FIG. 5, so that the spray painting of the paint mixture as described above is applied from the upper side of the mask 23, just as in the case of FIG. 3.

Figure 6:
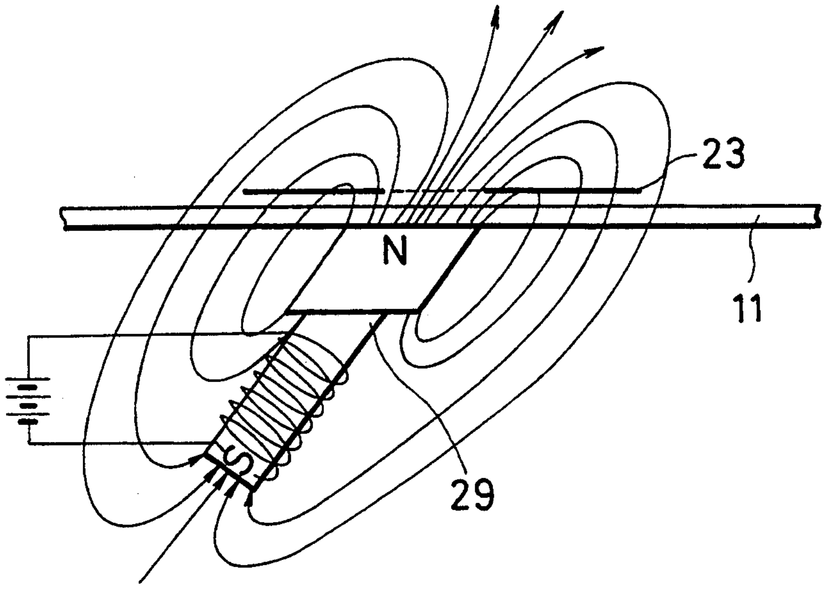
FIG. 6 is a schematic side view of another example of an arrangement of a magnet for forming the pattern according to the present invention.

The configuration of FIG. 6 is a configuration for forming the magnetic field lines which are oblique to the surface of the paint layer 15 to be formed on the surface of the product 11. In this case of FIG. 6. an electromagnet 29 having its N and S poles on its opposite ends with the end of the N pole formed in an oblique surface is placed below the lower surface of the product 11 with the N pole located directly below the lower surface of the product 11. The mask 23 similar to that used in the configuration of FIG. 3 is also provided above the upper surface of the product 11 in this configuration of FIG. 6, so that the spray painting of the paint mixture as described above is applied from the upper side of the mask 23, just as in the case of FIG. 3.

Figure 7:
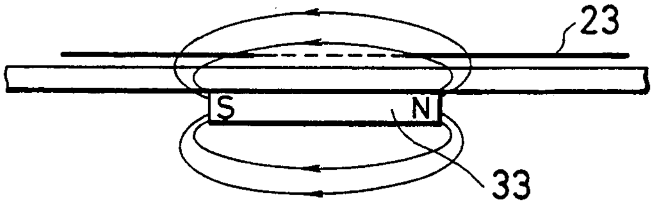
FIG. 7 is a schematic side view of another example of an arrangement of a magnet for forming the pattern according to the present invention.

The configuration of FIG. 7 is a configuration for forming the magnetic field lines which are substantially parallel to the surface of the paint layer 15 to be formed on the surface of the product 11 by using a permanent magnet. In this case of FIG. 7, a plate shaped permanent magnet 33 having its N and S poles on its opposite ends is placed directly below the lower surface of the product 11. The mask 23 similar to that used in the configuration of FIG. 3 is also provided above the upper surface of the product 11 in this configuration of FIG. 7, so that the spray painting of the paint mixture as described above is applied from the upper side of the mask 23, just as in the case of FIG. 3.

Figure 8:
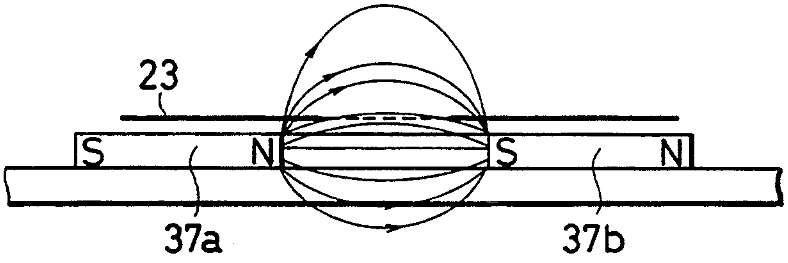
FIG. 8 is a schematic side view of another example of an arrangement of a magnet for forming the pattern according to the present invention.

The configuration of FIG. 8 is another configuration for forming the magnetic field lines which are substantially parallel to the surface of the paint layer 15 to be formed on the surface of the product 11 by using a permanent magnet. In this case of FIG. 8, two plate shaped permanent magnets **37*a* and 37*b* each of which having its N and S poles on its opposite ends are placed directly above the upper surface of the product 11 with the N pole of one magnet 37*a* facing against the S pole of another magnet 37*b*. The mask 23 similar to that used in the configuration of FIG. 3 is also provided above the upper surface of the product 11 in this configuration of FIG. 8, so that the spray painting of the paint mixture as described above is applied from the upper side of the mask 23**, just as in the case of FIG. 3.

Figure 9:
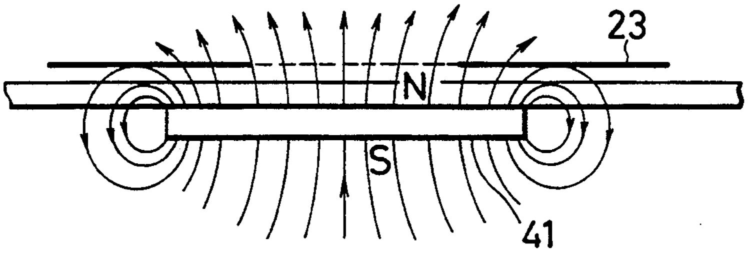
FIG. 9 is a schematic side view of another example of an arrangement of a magnet for forming the pattern according to the present invention.

The configuration of FIG. 9 is another configuration for forming the magnetic field lines which are substantially perpendicular to the paint layer 15 to be formed on the surface of the product 11 by using a permanent magnet. In this case of FIG. 9, a plate shaped permanent magnet 41 having its N and S poles on its upper and lower faces are placed directly below the lower surface of the product 11 with the N pole side facing against the lower surface of the product 11. The mask 23 similar to that used in the configuration of FIG. 3 is also provided above the upper surface of the product 11 in this configuration of FIG. 9, so that the spray painting of the paint mixture as described above is applied from the upper side of the mask 23, just as in the case of FIG. 3.

Figure 10:
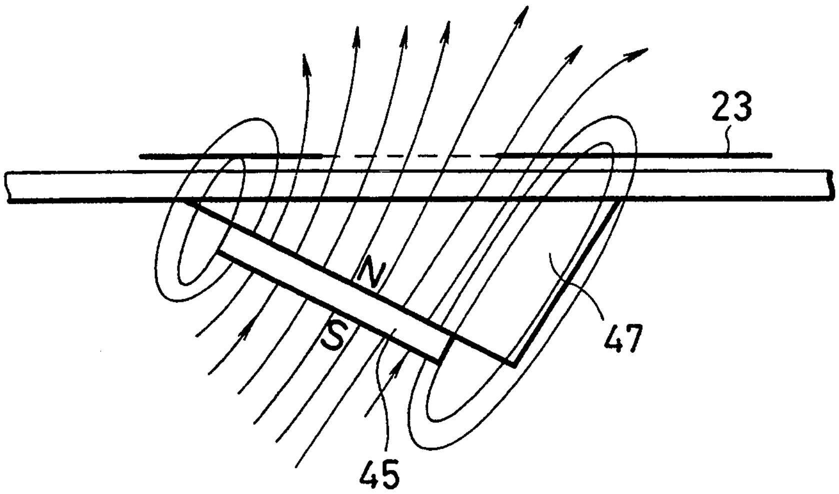
FIG. 10 is a schematic side view of another example of an arrangement of a magnet for forming the pattern according to the present invention.

The configuration of FIG. 10 is a configuration for forming the magnetic field lines which are oblique to the surface of the paint layer 15 to be formed on the surface of the product 11 by using a permanent magnet. In this case of FIG. 10, a plate shaped permanent magnet 45 having its N and S poles on its upper and lower faces is attached to a ferromagnetic block 47 having an oblique surface and this ferromagnetic block 47 is placed directly below the lower surface of the product 21 with its oblique surface facing against the lower surface of the product 11. The mask 23 similar to that used in the configuration of FIG. 3 is also provided above the upper surface of the product 11 in this configuration of FIG. 10, so that the spray painting of the paint mixture as described above is applied from the upper side of the mask 23, just as in the case of FIG. 3.

Referring now to FIGS. 11A, 11B, 12A, and 12B, exemplary cases of forming a line figure pattern by the procedure described above will be described.

Figure 11A:
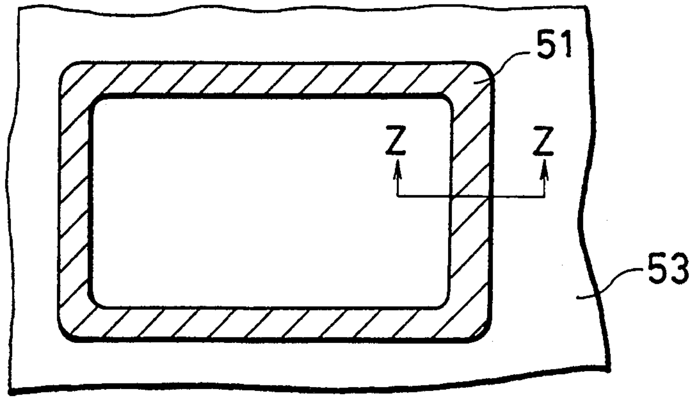
FIG. 11A is a schematic top plan view of an example of a magnet for forming a ring shaped pattern according to the present invention.
Figure 11B:
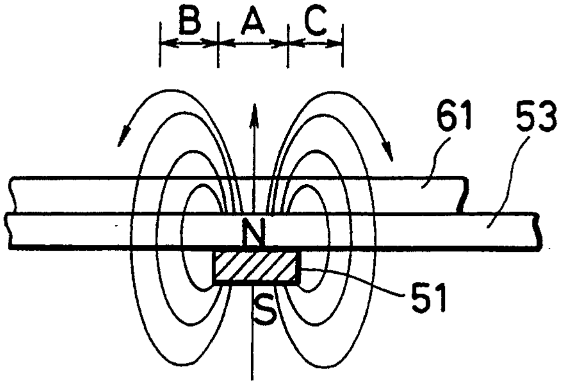
FIG. 11B is a partial cross sectional view along Z—Z line indicated in FIG. 11A.

FIGS. 11A and 11B show a case of forming a square shaped line figure on a product 53 by using a permanent magnet plate 51 having its N and S poles on its upper and lower faces,respectively, is placed directly below the lower surface of the product 53 with the N pole side facing against the lower surface of the product 53. Here, the magnet plate 51 is manufactured as a thin strip in a shape corresponding to the desired pattern to be formed, i.e., a square shaped line figure, as shown in FIG. 11A.

In this case, the spray painting of the paint mixture as described above is applied to an upper surface of the product 53 such that the paint layer 61 is formed on the upper surface of the product 53. Here, as can be seen in a view of Z—Z cross section in FIG. 11A shown in FIG. 11B, the magnetic field lines are substantially perpendicular to the surface of the paint layer 61 in a region A, while the magnetic field lines are substantially parallel to the surface of the paint layer 81 in regions B and C. As a consequence, the region A appears as colored in black while the regions B and C appear as colored in white, as described above in conjunction with FIGS. 2A to 2D, so that the square shaped line figure with sides of the square which appear to be concave can be formed on the surface of the product 53.

Figure 12A:
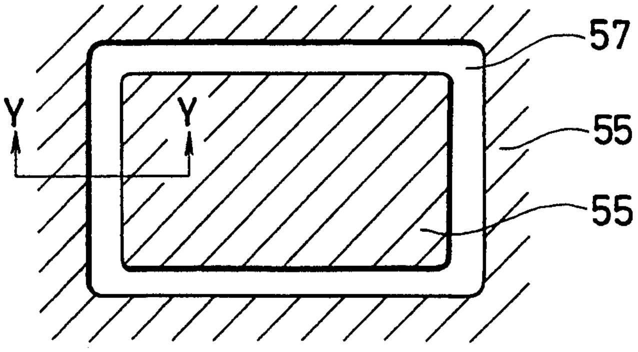
FIG. 12A is a schematic top plan view of another example of a magnet for forming a ring shaped pattern according to the present invention.
Figure 12B:
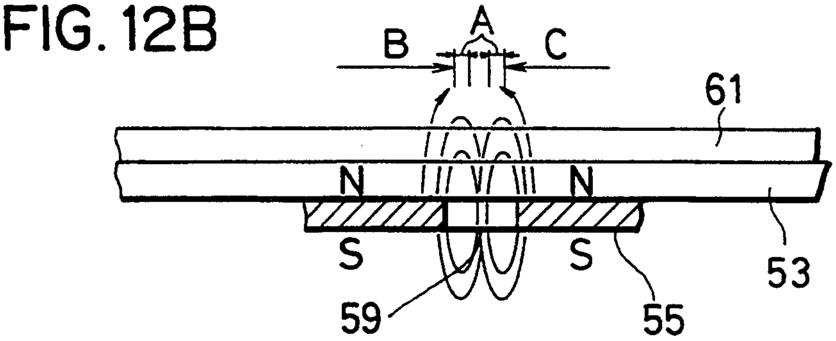
FIG. 12B is a partial cross sectional view along Y—Y line indicated in FIG. 12A.

FIGS. 12A and 12B show a complementary case of the case shown in FIGS. 11A and 11B, in which a complementary square shaped line figure is to be formed on a product 53 by using a permanent magnet plate 55 having its N and S poles on its upper and lower faces, respectively, is placed directly below the lower surface of the product 53 with the N pole side facing against the lower surface of the product 53. Here, the magnet plate 55 is manufactured as a flat plate with a thin strip puncture 57 in a shape corresponding to the desired pattern to be formed, i.e., a square shaped line figure, as shown in FIG. 12A.

In this case, the spray painting of the paint mixture as described above is applied to an upper surface of the product 53 such that the paint layer 61 is formed on the upper surface of the product 53. Here, as can be seen in a view of Y—Y cross section in FIG. 12A shown in FIG. 12B, the magnetic field lines are substantially parallel to the surface of the paint layer 61 in a region A, while the magnetic field lines are substantially perpendicular to the surface of the paint layer 61 in regions B and C. As a consequence, the region A appears as colored in white while the regions B and C appear as colored in black, as described above in conjunction with FIGS. 2A to 2D, SO that the square shaped line figure with sides of the square which appear to be convexed can be formed on the surface of the product 53.

Referring now to FIGS. 13A, 13B, 13C, 14A, and 14B, exemplary cases of forming a plane figure pattern by the procedure described above will be described.

Figure 13A:
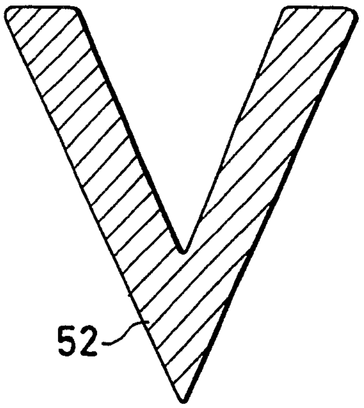
FIG. 13A is a top plan view of an example of a magnet for forming a V shaped pattern according to the present invention.
Figure 13B:
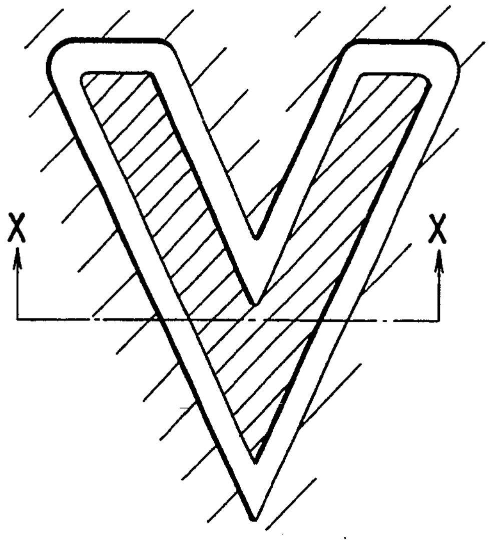
FIG. 13B is a top plan view of the V shaped pattern formed by the magnet shown in FIG. 13A.
Figure 13C:
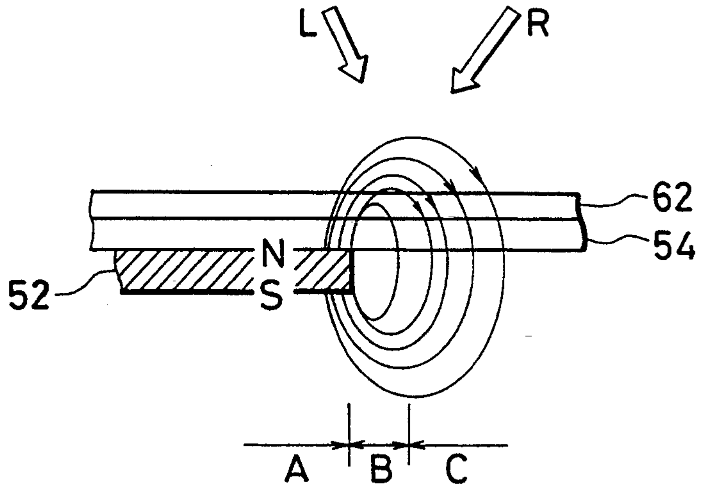
FIG. 13C is a partial cross sectional view along X—X line indicated in FIG. 13B.

FIGS. 13A, 13B, and 13C show a case of forming a V shaped plane figure on a product 54 by using a permanent magnet plate. In this case, the plane magnet plate 52 having its N and S poles on its upper and lower faces, respectively, is placed directly below the lower surface of the product 54 with the N pole side facing against the lower surface of the product 54. Here, the magnet plate 52 is manufactured in a shape corresponding to the desired pattern to be formed, i.e., a V shaped plane figure, as shown in FIG. 13A.

In this case, the spray painting of the paint mixture as described above is applied to an upper surface of the product 54 such that the paint layer 62 is formed on the upper surface of the product 54. Here. as can be seen in a view of X—X cross section in FIG. 13B shown in FIG. 13C, the magnetic field lines are substantially perpendicular to the surface of the paint layer 82 in a region A which is directly below the V shaped plane figure, while the magnetic field lines are substantially parallel to the surface of the paint layer 82 in a region B which is at a contour of the V shaped plane figure, and the magnetic field lines are oblique to the surface of the paint layer 62 in a region C which is further distanced from the V shaped plane figure than the region B. As a consequence, the region A appears as colored in black while the region B appears as colored in white, as described above in conjunction with FIGS. 2A to 2D, so that the V shaped plane figure with the contour of the V shape appear to be convexed can be formed on the surface of the product 54, as shown in FIG. 13B.

Moreover, in this case, the orientations of the magnetic flakes in the region B are continuously changed to the oblique directions toward the region C, so that the convexed V shape appear to have a smoothly round edge.

In the region C, the magnetic flakes in the paint layer 62 are oriented to be oblique to the surface of the paint layer 62 formed on the surface of the product 54 as shown in FIG. 13C, so that this region C appears to be colored in black when viewed from the left upper side L of the product 54 whereas this region C appears to be colored in white when viewed from the right upper side R of the product 54. Consequently, when viewed from the left upper side L, only the region B in a shade of the contour of the V shaped plane figure appears as convexed, whereas when viewed from the right upper side R, only the region A in a shape of the V shaped plane figure itself appears as concave.

In the region further away from the magnet plate 52 than the region C, the magnetic flakes in the paint layer 62 are oriented at random as the magnetic field strength decreases in inverse proportion to the square of the distance from the magnet plate 52, so that light rays incident from the upper side of the product 54 are scattered in random directions, and consequently this region appears to be colored in the same color as the surface of the product 54 itself.

Figure 14A:
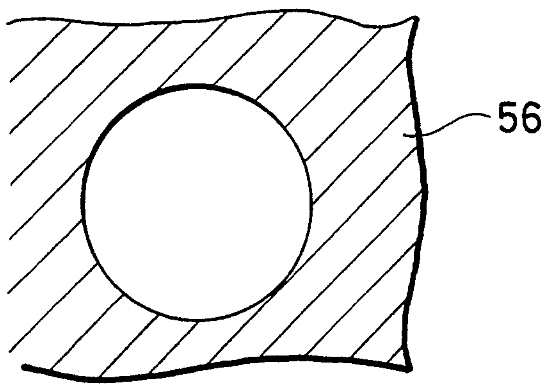
FIG. 14A is a schematic top plan view of an example of a magnet for forming a circular shaped pattern according to the present invention.
Figure 14B:
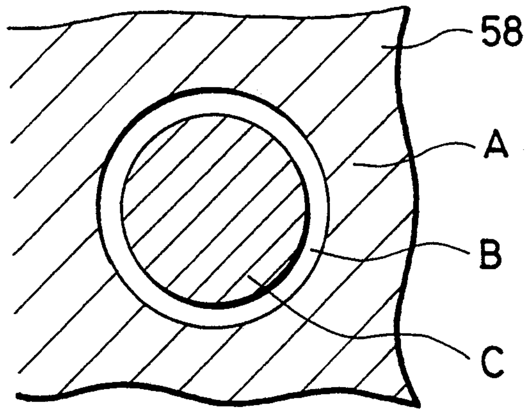
FIG. 14B is a top plan view of the circular shaped pattern formed by the magnet shown in FIG. 14A.

FIGS. 14A and 14B show a case of forming a circular shaped plane figure on a product 58 by using a permanent; magnet plate. In this case, the plane magnet plate 56 having its N and S poles on its upper and lower faces, respectively, is placed directly below the lower surface of the product 56 with the N pole side facing against the lower surface of the product 58. Here, the magnet plate 58 is manufactured to have a puncture in a shape corresponding to the desired pattern to be formed, i.e., a circular shaped plane figure, as shown in FIG. 14A.

In this case, the spray painting of the paint mixture as described above is applied to an upper surface of the product 58 such that the paint layer is formed on the upper surface of the product 58. Here, just as in the case of FIGS. 13A, 13B, and 13C described above, the magnetic field lines are substantially perpendicular to the surface of the paint layer in a region A which is directly above the magnet plate 56, while the magnetic field lines are substantially parallel to the surface of the paint layer in a region B which is at a contour of the circular shaped plane figure, and the magnetic field lines are oblique to the surface of the paint layer at an edge of a region C which is an interior of the circular shaped plane figure and become weaker inward. As a consequence, the regions A and C appear as colored in black while the region B appears as colored in white, as described above in conjunction with FIGS. 2A to 2D, so that the circular shaped plane figure with the contour of the circular shape appear to be convexed can be formed on the surface of the product 58, as shown in FIG. 14B. When the radius of the circular shaped plane figure is made smaller, the region C can be made to contain only the obliquely oriented magnetic flakes, such that the interior of the circular shaped plane figure may also appear as colored in white when viewed from the oblique direction.

Referring now to FIGS. 15A, 15B, 16A, 16B, and 17, one example of application of the present invention to an automobile wheel cover will be described.

Figure 15A:
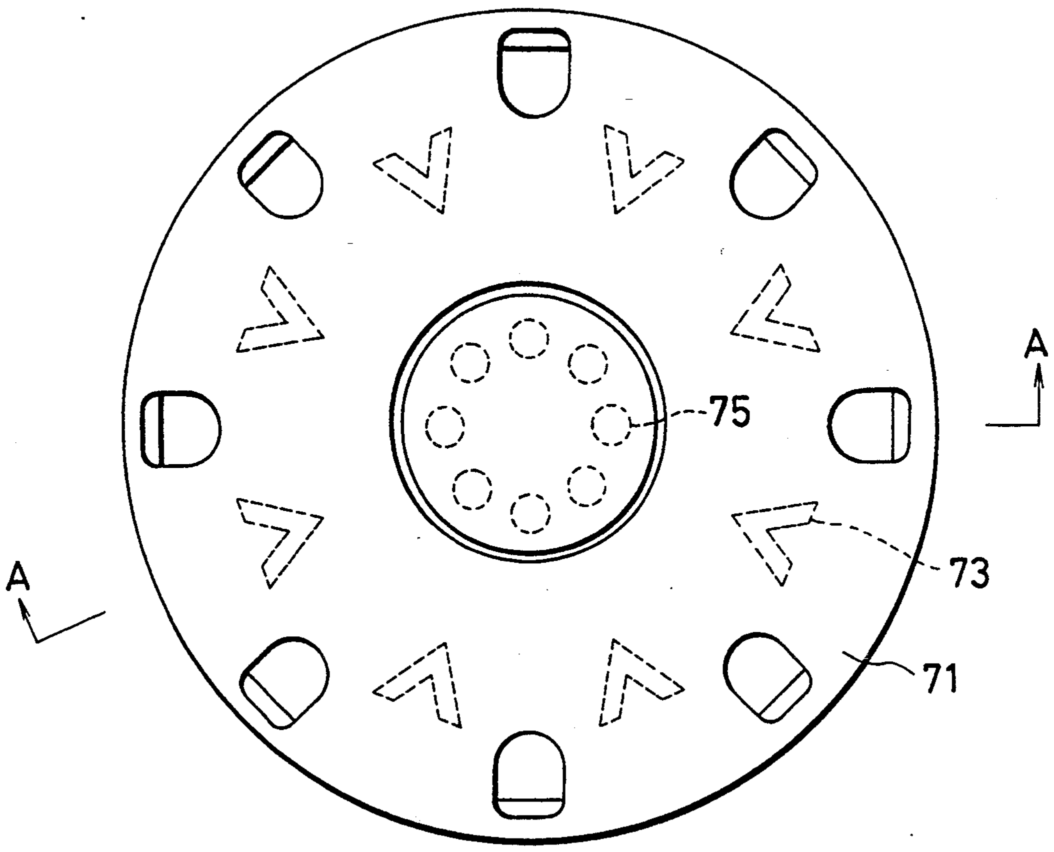
FIG. 15A is a top plan view of an example of a wheel cover with desired patterns formed according to the present invention.
Figure 15B:
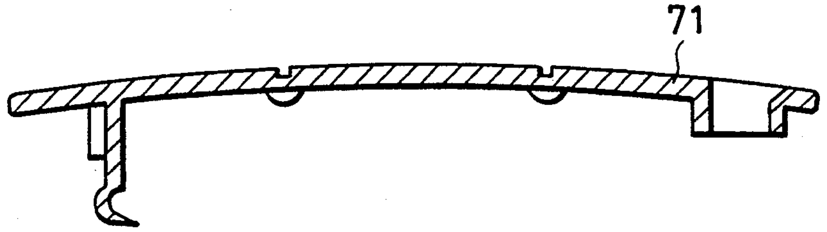
FIG. 15B is a cross sectional view along A—A line indicated in FIG. 15A.

In this example, a disk shaped automobile wheel cover 71 made of a plastic material has a plan view as shown in FIG. 15A and a view from A—A cross section in FIG. 15A as shown in FIG. 15B, and on the surface of this wheel cover 71, V shaped patterns 73 and circular patterns 75 are to be formed by using the present invention.

Figure 16A:
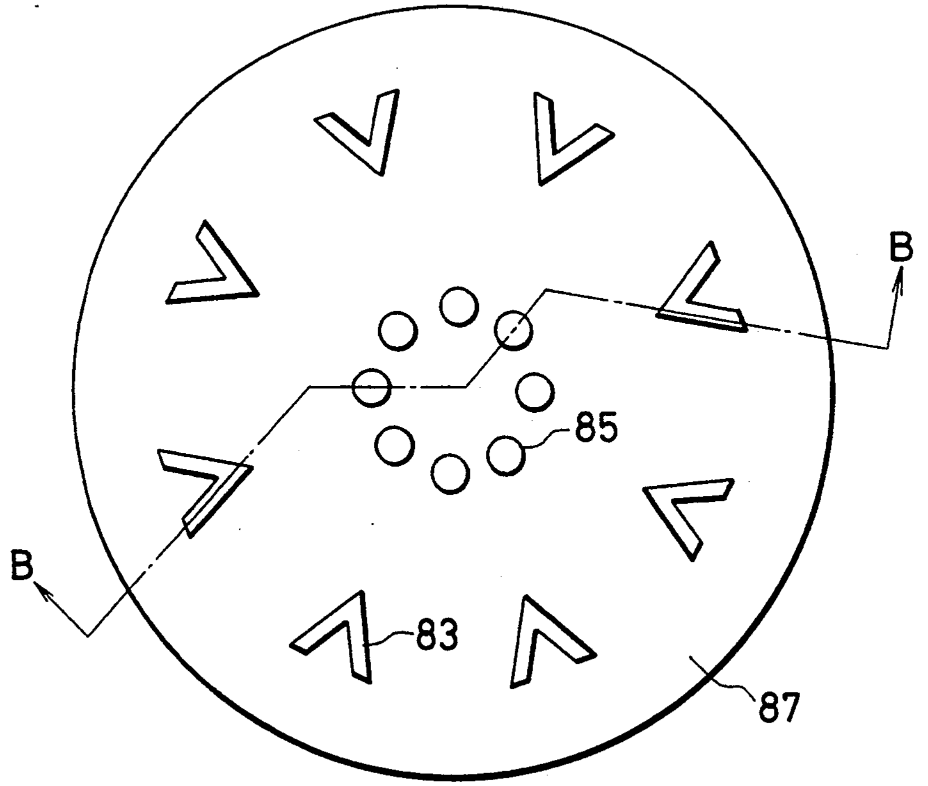
FIG. 16A is a top plan view of magnets to be used in forming the desired patterns on the wheel cover shown in FIGS. 15A and 15B.
Figure 16B:
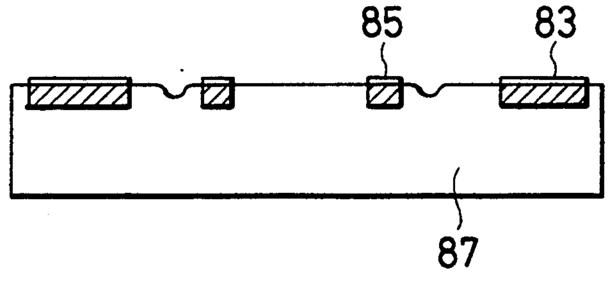
FIG. 16B is a cross sectional view along B—B line indicated in FIG. 16A.

In this case, the magnet to be used in forming the patterns has a configuration with a plan view as shown in FIG. 16A and a view from B—B cross section in FIG. 16A as shown in FIG. 16B, in which V shaped permanent magnets 83 and circular shaped permanent magnets 85 made of rubber containing ferrite are arranged in correspondence to the V shaped patterns 73 and the circular shaped patterns 75 to be formed, on a magnet support member 87 made of a non-magnetic material such as wood or plaster.

Figure 17:
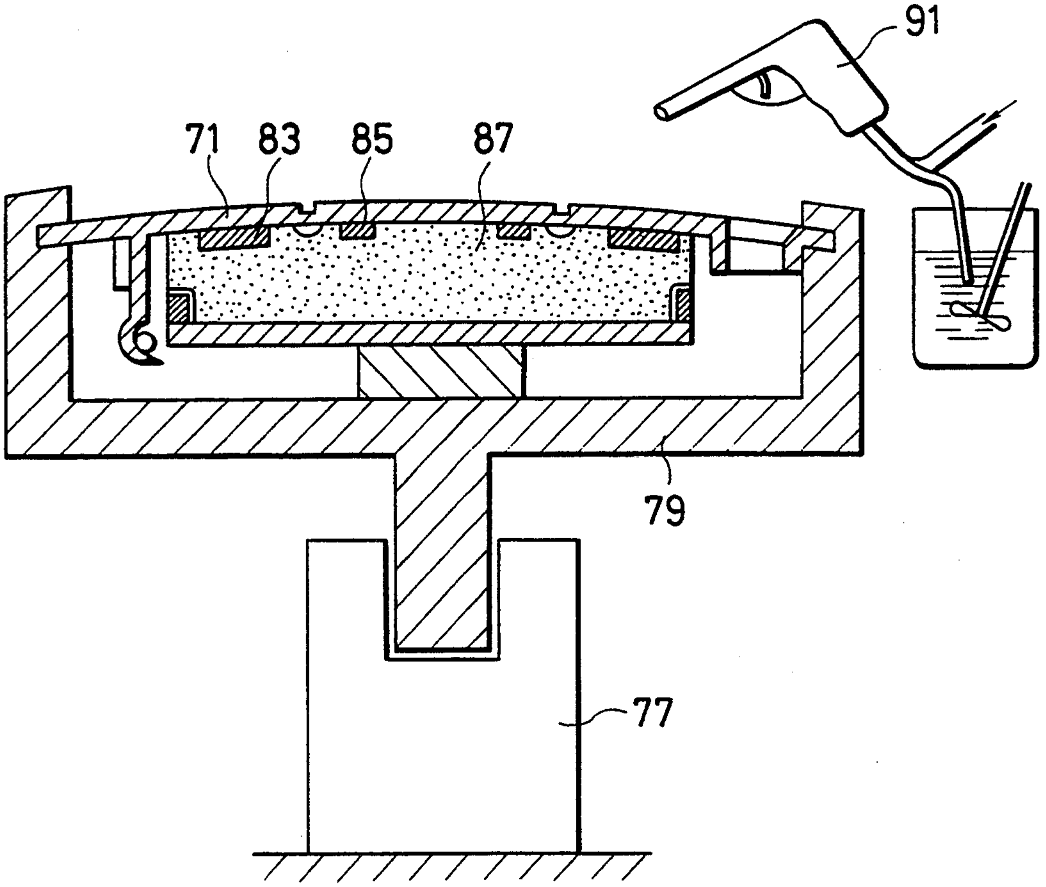
FIG. 17 is a schematic cross sectional view of an apparatus for forming a paint layer on the wheel cover shown in FIGS. 15A and 15B.

Then, the formation of the desired patterns on the wheel cover 71 is achieved by using an apparatus having a configuration shown in FIG. 17.

In this apparatus of FIG. 17, the wheel cover 71 and the magnet support member 87 are mounted on a wheel cover support member 79 which is provided on a base 77 to be freely rotatable, such that the permanent magnets 83 and 85 arranged on the magnet support member 87 faces against the back side of the wheel cover 71.

Then, on an upper side of the wheel cover 71, the spray painting of a paint mixture is applied by a spray gun 91, while the wheel cover support member 79 is rotated at a constant speed, such that a plurality of thin paint layers are uniformly formed on the surface of the wheel cover 71.

Here, the paint mixture used in the spray painting comprises a transparent paint medium in fluid state in which a multiplicity of magnetic flakes made of nickel are mixed uniformly by using a volatile solvent. In addition, the paint mixture is further mixed with a thinner for the purpose of faster drying and easy spraying due to the reduced viscosity.

After waiting for approximately ten to one hundred seconds since the completion of the spray painting, the wheel cover 71 is taken off the wheel cover support member 79 and the paint layers formed on the surface of the wheel cover 71 are dried.

It is to be noted that the above described procedure is so simple that it can either be carried out manually or automatized for mass production.

Figure 18A:
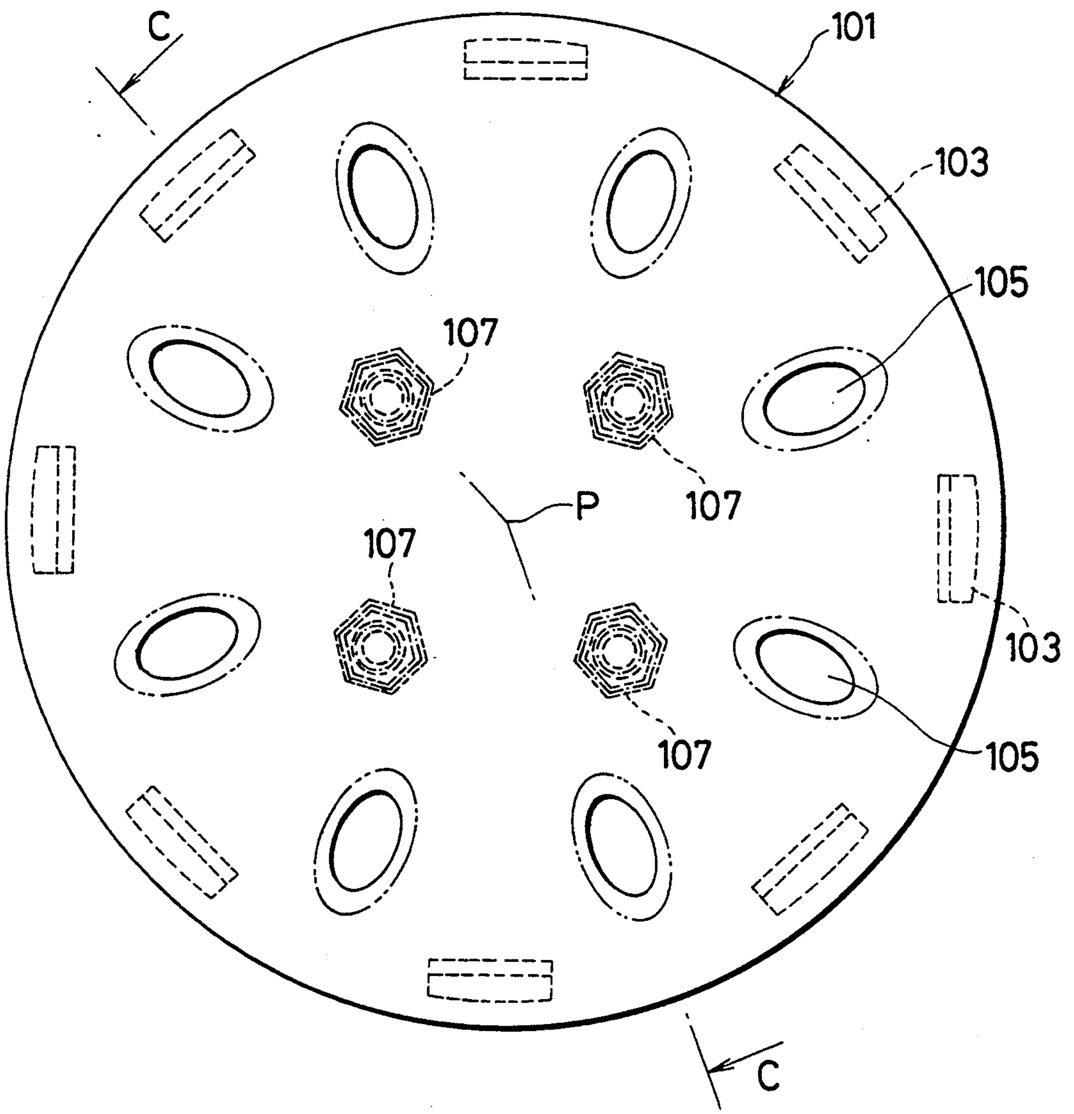
FIG. 18A is a top plan view of another example of a wheel cover with desired patterns formed according to the present invention.
Figure 18B:
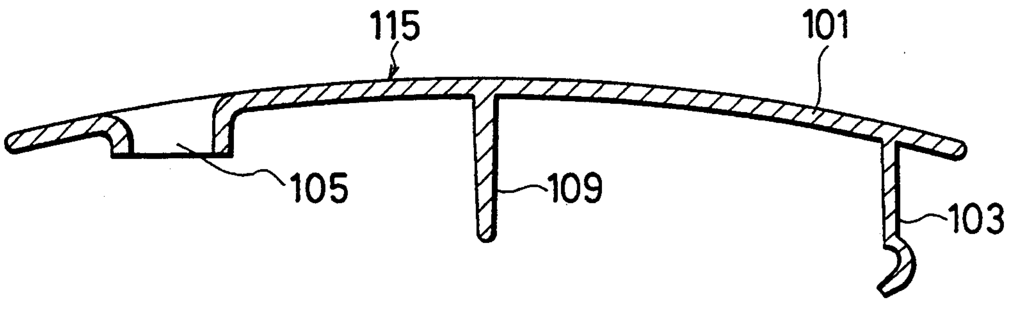
FIG. 18B is a cross sectional view along C—C line indicated in FIG. 18A.

Referring now to FIGS. 18A and 18B, another example of an application of the present invention to an automobile wheel cover will be described in detail.

In this example, a disk shaped automobile wheel cover 101 manufactured from a plastic material by injection molding has a plan view as shown in FIG. 18A and a view from C—C cross section in FIG. 18A as shown in FIG. 18B. This wheel cover 101 has: eight attachment hooks 103 along its circumference on the back side of the wheel cover 101, by means of which the wheel cover 101 is to be attached to a road wheel of the automobile; eight air holes 105 connecting the front and back sides of the wheel cover 101, which are located at inner side of the attachment hooks 103; and a central protrusion 109 located at a center of the back side of the wheel cover 101, which is formed at a resin injection part in an injection mold used in manufacturing the wheel cover 101. This central protrusion 109 is used for mounting the wheel cover 101 on the painting apparatus during the painting process, and will be cut off after the painting process is over.

The wheel cover 101 as a whole is formed in a convexed shape such that its front surface is a partial spherical surface which is substantially flat locally. Here, to be substantially flat locally means it is curved by a radius of curvature greater than 100 mm. In this sense, the entire front surface of the wheel cover can be regarded as flat in effect, except for the edges of the air holes 105.

On the paint layer 115 formed on the front surface of this wheel cover 101, four nut shaped patterns 107, each having a hexagonal outer contour and a circular inner contour, are formed at constant interval on a single circle centered around a center P of the wheel cover 101 and located at inner side of the air holes 105 by using the method of the present invention. Here, four nut shaped patterns 107 are arranged to be symmetric with respect to the center P of the circle on which the nut shaped patterns 107 are arranged, such that the disturbance of the formed nut shaped patterns 107 due to the interference of the magnetic field for forming one of the nut shaped patterns 107 and the magnetic fields for forming other ones of the nut shaped patterns 107 can appear symmetrically in the nut shaped patterns as a whole.

Figure 19:
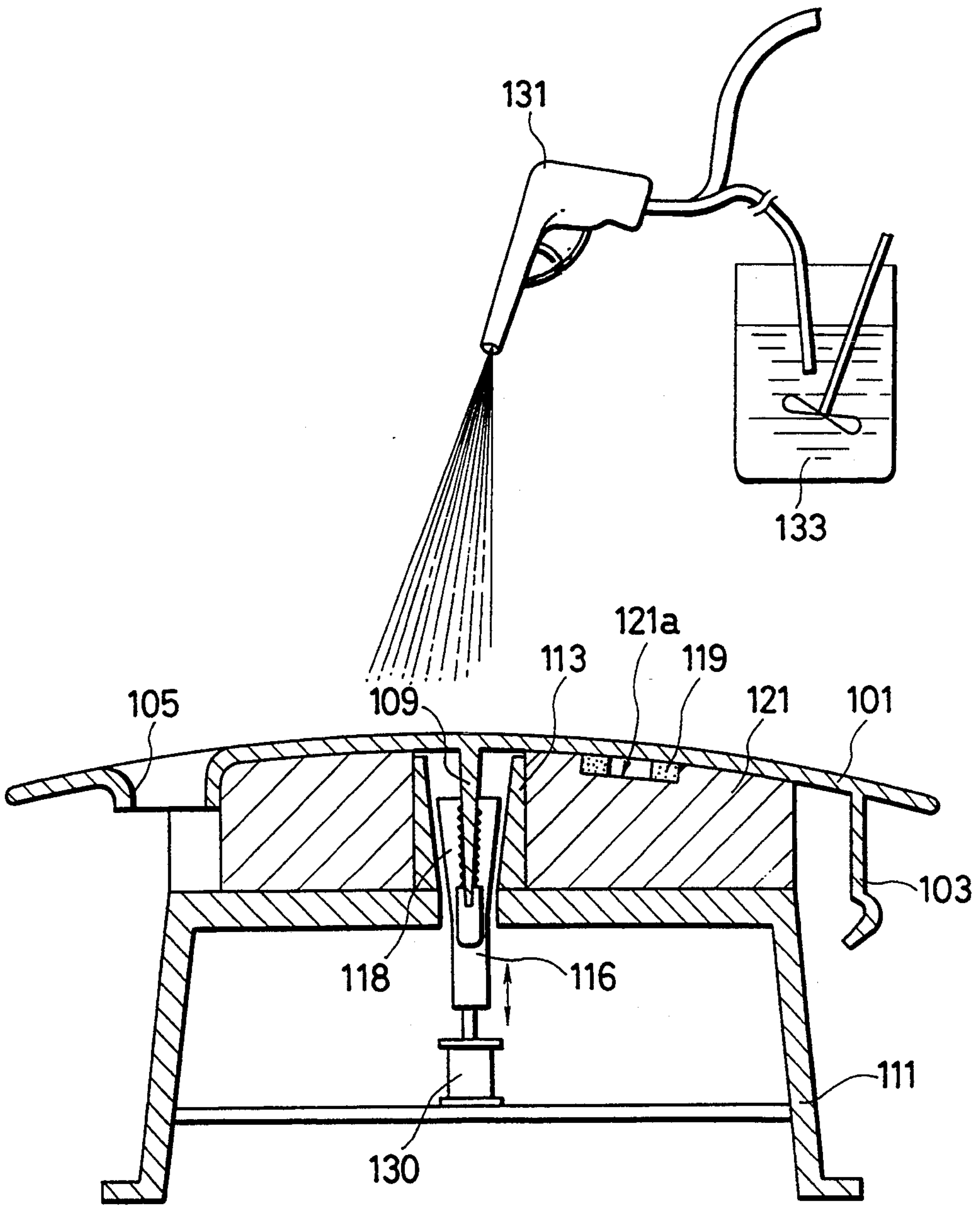
FIG. 19 is a schematic cross sectional view of an apparatus for forming a paint layer on the wheel cover shown in FIGS. 18A and 18B.
Figure 20:
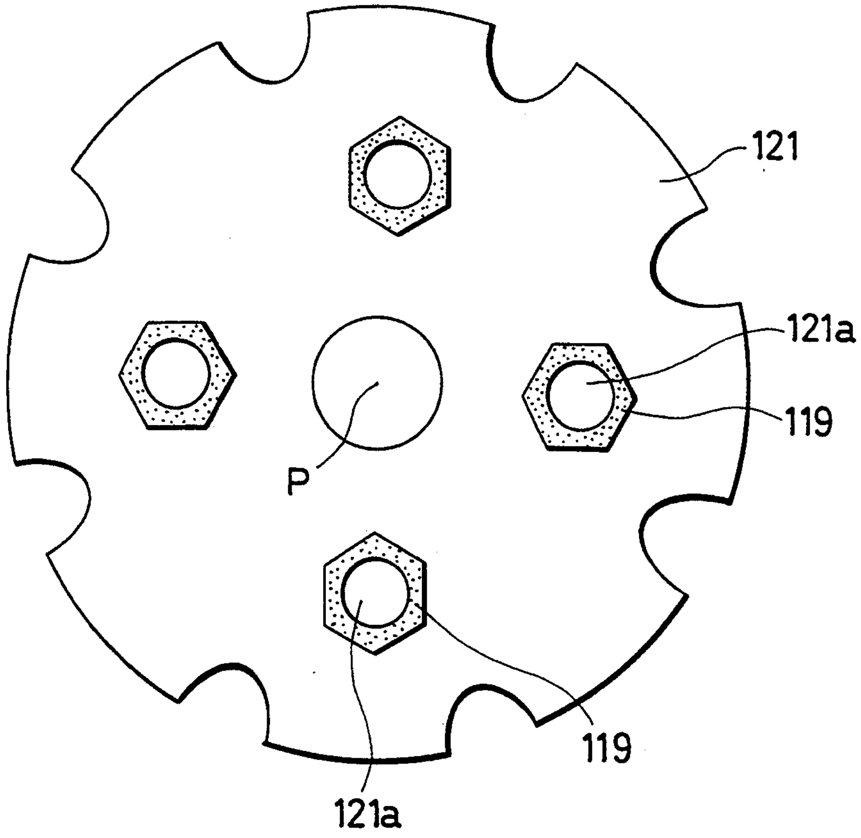
FIG. 20 is a top plan view of magnets to be used in forming the desired patterns on the wheel cover shown in FIGS. 18A and 18B.

Referring now to FIG. 19 and FIG. 20, the apparatus for forming the paint layer having the desired nut shaped patterns formed thereon on the surface of the wheel cover 101 will be described.

This apparatus of FIG. 19 comprises: a base frame 111; a support member 121, made of wood or plaster and fixed on the base frame 111, for supporting the back side of the wheel cover 101 mounted thereon, which has a conical guide hole 113 at a center; a vertically movable holding member 116 having an air cylinder 130 for moving the holding member 116 in the vertical direction and a holding device 118 located inside the guide hole 113 for holding the central protrusion 109 of the wheel cover 101 to be movable in the vertical direction; and magnets 119 for forming the desired pattern on the wheel cover 101 during the painting process, which are mounted on magnet mounting holes **121*a* provided on the top surface of the support member 121** at locations corresponding to the desired nut shaped patterns to be formed.

In this case, as shown in FIG. 20, four nut shaped magnets 119, each of which having a hexagonal outer contour and a circular inner contour, are mounted in the magnet mounting holes **121*a* which are provided at constant interval on a single circle centered around a center P, in correspondence to the desired nut shaped patterns 107** to be formed.

By using this apparatus of FIG. 19, the desired nut shaped patterns 107 can be formed on the wheel cover 101 by the following procedure.

First, the wheel cover 101 is mounted on the top surface of the support member 121 by inserting the central protrusion 109 into the holding device 118, and then pulling the holding member 116 downward by means of the air cylinder 130 so as to contact the back side of the wheel cover 101 tightly against the top surface of the support member 121. In this state, the front surface of the wheel cover 101 is placed inside the magnetic fields produced by the magnets 119 having the lines of magnetic force corresponding to the shapes of the desired nut shaped patterns to be formed.

Then, the paint layer is formed uniformly on the front surface of the wheel cover 101 by the spray painting from a spray gun 131 of the paint mixture 133 prepared from the paint medium with the magnetic flakes uniformly mixed by using a volatile solvent, such that the desired nut shaped patterns 107 can be formed on the paint layer as the magnetic flakes in the paint layer change their orientations according to the lines of magnetic force due to the magnetic fields produced by the magnets 119, according to the principle of the present invention as described above.

After waiting for the volatile solvent in the paint mixture 133 to volatilize such that the orientations of the magnetic flakes can be fixed in the paint layer, the wheel cover 101 is dismounted from the support member 121 and the paint layer is fully solidified by using an appropriate solidification method.

Referring now to FIGS. 21A to 21D, the formation of the nut shaped patterns 107 will be described in further detail.

FIG. 21A shows a relationship between the shapes of the magnet 119 and the nut shaped pattern 107 formed by the magnet 119. As shown in FIG. 21A, in correspondence to the hexagonal outer contour **119*a* and the circular inner contour 119*b* formed by a central circular hole 119*c*, the nut shaped pattern 107 has the hexagonal outer contour 149*a* and a circular inner contour 149*b*. Here, the outer and inner contours 149*a* and 149*b* of the nut shaped pattern 107 actually have predetermined widths and solid lines depicted in FIG. 21A indicate the ridge portions 149 of the outer and inner contours 149*a* and 149*b* which appear most whitish within the outer and inner contours 149*a* and 149*b*** appearing as colored in white.

FIG. 21B indicates the color in which different parts of the nut shaped pattern 107 along D—D line depicted in FIG. 21A appear, where the middle line corresponds to the gray color of the wheel cover 101 itself, and those portions above the middle line appear as colored in white and convexed in contrast to the surrounding portions, while those portions below the middle line appear as colored in black and concave in contrast to the surrounding portions.

FIG. 21C depicts the typical orientations of the magnetic flakes at different parts of the nut shaped pattern 107 along D—D line depicted in FIG. 21A. As can be seen in comparison with FIG. 21B, those portions which appear as colored in white have the magnetic flakes oriented to be substantially parallel to the surface of the paint layer, those portions which appear as colored in black have the magnetic flakes oriented to be substantially perpendicular to the surface of the paint layer, and those portions which appear as colored in gray have the magnetic flakes oriented to be oblique to the surface of the paint layer or at random.

FIG. 21D shows the lines of magnetic force 139 due to the magnetic fields produced by the magnet 119 through the wheel cover 101 and the paint layer 115 formed thereon. As can be seen in FIG. 21D, the hexagonal outer contour **149*a* and the circular inner contour 149*b* of the nut shaped pattern 107 are located at positions where the lines of magnetic force 139 are oriented to be substantially parallel to the surface 137 of the paint layer 115 at which the magnetic flakes 117 in the paint layer 115 along these lines of magnetic force 139, and the ridge portions 149 of the nut shaped pattern 107 are located at centers of the outer and inner contours 149*a* and 149*b* at which the lines of magnetic force 129 are oriented to be parallel to the surface 137** of the paint layer.

Figure 22:
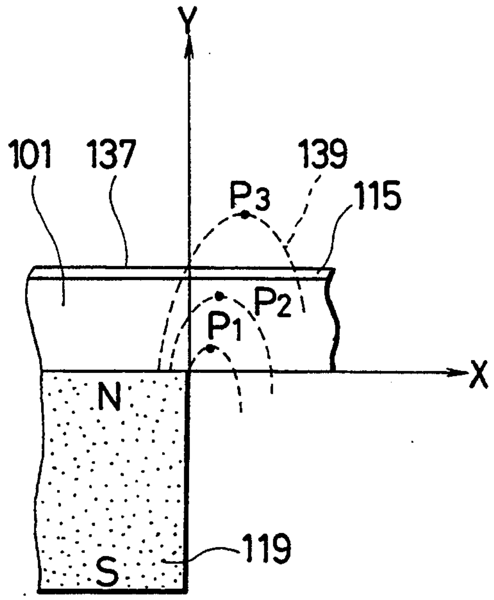
FIG. 22 is an enlarged cross sectional view of an edge portion of the magnet used in forming the desired nut shaped pattern shown in FIG. 21A, indicating locations at which the lines of magnetic force are parallel to the surface of the paint layer.
Figure 23:
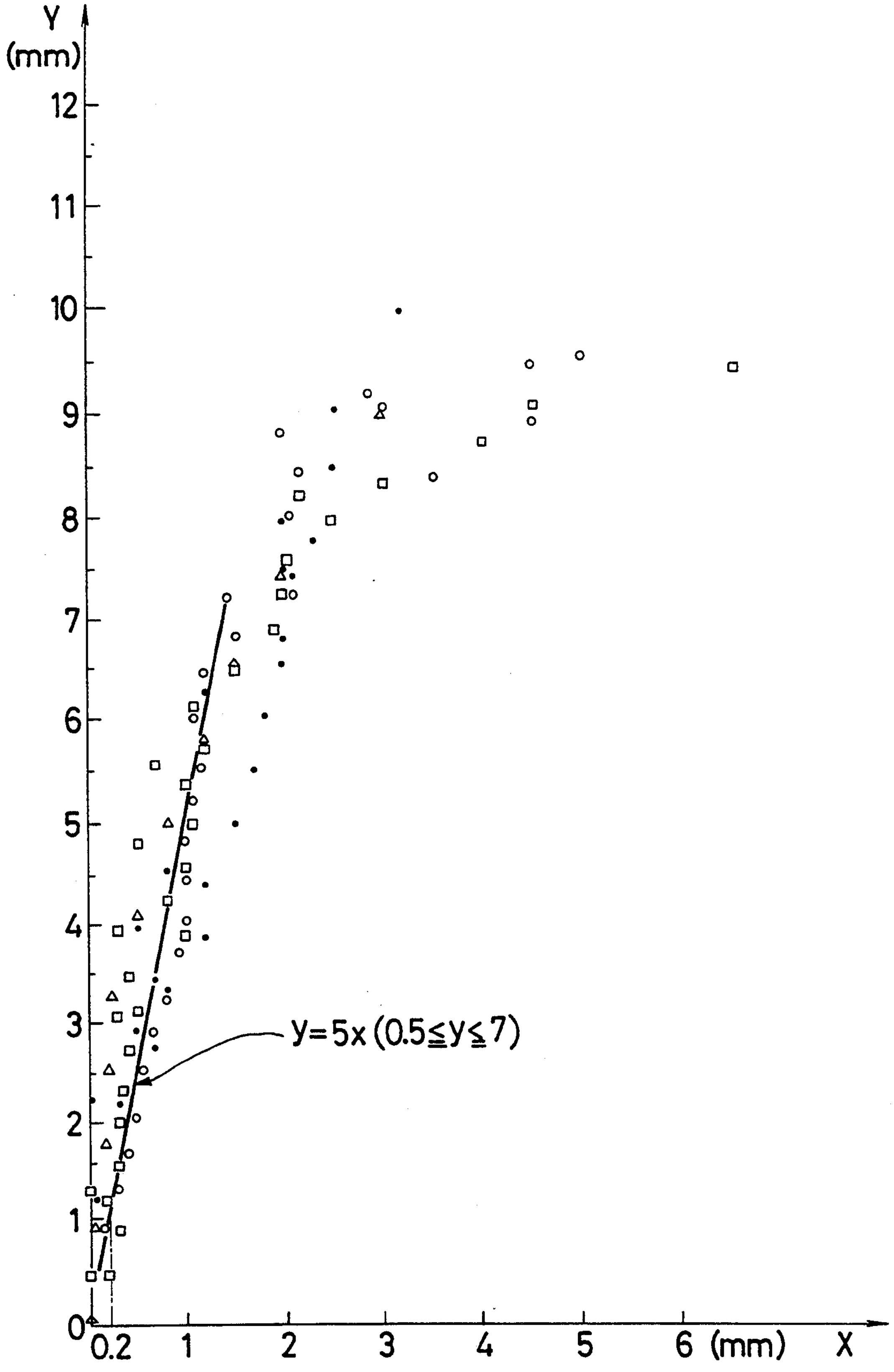
FIG. 23 is a graph of the measured locations at which the lines of magnetic force are parallel to the surface of the paint layer.
Figure 24:
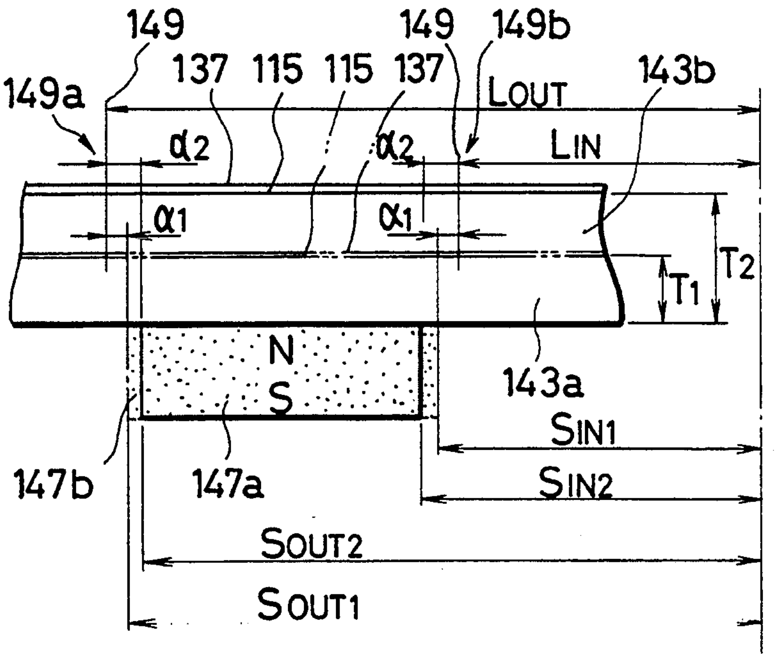
FIG. 24 is a cross sectional view of the magnet used in forming the desired nut shaped pattern shown in FIG. 21A, indicating desired size of the magnet in relation to the thickness of the product body.

Referring now to FIG. 22 to FIG. 24, the exact locations at which the lines of magnetic force 139 are oriented to be parallel to the surface 137 of the paint layer 115 will be described in detail.

Namely, the locations $P_1$, $P_2$, $P_3$, etc. at which the lines of magnetic force 139 are oriented to be parallel to the surface 137 of the paint layer 115 were measured to be located in relation to the magnet 119 as shown in FIG. 22.

FIG. 23 shows a graph plotting the positions of these locations with respect to the X and Y axes as shown in FIG. 22 measured by using a different sample magnets at 96 positions. As shown in FIG. 23, these locations are located on a line expressed by $Y=5X$ within a range of $0.5 \leqq Y \leqq 7$. It is noted here that for $Y>7$ mm, the contours could be observed only ambiguously.

According to this result, where the thickness of the product to be painted 101 in the Y direction is 1 mm, the position in the X direction at which the ridge portion of the contour of the desired pattern is formed is located at 0.2 mm away from the edge of the magnet 119. In other words, in this case it is possible to obtain the desired pattern in the desired size by manufacturing the magnet 119 to have the size smaller than the desired size by 0.2 mm toward the center of the desired pattern.

Similarly, in general, it is possible to obtain the desired pattern in the desired size by manufacturing the magnet 119 to have the size smaller than the desired size by a predetermined distance determined according to the measurement result shown in FIG. 23, toward the center of the desired pattern.

Moreover, FIG. 24 shows a comparison of sizes of the magnets **147*a* and 147*b* required in cases of forming the same desired pattern on the products 143*a* and 143*b* which have the different thicknesses T1 and T2, respectively. Here, each of the magnets 147*a* and 147*b* is assumed to have a doughnut like shape with a central bore. In FIG. 24, $\alpha 1$ indicates a distance between the edge of the magnet 147*a* and the ridge portion 149 of the contour of the desired pattern to be formed, while $\alpha 2$ indicates a distance between the edge of the magnet 147*b* and the ridge portion 149 of the contour of the desired pattern to be formed. Also, $S_{OUT1}$ indicates a distance between the center and the outer contour of the magnet 147*a*, while $S_{OUT2}$ indicates a distance between the center and the outer contour of the magnet 147*b*. Also, $S_{IN1}$ indicates a distance between the center and the inner contour of the magnet 147*a*, while $S_{IN2}$ indicates a distance between the center and the inner contour of the magnet 147*b*. Also, $L_{OUT}$ indicates a distance between the center and the ridge portion of the outer contour 149_a_ of the desired pattern to be formed, while $L_{IN}$ indicates a distance between the center and the ridge portion of the inner contour 149**_b_ of the desired pattern to be formed.

As can be seen from FIG. 24, there are following relationships among the quantities shown in FIG. 24.

$$S_{OUT1}=L_{OUT}-\alpha 1$$

$$S_{OUT2}=L_{OUT}-\alpha 2$$

$$S_{IN1}=L_{IN}+\alpha 1$$

$$S_{IN2}=L_{IN}+\alpha 2$$

It is noted that the values of $\alpha 1$ and $\alpha 2$ depend on the thicknesses T1 and T2 of the products 143_a_ and 143_b_.

Thus, in general, it is possible to obtain the desired pattern in the desired size by manufacturing the magnet to have the size of the contour smaller than the ridge portion of the contour of the desired pattern to be formed, such that the positions at which the lines of magnetic force due to the magnetic field produced by the magnet can be located at the positions of the ridge portion of the contour of the desired pattern to be formed.

In addition, as the thickness of the product to be painted increases while the positions of the desired patterns to be formed are unchanged, the size of the contour of the magnet to be used in forming the desired pattern should be made smaller.

It is to be noted that the number of patterns to be formed on the product is not limited to the case of four described above, and any desired number of the patterns can be formed on the product. Here, however, it is preferable to arrange the positions of the patterns such that the interference of the magnetic fields produced by the different magnets for forming the different ones of the desired patterns can be balanced out in the overall view of the patterns. In addition, it is also possible to form a continuous pattern around a single circle which involves the similar parts at constant interval on the circle, such as a gear shaped pattern, star shaped pattern, and flower shaped pattern.

It is also to be noted that, although the case of carrying out the formation of the paint layer 115 while the magnetic field due to the magnet 119 is already applied has been described above, the steps of the formation of the paint layer 116 and the application of the magnetic field by the magnet 119 may be reversed. In other words, it is equally possible to achieve the similar formation of the desired pattern by forming the paint layer 115 on the front surface of the product 101 first, and then applying the magnetic field by the magnet 119 while the painted layer 115 maintains its fluidity so that the magnetic flakes contained within the paint layer 115 can change their orientations according to the applied magnetic field.

Figure 25:
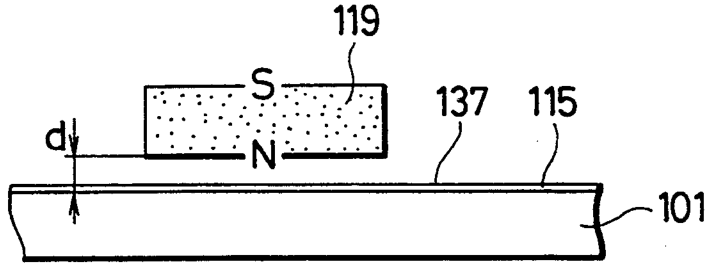
FIG. 25 is a schematic cross sectional view of an alternative arrangement of the magnet used in forming the desired nut shaped pattern shown in FIG. 21A.

Although the case of forming the desired pattern by placing the magnet on the back side of the product to be painted has been described above, in a case where it is difficult to place the magnet on the back side of the product to be painted appropriately due to the complicated shape of the back side of the product to be painted, the magnet 119 may be placed on the front side of the product 101 as shown in FIG. 25. In such a case, the appropriate size and position of the magnet 119 for forming the desired pattern on the front surface of the product 101 can be determined by regarding a distance d between the magnet 119 and the surface 137 of the painted layer 115 provided on the front surface of the product 101 as a thickness of an imaginary product to be painted. Consequently, when the magnet is placed on the front side, the position of the magnet 119 with respect to the paint layer 115 is not restricted by the thickness of the product 101.

Figure 26:
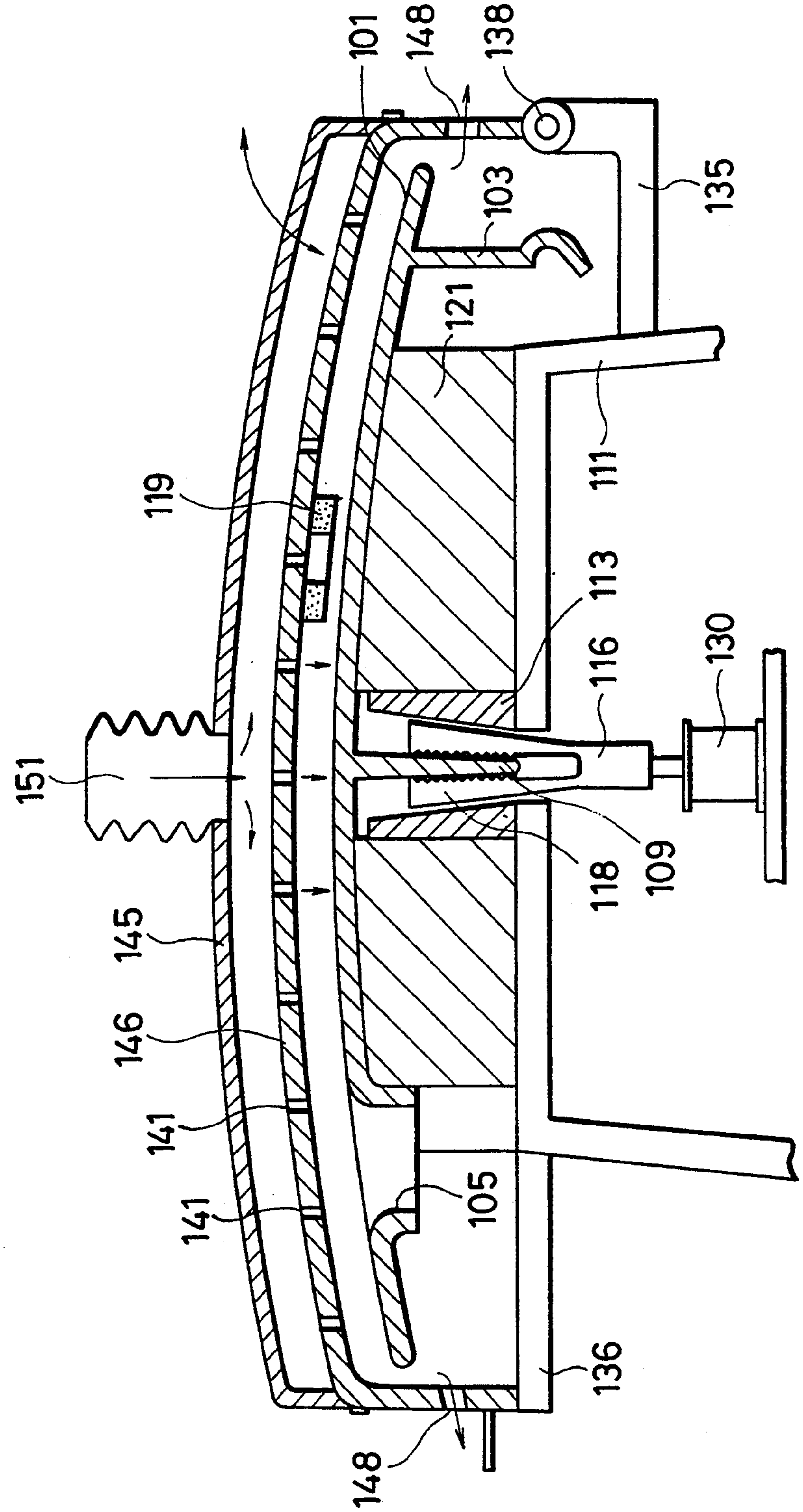
FIG. 26 is a schematic cross sectional view of an apparatus for forming a paint layer on the wheel cover shown in FIGS. 18A and 18B, adopting the alternative arrangement of the magnet shown in FIG. 25.

An exemplary configuration of the apparatus for forming the desired patterns on the surface of the wheel cover 101 using such a positioning of the magnet 119 over the front surface of the wheel cover 101 is shown in FIG. 26.

This apparatus of FIG. 26 differs from that shown in FIG. 19 in that the magnet 119 is located above the front surface of the wheel cover 101 mounted on the support member 121, where the magnet 119 is attached on the back side of an inner lid 146 attached to the base frame by a hinge 138 such that it can be opened up or closed down to a position of a stopper 136, and that there is provided an air supply mechanism formed by an outer lid 145 attached on the inner lid 146 which is equipped with an air supply inlet 151 from which the air or heated air can be supplied into the inner lid 146 through holes 141 provided on an upper side of the inner lid 146, and air outlets 148 provide on lower side portion of the inner lid 146 through which the air supplied from the air supply inlet 151 can escape.

In a case of using this apparatus of FIG. 26, the paint layer is formed on the front surface of the wheel cover 101 first while the inner lid 146 is opened up, and then the inner lid 146 is closed to form the desired patterns on the paint layer while the air or heated air is supplied from the air supply inlet 151 in order to volatilize the volatile solvent in the paint mixture used in forming the paint layer 115 (not shown).

Referring now to FIGS. 27A to 27D, an example of application of the present invention for the formation of numeral figure pattern will be described in detail.

Figure 27A:
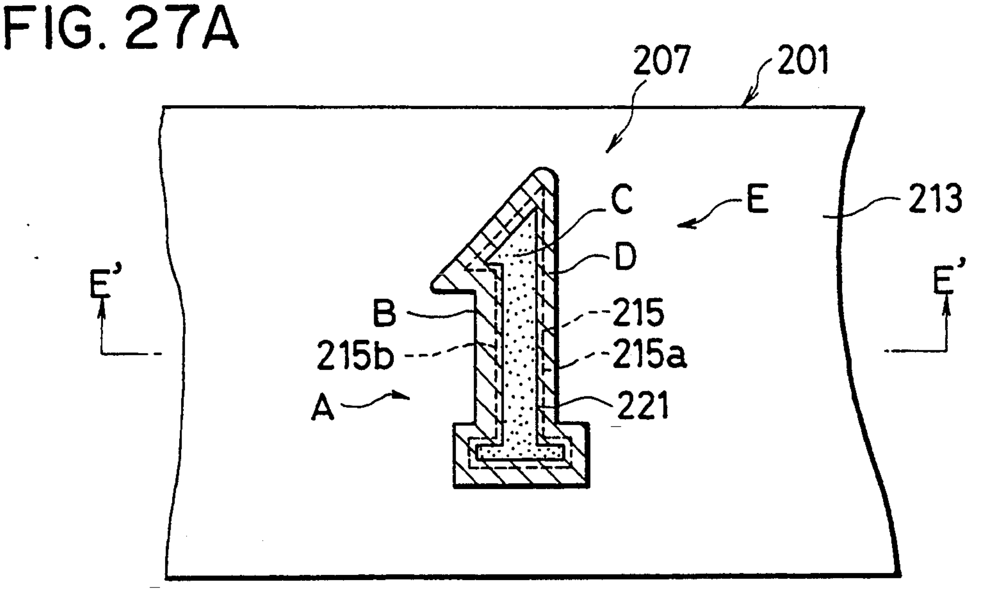
FIG. 27A is a top plan view of a desired pattern in a shape of arabic numeral figure "1" to be formed on the product.

FIG. 27A shows a top plan view of a product 201 with a desired pattern 207 formed thereon, along with a relationship between the shapes of a magnet 215 and the pattern 107 formed by the magnet 215.

Here, as shown in FIG. 27A, a product 201 has a pattern 207 in a shape of an arabic numeral figure "1" formed by using a magnet 215 having a shape of an arabic numeral figure "1" which is placed on the back side of the product 201.

Figure 27B:
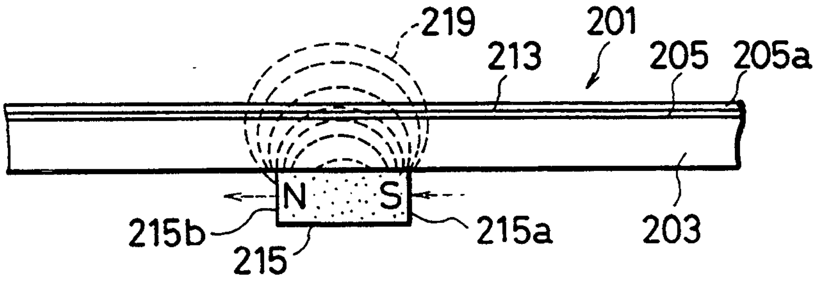
FIG. 27B is a cross sectional view along E′—E′ line indicated in FIG. 27B.

FIG. 27B shows the lines of magnetic force 219 due to the magnetic fields produced by the magnet 215 through a product body 203, a paint layer 205 formed by a paint mixture containing magnetic flakes 211, and a transparent top coat layer 205_a_, along line E′—E′ depicted in FIG. 27A.

Figure 27C:
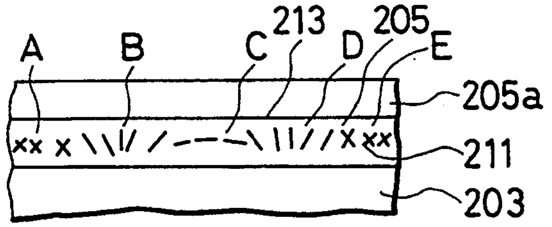
FIG. 27C is a diagram indicating typical orientations of magnetic flakes at various parts of the desired pattern shown in FIG. 27A.

FIG. 27C depicts the typical orientations of the magnetic flakes 211 contained in the paint layer 205 at different parts A, B, C, D, and E of the pattern 207 along line E′—E′ depicted in FIG. 27A.

Figure 27D:
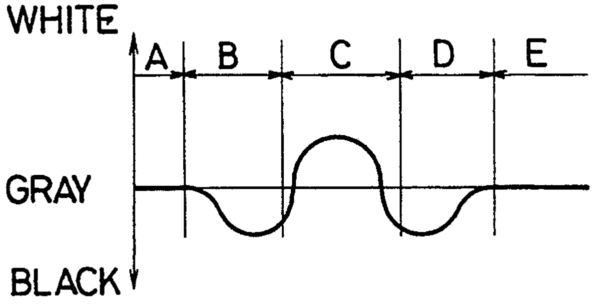
FIG. 27D is a diagram indicating the colors in which various parts of the desired pattern shown in FIG. 27A appear.

FIG. 27D indicates the color in which different parts A, B, C, D, and E of the pattern 207 along line E′—E′ depicted in FIG. 27A appear, where the middle line corresponds to the gray color of the product body 203 itself, and those portions above the middle line appear as colored in white and convexed in contrast to the surrounding portions, while those portions below the middle line appear as colored in black and concave in contrast to the surrounding portions.

Figure 28:
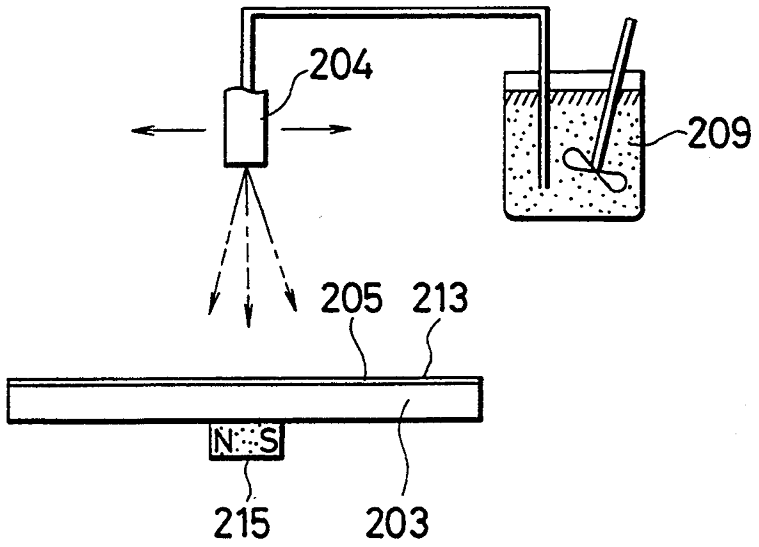
FIG. 28 is a schematic cross sectional view of an apparatus for forming a paint layer on the product with the desired pattern shown in FIG. 27A.

In this case, as shown in FIG. 28, the formation of the pattern 207 on the product 201 can be achieved by forming the paint layer 205 on an upper surface of the product body 203 by spray painting the paint mixture 209 containing the magnetic flakes 211 from a spray gun 204, while the magnet 215 is placed below the lower surface of the product 203 such that the magnetic flakes 211 in the paint layer 205 are oriented along the lines of magnetic force 219 due to magnetic field produced by the magnet 215.

Figure 29:
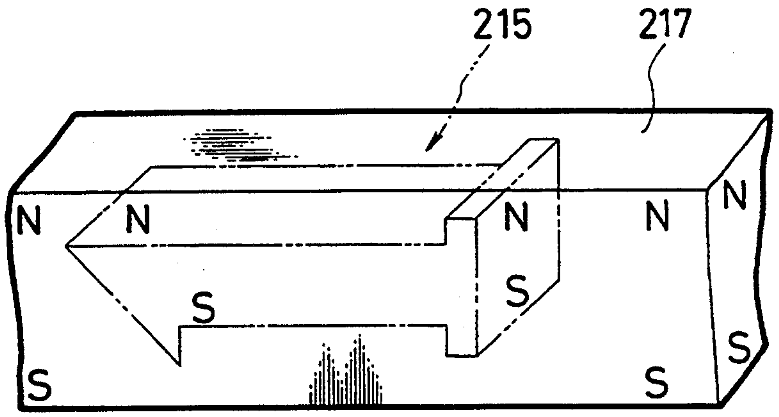
FIG. 29 is a perspective view of a magnet to be used in forming the desired pattern shown in FIG. 27A.

In this case, as shown in FIG. 29, the magnet 215 having a shape of the arabic numeral figure "1" is prepared by die cutting a block shaped magnet 217 into the shape of the arabic numeral figure "1" in a direction perpendicular to a plane defined by a line joining N and S poles.

Also, as indicated in FIG. 27A, the contour 221 of the region C which appears as colored in white is located at positions inside of the S and N pole side outer contours 215*a* and 215*b* of the magnet 215, so that the magnet 215 is prepared to have the size slightly larger than the desired size of the pattern 207 to be formed on the product 201.

Here, as shown in FIG. 27B, the magnet 215 is located below the lower surface of the product body 203 with the N pole side outer contour 215*b* facing toward the left side and S pole side outer contour 215*a* facing toward the right side, such that there is only a single position between the N pole and S pole of the magnet 215 at which the lines of magnetic force 219 due to the magnetic field produced by the magnet 215 are oriented to be parallel to the surface 213 of the paint layer 205. Consequently, the ridge portion of the pattern 207 formed by the magnetic flakes 211 which are oriented to be parallel to the surface 213 of the paint layer 205 in the region C appears as a line figure in a shape of the arabic numeral figure "1".

In addition, as indicated in FIG. 27C and FIG. 27D, the region C in a shape of the arabic numeral figure "1" has the magnetic flakes 211 oriented to be substantially parallel to the surface 213 of the paint layer 205 such that this region C appears as colored in white, while the regions B and D adjacent to the region C have the magnetic flakes 211 oriented to be oblique or perpendicular to the surface 213 of the paint layer 205 such that these regions B and D appear as colored in black. The regions A and E located around the regions B and D have the magnetic flakes 211 oriented at random, as the magnetic field strength is negligibly weak in these regions, such that these regions A and E appear as colored in gray.

Thus, by placing the magnet 215 with a line joining the N and S poles arranged parallel to the surface 213 of the paint layer 205 on the back side of the product body 203, it is possible to form the pattern 207 with the ridge portion formed by the magnetic flakes 211 which are oriented to be parallel to the surface 213 of the paint layer 205 appearing as a line figure in a shape of the arabic numeral figure "1".

Figure 30:
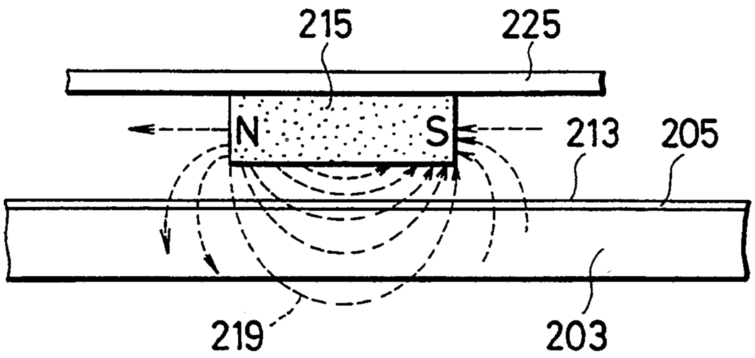
FIG. 30 is a schematic cross sectional view of an alternative arrangement of the magnet used in forming the desired pattern shown in FIG. 27A.

Referring now to FIG. 30, a case of forming the desired pattern 207 on the surface of the product body 203 as in the example described above, by using a positioning of the magnet 215 over the front surface of the product 201 will be described.

As shown in FIG. 30, in this case, the magnet 215 is supported by a magnet support member 225 and positioned above the surface 213 of the paint layer 205 formed on the product body 203, with a line joining the N and S poles arranged parallel to the surface 213 of the paint layer 205, such that it is also possible to form the pattern 207 with the ridge portion formed by the magnetic flakes 211 which are oriented to be parallel to the surface 213 of the paint layer 205 appearing as a line figure in a shape of the arabic numeral figure "1".

In this case, the appropriate size and position of the magnet 215 for forming the desired pattern on the front surface of the product 201 can be determined by regarding a distance between the magnet 201 and the surface 213 of the painted layer 205 provided on the front surface of the product 201 as a thickness of an imaginary product to be painted. Consequently, the position of the magnet 215 with respect to the paint layer 205 is not restricted by the thickness of the product 201.

This positioning of the magnet 215 above the product 201 is convenient in a case in which it is difficult to place the magnet 215 on the back side of the product 201 appropriately due to the complicated shape of the back side of the product 201 and/or because of the thickness of the product.

Figure 31:
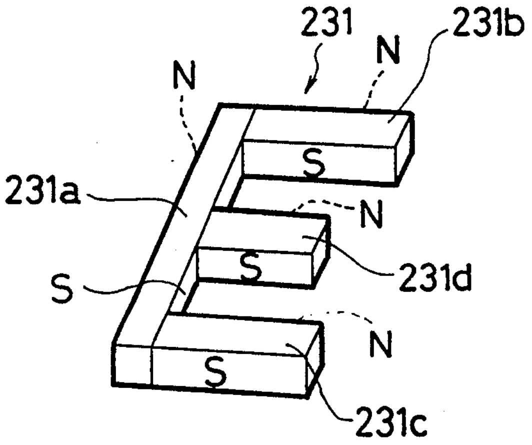
FIG. 31 is a perspective view of a magnet assembly to be used in forming the desired pattern in a shape of alphabetical letter figure "E" to be formed on the product.
Figure 32:
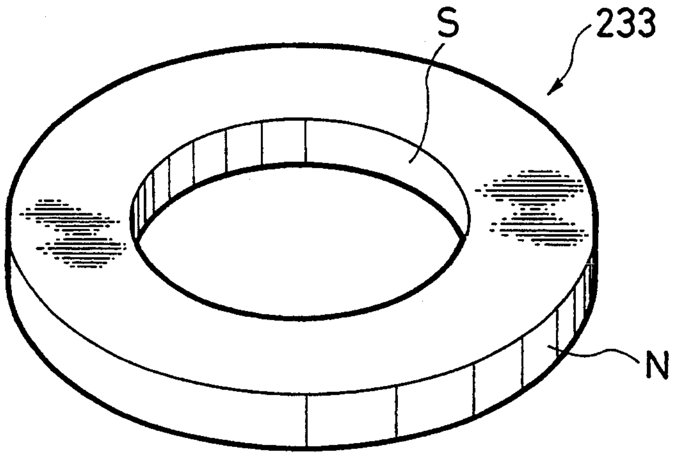
FIG. 32 is a perspective view of a magnet to be used in forming the desired ring shaped pattern to be formed on the product.

Referring now to FIG. 31 and FIG. 32, other examples of application of the present invention for the formation of a figure pattern which has more complicated shape than the arabic numeral figure "1" described above will be described in detail.

In the case shown in FIG. 31, the overall shape of the figure pattern is divided into a plurality of segments having relatively simple shape, such that each segment can be formed by using a simple block shaped magnet in a manner similar to the case of forming the arabic numeral figure "1" described above.

Namely, in a case of forming a pattern in a shape of an alphabetical letter figure "E", the overall shape of this alphabetical letter figure "E" can be divided into four straight line segments such that these line segments can be formed by the magnet 231 comprising four separate block shaped magnet pieces 231*a*, 231*b*, 231*c*, and 231*d*, which are to be assembled together in a shape of the alphabetical letter figure "E", as shown in FIG. 31.

Each of the block shaped magnet pieces 231*a*, 231*b*, 231*c*, and 231*d* has a line joining the N and S poles arranged parallel to the surface of the paint layer, such that it is also possible to form the corresponding line segment with the ridge portion formed by the magnetic flakes which are oriented to be parallel to the surface of the paint layer. Here, the adjacently arranged magnet pieces 231*b* and 231*d*, and 231*d* and 231*c* have the opposite poles facing against each other.

In a case of forming a ring shaped pattern, the ring shaped planar magnet 233 having the S pole on the inner circumference side and the N pole on the outer circumference side as shown in FIG. 32 can be used. By placing this ring shaped planar magnet 233 on either the front or back side of the product with a line joining the N and S poles arranged parallel to the surface of the paint layer, it is also possible to form the ring shaped pattern with the circular ridge portion formed by the magnetic flakes which are oriented to be parallel to the surface of the paint layer.

It is to be noted that, as in the examples described earlier, it is equally possible to achieve the similar formation of the desired pattern by forming the paint layer on the front surface of the product first, and then applying the magnetic field by the magnet while the painted layer maintains its fluidity so that the magnetic flakes contained within the paint layer can change their orientations according to the applied magnetic field.

Figure 33:
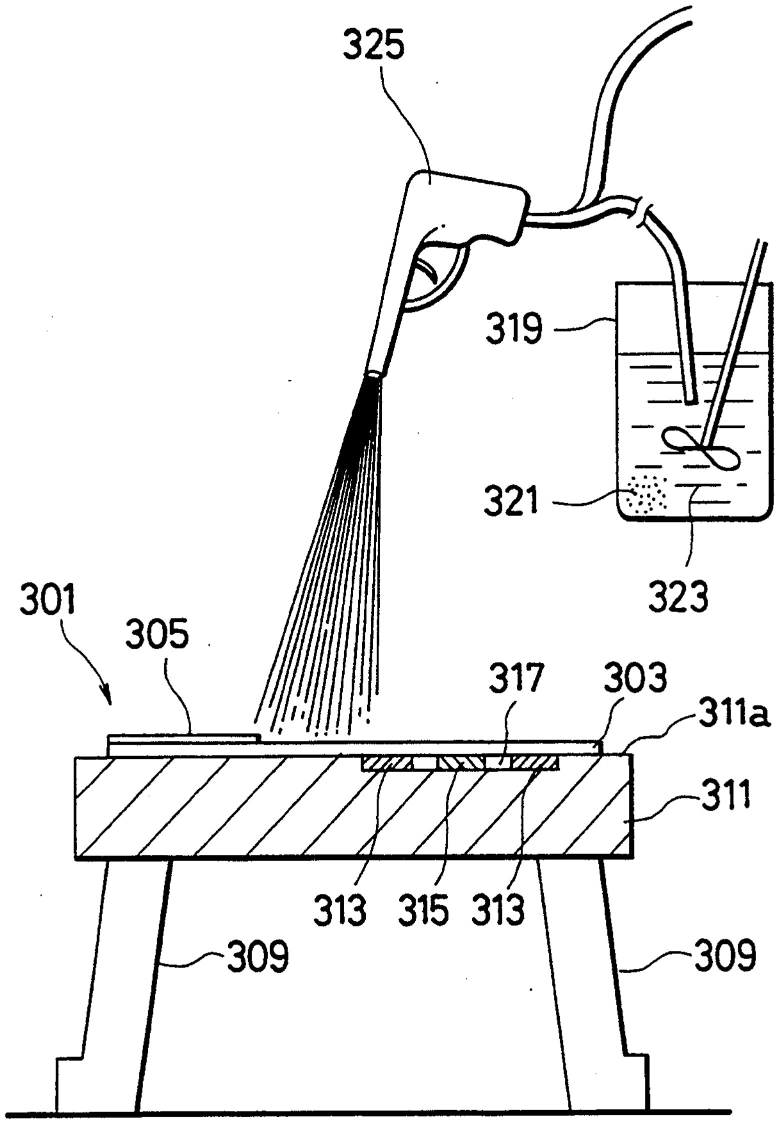
FIG. 33 is a schematic cross sectional view of an apparatus for forming a paint layer on the product with various desired pattern shown in FIG. 34B.

Referring now to FIG. 33, other configuration of the magnets for forming the desired pattern on the product according to the present invention, which are suitable for the formation of more complicated patterns will be described in detail.

In this case, the product 301 comprises a product body 303 made of a plastic material which is formed in a substantially flat shape, .and a paint layer 305 formed thereon. Here, to be substantially flat means it is curved by a radius of curvature greater than about 100 mm.

The apparatus for forming the paint layer 305 on the product body 303 in this case has a configuration shown in FIG. 33, which comprises: a base frame 309; a support member 311, made of non-magnetic material such as wood or plaster and fixed on the base frame 309, for supporting the back side of the product 301 mounted thereon, which has magnet mounting holes 317 provided on its upper surface 311a at locations corresponding to the desired patterns to be formed; first and second magnets 313 and 315 for forming the desired pattern on the paint layer 305 formed on the product body 303 during the painting process, which are mounted in the magnet mounting holes 317; a paint mixture container 319 for containing the paint mixture 323 having the magnetic flakes 321 mixed therein; and a spray gun 325 for spray painting the paint mixture contained in the paint mixture container 319 onto the front surface of the product body 303 to form the paint layer 305 uniformly thereon.

Figure 34A:
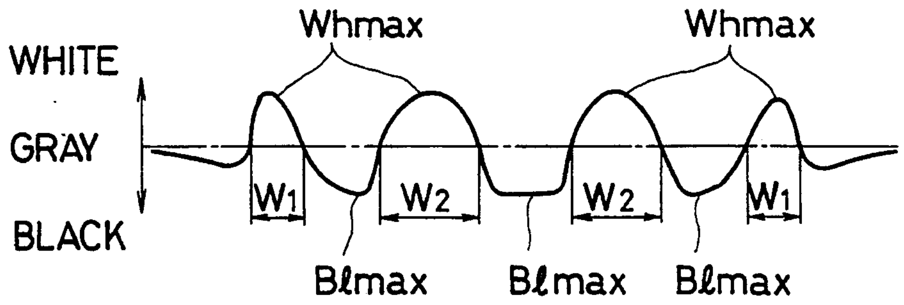
FIG. 34A is a diagram indicating the colors in which various parts of the desired pattern shown in FIG. 34B appear.
Figure 34B:
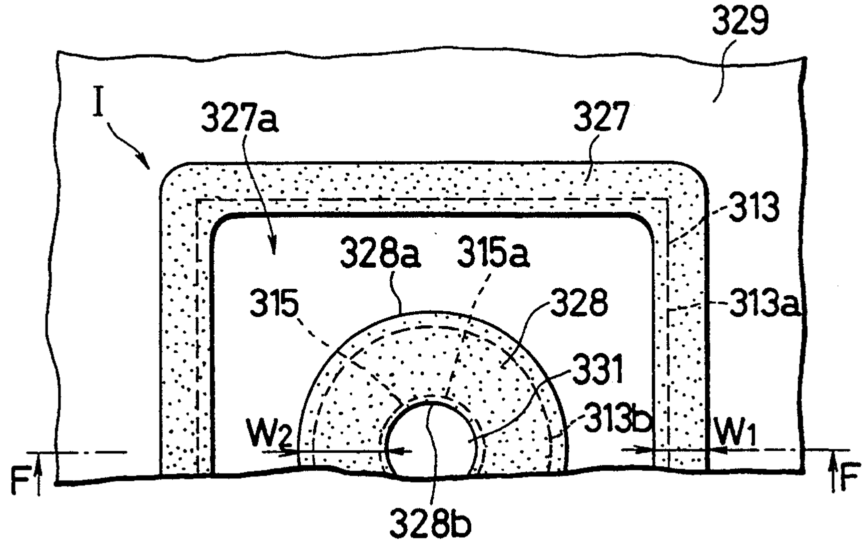
FIG. 34B is a top plan view of an example of a desired pattern to be formed on the product by using two magnets.
Figure 34C:
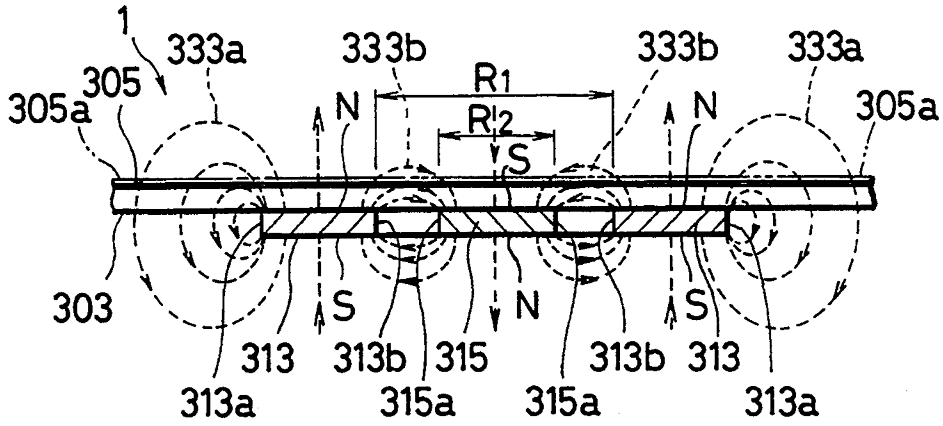
FIG. 34C is a cross sectional view along F—F line indicated in FIG. 34B.

Here, the first and second magnets 313 and 315 have configurations as shown in FIGS. 34B and 34C, where the first magnet 313 is a sheet rubber permanent magnet having an approximately doughnut like shape with a rectangular outer contour 313a and a circular inner contour 313b of a radius equal to R1, while the second magnet 315 is another sheet rubber permanent magnet having a disk like shape with a circular outer contour 315a of a radius equal to R2 (R2<R1) which is located inside the circular inner contour 313b of the first magnet 313 concentrically. Also, as shown in FIG. 34C, the first magnet 313 has the N pole side facing against the lower surface of the product body 303, while the second magnet 315 has the S pole side facing against the lower surface of the product body 303. This second magnet 315 functions to adjust the magnetic field produced by the first magnet 313 as will be described in detail later.

By using this apparatus of FIG. 33, the desired pattern can be formed on the product 301 by the following procedure.

First, the product 301 prepared by the injection molding and having a front surface colored in yellowing ivory color is mounted on the upper surface 311a of the support member 311 with the first and second magnets 313 and 315 placed in the magnet mounting holes 317.

In this state, the front surface of the product 301 is placed inside the magnetic fields produced by the first and second magnets 313 and 315 having the lines of magnetic force corresponding to the shapes of the desired patterns to be formed. Here, as shown in FIG. 34C, the lines of magnetic force 333a in a vicinity of the outer contour 313a of the first magnet 313 are oriented from the N pole side to the S pole side of the first magnet 313 at the paint layer 305, while the lines of magnetic force 333b in a vicinity of the region between the inner contour 313b of the first magnet 313 and the outer contour 315a of the second magnet 315 are oriented from the N pole side of the first magnet 313 to the S pole side of the second magnet 315 at the paint layer 305. The positions at which the lines of magnetic force 333a and 333b are oriented to be parallel to the surface of the paint layer 305 correspond to the ridge portions of the contours 327 and 328 of the pattern I shown in FIG. 34B.

Then, the paint layer 305 is formed uniformly on the front surface of the product 301 by the spray painting from the spray gun 325 of the paint mixture 323 prepared from the paint medium with the magnetic flakes 321 uniformly mixed by using volatile solvent, such that the desired pattern I including the contours 327 and 328 can be formed on the paint layer 305 as the magnetic flakes 321 in the paint layer 305 change their orientations according to the lines of magnetic force 333a and 333b due to the magnetic fields produced by the magnets 313 and 315, according to the principle of the present invention as described above.

After waiting for the volatile solvent in the paint mixture 323 to volatilize such that the orientations of the magnetic flakes 321 can be fixed in the paint layer 305, the product 301 is dismounted from the support member 311 and the paint layer 305 is fully solidified by using an appropriate solidification method. Then, the transparent top coat layer 305a is formed on the surface of the paint layer 305 uniformly by the spray painting.

Referring now to FIGS. 34A, 34B, and 34C, further detail of the formation of the desired pattern I will be described.

Here, as shown in FIG. 34B, the desired pattern I in this case includes the outer contour 327 and the inner contour 328 which have the widths W1 and W2, respectively.

FIG. 34A indicates the color in which different parts of the pattern I along F—F line depicted in FIG. 34B appear, where the middle line corresponds to the gray color of the product body 303 itself, and those portions above the middle line appear as colored in white and convexed in contrast to the surrounding portions, while those portions below the middle line appear as colored in black and concave in contrast to the surrounding portions. Thus, the outer and inner contours 327 and 328 appear as colored in white and convexed, while a region 327a between the outer and inner contours 327 and 328 as well as a region 331 inside the inner contour 328 appear as colored in black and concave, and a region 329 outside of the outer contour 327 appears as colored in gray. Also, as indicated in FIG. 34A, the portions Whmax which appear most brightly white are located at the ridge portions of the outer and inner contours 327 and 328, while the portions Blmax which appear most darkly black are located at middles of the regions 327a and 331. Consequently, the pattern I has the three dimensional perspective as the outer and inner contours 327 and 328 appear as if they are projected out of the surface of the product body 303 while the regions immediately surrounding these outer and inner contours 327 and 328 appear as if they are engraved into the surface of the product body 303, in contrast to the gray background formed by the surface of the product body 303 elsewhere.

Now, with reference to FIGS. 35A and 35B, further detail of the formation of the inner contour 328 by the first and second magnets 313 and 315 will be described.

Figure 35A:
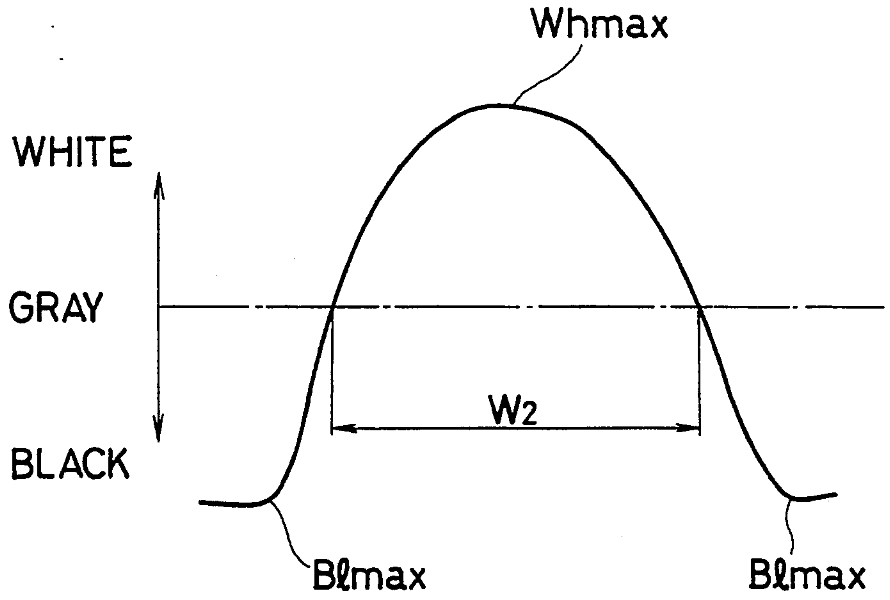
FIGS. 35A and 35B are mutually corresponding enlarged views of a main portion in FIGS. 34A and 34C.
Figure 35B:
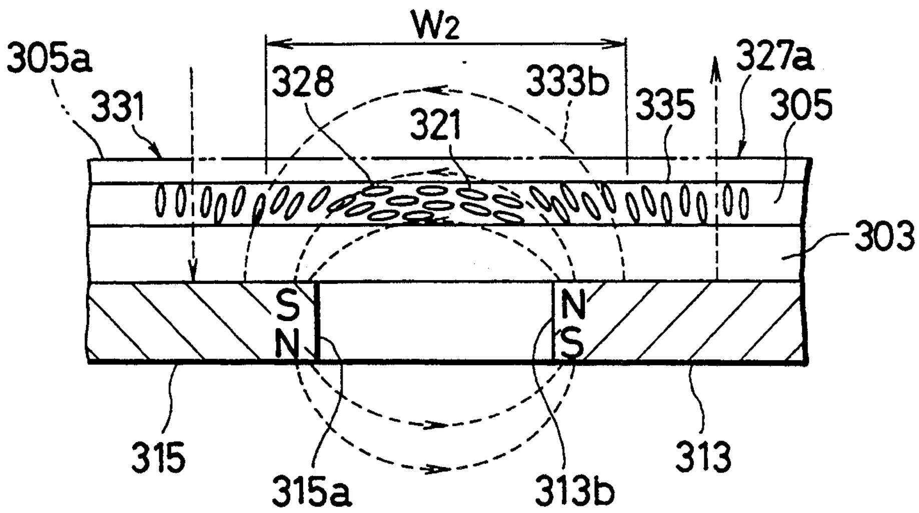

FIGS. 35A and 35B show enlarged views of mutually corresponding main portion in FIGS. 34A and 34C around one part of the inner contour 328, respectively, where the sizes of the magnetic flakes 321 in the paint layer 305 are exaggerated for the purpose of easier comprehension.

As shown in FIG. 35B, at a center of the inner contour 328, the magnetic flakes 321 in the paint layer 305 are oriented along the lines of magnetic force **333*b* which are oriented to be parallel to the surface 335 of the paint layer 305, so that the most brightly white part Whmax is formed as the ridge portion at the center of the inner contour 328. On the other hand, in the regions 327*a* and 331, the magnetic flakes 321 in the paint layer 305 are oriented along the lines of magnetic force 333*b* which are oriented to be substantially perpendicular to the surface 325 of the paint layer 305, so that these regions 327*a* and 331 appear as colored in black. Although not shown in FIG. 35B, in the region 329, the magnetic flakes 321 in the paint layer 305** are oriented at random, as the magnetic field strength is negligibly weak there.

Figure 36A:
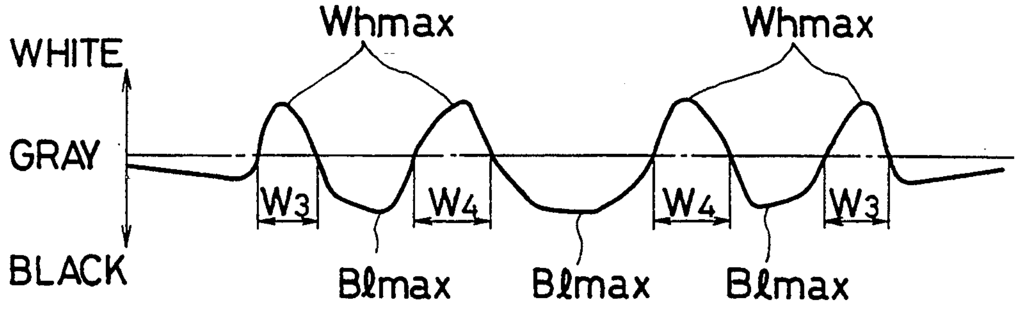
FIG. 36A is a diagram indicating the colors in which various parts of a pattern shown in FIG. 36B appear.
Figure 36B:
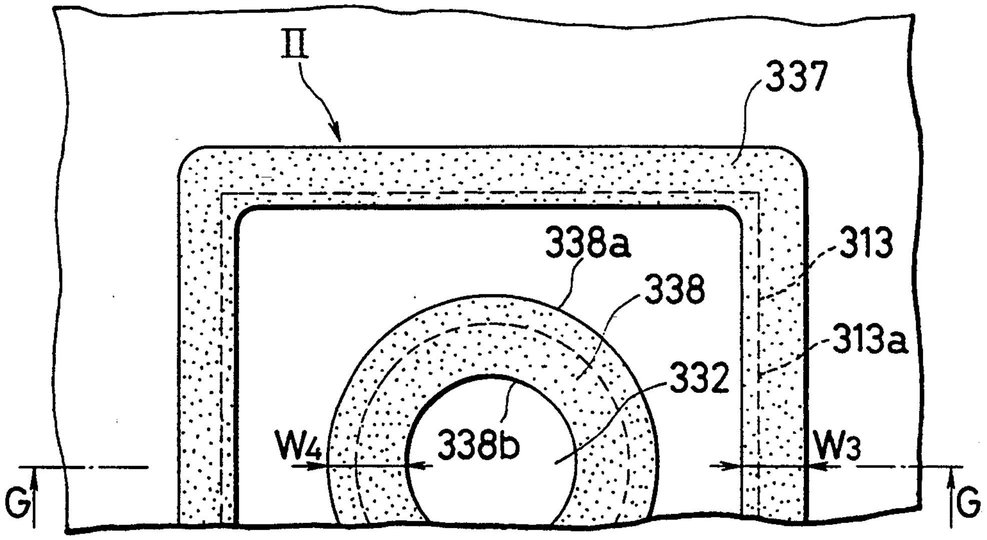
FIG. 36B is a top plan view of a pattern to be formed on the product by using only one magnet.
Figure 36C:
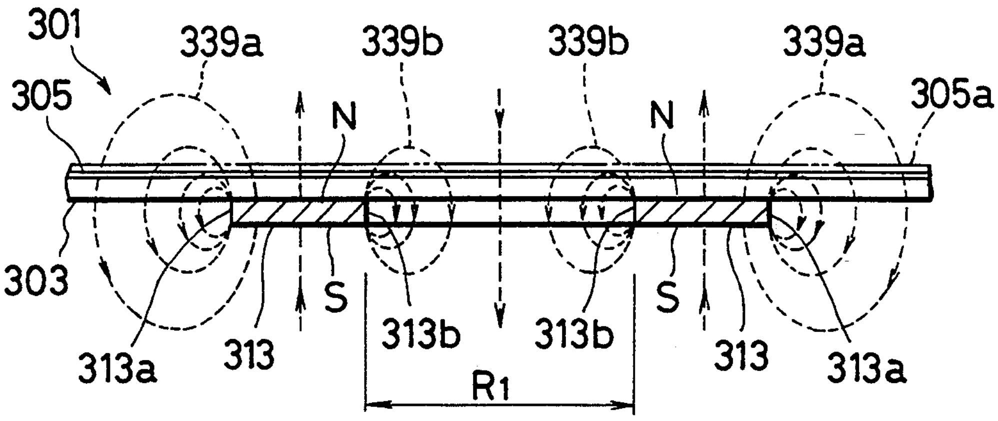
FIG. 36C is a cross sectional view along G—G line indicated in FIG. 36B.

Now, with reference to FIGS. 36A to 36C in contrast to FIGS. 34A to 34C described above, the difference between a case of forming the pattern by using two magnets as shown in FIGS. 34A to 34C and a case of forming the pattern by using only one magnet as shown in FIGS. 36A to 36C is described.

FIGS. 36A to 38C show a case of forming the pattern II including an outer contour 337 and an inner contour 338, which have the widths W3 and W4, respectively, as shown in FIG. 36B, by using only the first magnet 313 as shown in FIG. 36C.

FIG. 36A indicates the color in which different parts of the pattern II along G—G line depicted in FIG. 36B appear, where the middle line corresponds to the gray color of the product body 303 itself, and those portions above the middle line appear as colored in white and convexed in contrast to the surrounding portions, while those portions below the middle line appear as colored in black and concave in contrast to the surrounding portions.

Here, as indicated in FIG. 36A, the outer and inner contours 337 and 338 appear as colored in white and convexed, while a region between the outer and inner contours 337 and 338 as well as a region inside the inner contour 338 appear as colored in black and concave, and a region outside of the outer contour 337 appears as colored in gray, similarly to the case shown in FIGS. 34A to 34C.

Also, as indicated in FIG. 36C, the lines of magnetic force **339*a* in a vicinity of the outer contour 313*a* of the first magnet 313 as well as the lines of magnetic force 339*b* in a vicinity of the inner contour 313*b* of the first magnet 313 are oriented from the N pole side to the S pole side of the first magnet 313 at the paint layer 305, in contrast to the lines of magnetic field 333*a* and 333*b* shown in FIG. 34C**.

By comparing the cases shown in FIGS. 34A to 34C and FIGS. 36A to 36C, it can be noticed that the outer contours 327 and 337 are formed almost similarly in these cases such that the width W1 of the outer contour 327 is almost the same as the width W3 of the outer contour 337. This is probably due to the fact that the magnetic field produced by the second magnet 315 has very little contribution to the formation of the outer contour 327 so that the lines of magnetic field **333*a* are almost identical to the lines of magnetic field 339*a***.

On the other hand, it can also be noticed that the inner contour 328 has more sharply defined outer and inner edges **328*a* and 328*b* compared with outer and inner edges 338*a* and 338*b* of the inner contour 338 as can be seen by comparing FIG. 34A and FIG. 36A. In addition, the width W2 of the inner contour 328 is wider than the width W4 of the inner contour 388. These differences are probably caused by the fact that the magnetic field produced by the second magnet 315 has significant contribution to the formation of the inner contour 328 so that the lines of magnetic field 333*b* are significantly different from the lines of magnetic field 339*b***.

Namely, by placing the second magnet 315 inside the inner edge **313*a* of the first magnet 313 in the configuration as shown in FIG. 34C, the lines of magnetic field 333*b* are flattened down compared with the lines of magnetic force 339*b*, such that there are more magnetic flakes 321 located in wider region which are oriented to be substantially perpendicular to the surface of the paint layer 305 in a case shown in FIGS. 34A to 34C. The exact value for the width W2 of the inner contour 328 depends on the inner radius R1 of the first magnet 313 and the outer radius R2 of the second magnet 315, where the width W2 is widened as the outer radius R2 of the second magnet 315 becomes smaller whereas the width W2 is narrowed as the outer radius R2 of the second magnet 315 becomes larger, while the inner radius of the first magnet 313** is fixed.

Thus, by using two magnets as in a case shown in FIGS. 34A to 34C, it becomes possible to have the desired pattern with different width and more sharply defined edges for the contour in the pattern.

Figure 37A:
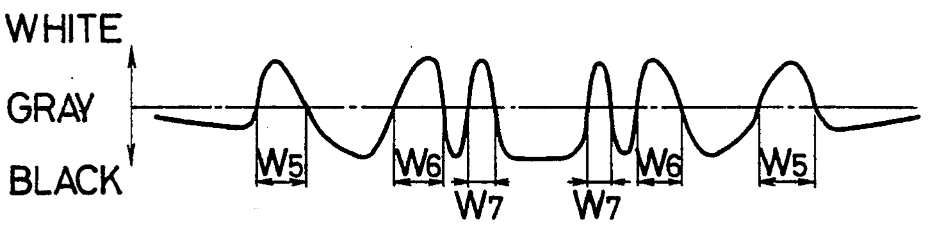
FIG. 37A is a diagram indicating the colors in which various parts of the desired pattern shown in FIG. 37B appear.
Figure 37B:
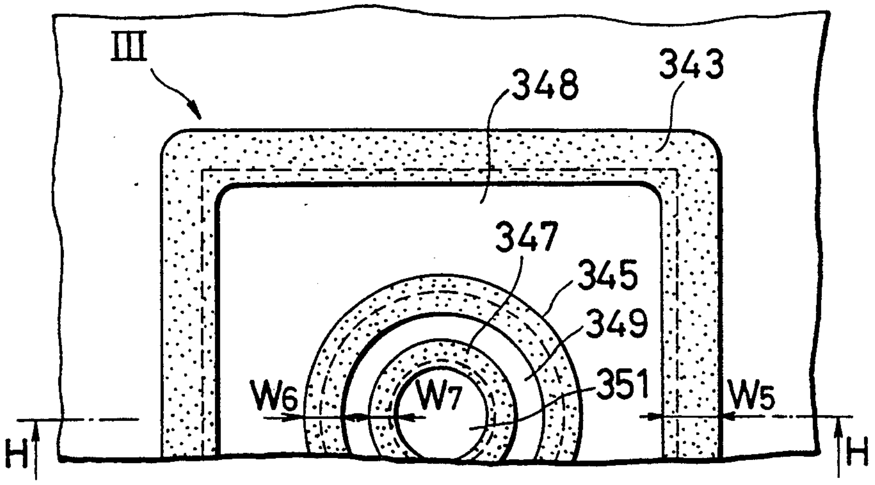
FIG. 37B is a top plan view of another example of a desired pattern to be formed on the product by using two magnets.
Figure 37C:
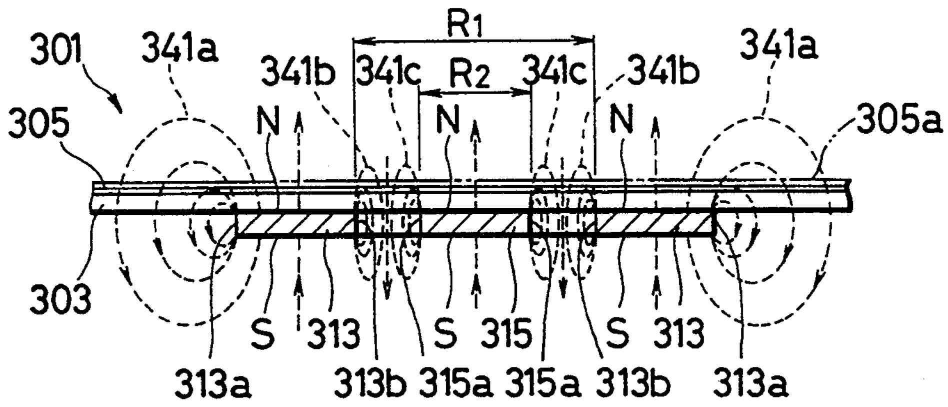
FIG. 37C is a cross sectional view along H—H line indicated in FIG. 37B.

Referring now to FIGS. 37A to 37C, other configurations of the magnets for forming the desired pattern on the product according to the present invention, which are suitable for the formation of more complicated patterns will be described in detail.

Here, the procedure and apparatus for forming the desired pattern are similar to those described above in conjunction with FIG. 33, except that the first and second magnets 313 and 315 have configurations as shown in FIGS. 37B and 37C, where the first magnet 313 has the N pole side facing against the lower surface of the product body 303, while the second magnet 315 also has the N pole side facing against the lower surface of the product body 303.

Consequently, as shown in FIG. 37C, the lines of magnetic force **341*a* in a vicinity of the outer contour 313*a* of the first magnet 313 are oriented from the N pole side to the S pole side of the first magnet 313 at the paint layer 305, while in a vicinity of the region between the inner contour 313*b* of the first magnet 313 and the outer contour 315*a* of the second magnet 315, there are lines of magnetic field 341*b* which are oriented from the N pole side to the S pole side of the first magnet 313 at the paint layer 305 and the lines of magnetic force 341*c* which are oriented from the N pole side to the S pole side of the second magnet 315 at the paint layer 305. The positions at which the lines of magnetic force 341*a*, 341*b*, and 341*c* are oriented to be parallel to the surface of the paint layer 305 correspond to the ridge portions of the contours 343, 345, and 347 of the pattern III shown in FIG. 37B**.

Now, further detail of the formation of the desired pattern III will be described.

Here, as shown in FIG. 37B, the desired pattern III in this case includes the outer contour 343, the middle contour 345, and the inner contour 347 which have the widths W5, W6, and W7, respectively.

FIG. 37A indicates the color in which different parts of the pattern III along H—H line depicted in FIG. 37B appear, where the middle line corresponds to the gray color of the product body 303 itself, and those portions above the middle line appear as colored in white and convexed in contrast to the surrounding portions, while those portions below the middle line appear as colored in black and concave in contrast to the surrounding portions. Thus, the outer, middle, and inner contours 343, 345, and 347 appear as colored in white and convexed, while a region 348 between the outer and middle contours 343 and 345, a region 349 between the middle and inner contours 345 and 347, and a region 351 inside the inner contour 347 appear as colored in black and concave, and a region outside of the outer contour 343 appears as colored in gray. Consequently, the pattern III has the three dimensional perspective as the outer, middle, and inner contours 343, 345, and 347 appear as if they are projected out of the surface of the product body 303 while the regions immediately surrounding these outer, middle, and inner contours 343, 345, and 347 appear as if they are engraved into the surface of the product body 303, in contrast to the gray background formed by the surface of the product body 303 elsewhere.

Now, further detail of the formation of the middle and inner contours 345 and 347 by the first and second magnets 313 and 315 will be described.

Here, at a center of the middle and inner contours 345 and 347, the magnetic flakes in the paint layer 305 are oriented along the lines of magnetic force **341*b* and 341*c* which are oriented to be parallel to the surface of the paint layer 305, so that the ridge portions are formed at the centers of the middle and inner contours 345 and 347. On the other hand, in the regions 349 and 351, the magnetic flakes in the paint layer 305 are oriented along the lines of magnetic force 341*b* and 341*c* which are oriented to be substantially perpendicular to the surface of the paint layer 305, so that these regions 349 and 351 appear as colored in black. Also, in the region outside of the outer contour 343, the magnetic flakes in the paint layer 305** are oriented at random, as the magnetic field strength is negligibly weak there.

Now, with reference to FIGS. 37A to 37C in contrast to FIGS. 36A to 36C described above, the difference between a case of forming the pattern by using two magnets as shown in FIGS. 37A to 37C and the above described case of forming the pattern by using only one magnet as shown in FIGS. 36A to 36C is described.

By comparing the cases shown in FIGS. 37A to 37C and FIGS. 36A to 36C, it can be noticed that the outer contours 343 and 337 are formed almost similarly in these cases such that the width W5 of the outer contour 343 is almost the same as the width W3 of the outer contour 337. This is probably due to the fact that the magnetic field produced by the second magnet 315 has very little contribution to the formation of the outer contour 343 so that the lines of magnetic field **341*a* are almost identical to the lines of magnetic field 339*a***.

On the other hand, inside the outer contours 343 and 337, it can also be noticed that the case of FIGS. 37A to 37C has two contours of the middle and inner contours 345 and 347 in contrast to the only one inner contour 338 in the case of FIGS. 36A to 36C. Moreover, the middle and inner contours 345 and 347 have more sharply defined outer and inner edges compared with outer and inner edges **338*a* and 338*b* of the inner contour 338, as can be seen by comparing FIG. 36A and FIG. 37A. In addition, each of the widths W6 and W7 of the middle and inner contours 345 and 347 are narrower than the width W4 of the inner contour 338. These differences are probably caused by the fact that the magnetic field produced by the second magnet 315 has significant contribution to the formation of the middle and inner contours 345 and 347 so that the lines of magnetic field 341*b* and 341*c* are significantly different from the lines of magnetic field 339*b***.

Namely, by placing the second magnet 315 inside the inner edge **313*a* of the first magnet 313 in the configuration as shown in FIG. 37C, two sets of the lines of magnetic field 341*b* and 341*c* are formed between the first and second magnets 313 and 315, compared with the only one set of the lines of magnetic force 339*b*, such that the magnetic flakes in the paint layer 305 above the region between the first and second magnets 313 and 315 are oriented to be substantially parallel to the surface of the paint layer 305 at two locations, with narrower width at each location, in a case shown in FIGS. 37A to 37C. The exact values for the widths W6 and W7 of the middle and inner contours 345 and 347 depend on the inner radius R1 of the first magnet 313 and the outer radius R2 of the second magnet 315, where the widths W8 and W7 are widened as the outer radius R2 of the second magnet 315 becomes smaller whereas the widths W8 and W7 are narrowed as the outer radius R2 of the second magnet 315 becomes larger, while the inner radius R1 of the first magnet 313** is fixed.

Thus, by using two magnets as in a case shown in FIGS. 37A to 37C, it becomes possible to have the desired pattern with the contour in double line, and more sharply defined edges for the contour in the pattern.

Figure 38A:
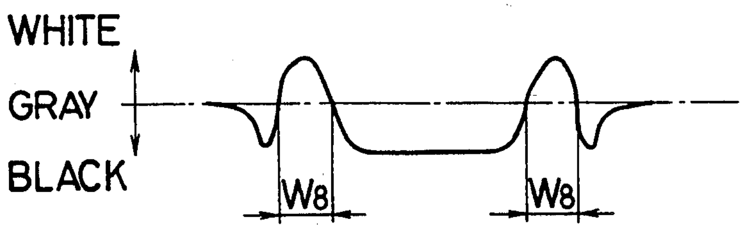
FIG. 38A is a diagram indicating the colors in which various parts of the desired pattern shown in FIG. 38B appear.
Figure 38B:
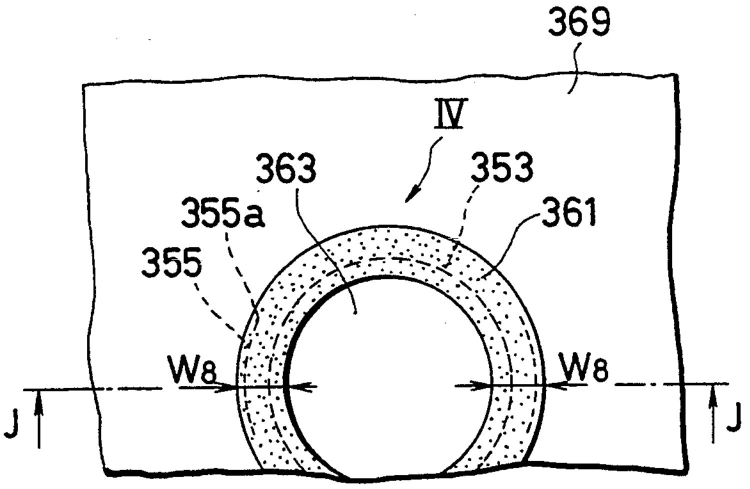
FIG. 38B is a top plan view of an example of a desired pattern to be formed on the product by using a magnet and a magnetic field adjustment member.
Figure 38C:
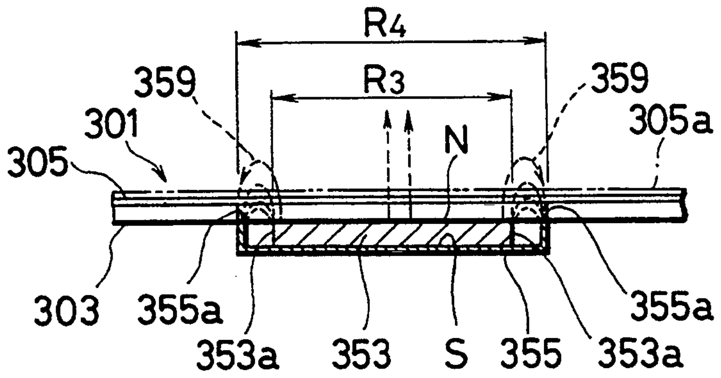
FIG. 38C is a cross sectional view along J—J line indicated in FIG. 38B.

Referring now to FIGS. 38A to 38C, other configuration of the magnets for forming the desired pattern on the product according to the present invention, which are suitable for the formation of more complicated patterns will be described in detail.

Here, the procedure and apparatus for forming the desired pattern are similar to those described above in conjunction with FIG. 33, except that instead of the first and second magnets 313 and 315, a magnet 353 and a magnetic field adjustment member 355 are used. Here, as shown in FIGS. 38B and 38C, the magnet 353 is a sheet rubber permanent magnet having an approximately disk like shape with a circular outer contour **335*a* of a radius equal to R3, and this magnet 353 has the N pole side facing against the lower surface of the product body 303. On the other hand, the magnetic field adjustment member 355 is a plate shaped magnetic material such as an iron plate having a disk like shape with a circular outer contour 355*a* of a radius equal to R4 (R4>R3) in a form of a rim portion turned upwards, which is attached over the magnet 353 concentrically on the lower surface of the product body 303 such that the edge of the circular outer contour 335*a* makes a contact with the lower surface of the product body 303**.

Consequently, as shown in FIG. 38C, the lines of magnetic force 359 in a vicinity of the outer contour **353*a* of the magnet 353 are oriented from the N pole side to the rim portion of the magnetic field adjustment member 355 at the paint layer 305. The positions at which the lines of magnetic force 359 are oriented to be parallel to the surface of the paint layer 305 correspond to the ridge portions of the contour 361 of the pattern IV shown in FIG. 38B**.

Now, further detail of the formation of the desired pattern IV will be described.

Here, as shown in FIG. 38B, the desired pattern IV in this case includes the contour 361 which has the width W8.

FIG. 38A indicates the color in which different parts of the pattern IV along J—J line depicted in FIG. 38B appear, where the middle line corresponds to the gray color of the product body 303 itself, and those portions above the middle line appear as colored in white and convexed in contrast to the surrounding portions, while those portions below the middle line appear as colored in black and concave in contrast to the surrounding portions. Thus, the contour 361 appears as colored in white and convexed, while a region 363 inside the contour 361 appears as colored in black and concave, and a region 369 outside of the contour 361 appears as colored in gray. Consequently, the pattern IV has the three dimensional perspective as the contour 361 appears as if it is projected out of the surface of the product body 303 while the region immediately surrounding the contour 361 appears as if it is engraved into the surface of the product body 303, in contrast to the gray background formed by the surface of the product body 303 elsewhere.

Here, at a center of the contour 361, the magnetic flakes in the paint layer 305 are oriented along the lines of magnetic force 359 which are oriented to be parallel to the surface of the paint layer 305, so that the ridge portions are formed at the centers of the contour 361. On the other hand, in the region 363 inside the contour 361, the magnetic flakes in the paint layer 305 are oriented along the lines of magnetic force which are oriented substantially perpendicular to the surface of the paint layer 305, so that the region 363 appears as colored in black. Also, in the region 369 outside of the contour 361, the magnetic flakes in the paint layer 305 are oriented at random, as the magnetic field strength is negligibly weak there.

Figure 39A:
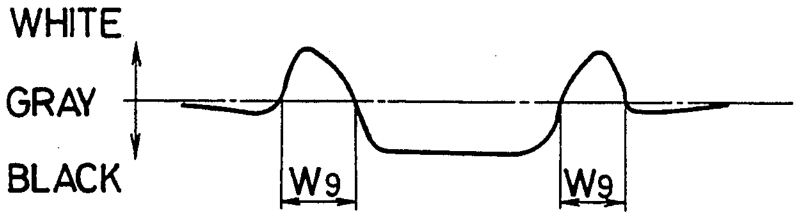
FIG. 39A is a diagram indicating the colors in which various parts of a pattern shown in FIG. 39B appear.
Figure 39B:
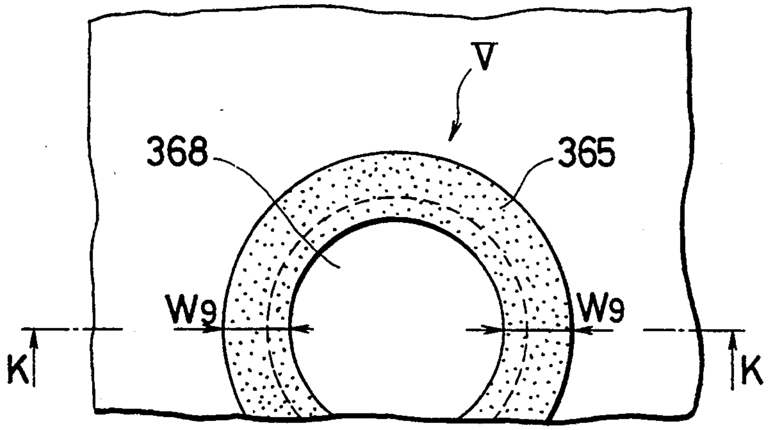
FIG. 39B is a top plan view of a pattern to be formed on the product by using a magnet alone.
Figure 39C:
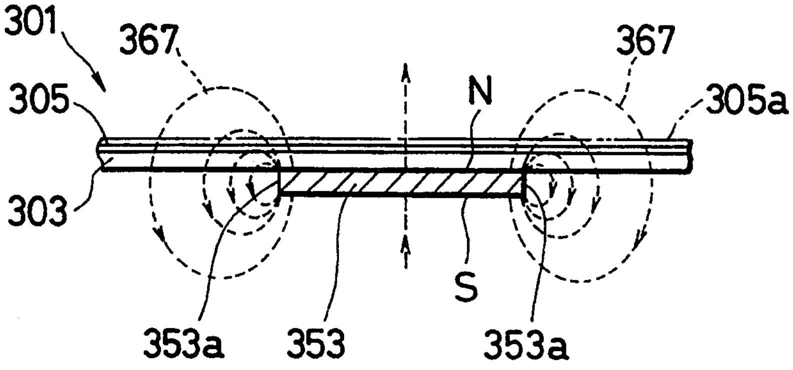
FIG. 39C is a cross sectional view along K—K line indicated in FIG. 39B.

Now, with reference to FIGS. 39A to 39C in contrast to FIGS. 38A to 38C described above, the difference between a case of forming the pattern by using the magnetic field adjustment member 355 along with the magnet 353 as shown in FIGS. 38A to 38C and the case of forming the pattern by using only the magnet 353 as shown in FIGS. 39A to 39C is described.

FIGS. 39A to 39C show a case of forming the pattern V including a contour 365 which has the widths W9, as shown in FIG. 39B, by using only the magnet 353 as shown in FIG. 39C.

FIG. 39A indicates the color in which different parts of the pattern V along K—K line depicted in FIG. 39B appear, where the middle line corresponds to the gray color of the product body 303 itself, and those portions above the middle line appear as colored in white and convexed in contrast to the surrounding portions, while those portions below the middle line appear as colored in black and concave in contrast to the surrounding portions.

Here, as indicated in FIG. 39A, the contours 365 appears as colored in white and convexed, while a region 368 inside the contour 365 appears as colored in black and concave, and a region outside of the contour 365 appears as colored in gray, similarly to the case shown in FIGS. 38A to 38C.

Also, as indicated in FIG. 39C, the lines of magnetic force 367 in a vicinity of the outer contour 353*a* of the magnet 353 are oriented from the N pole side to the S pole side of the magnet 353 at the paint layer 305, in contrast to the lines of magnetic field 359 shown in FIG. 38C.

By comparing the cases shown in FIGS. 38A to 38C and FIGS. 39A to 39C, it can be noticed that the contour 361 has more sharply defined outer and inner edges compared with outer and inner edges of the contour 365, as can be seen by comparing FIG. 38A and FIG. 39A. In addition, the width W8 of the contour 361 is narrower than the width W9 of the contour 365. These differences are probably caused by the fact that the adjustment of the magnetic field by the magnetic field adjustment member 355 has significant contribution to the formation of the contour 361 so that the lines of magnetic field 359 are significantly different from the lines of magnetic field 367.

Namely, by attaching the magnetic field adjustment member 355 over the magnet 353 in the configuration as shown in FIG. 38C, the position of the S pole is effectively displaced to the edge of the rim portion of the magnetic field adjustment member 355, such that the magnetic flakes in the paint layer 305 in a vicinity of the outer contour 353*a* of the magnet 353 are oriented to be substantially parallel to the surface of the paint layer 305 within narrower width, in a case shown in FIGS. 38A to 38C. The exact value for the width W8 of the contour 361 depends on the outer radius R3 of the magnet 353 and the outer radius R4 of the magnetic field adjustment member 355, where the width W8 is narrowed as the outer radius R4 of the magnetic field adjustment member 355 becomes smaller whereas the width W8 is widened as the outer radius R4 of the magnetic field adjustment member 355 becomes larger, while the outer radius R3 of the magnet 353 is fixed.

Thus, by using the magnetic field adjustment member along with the magnet as in a case shown in FIGS. 38A to 38C, it becomes possible to have the desired pattern with different width and more sharply defined edges for the contour in the pattern.

Figure 40A:
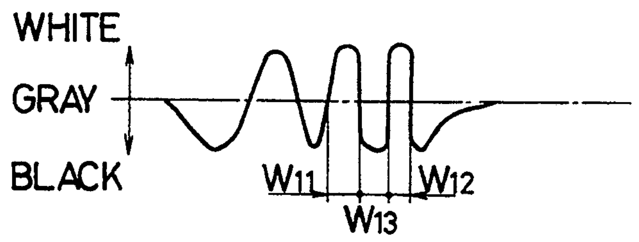
FIG. 40A is a diagram indicating the colors in which various parts of the desired pattern shown in FIG. 40B appear.
Figure 40B:
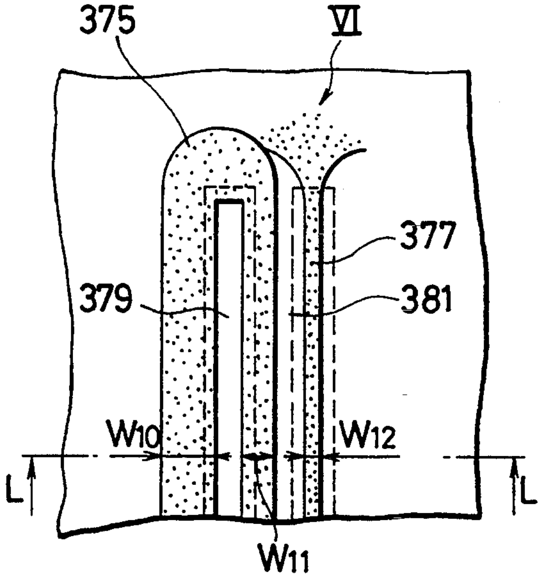
FIG. 40B is a top plan view of another example of a desired pattern to be formed on the product by using two magnets.
Figure 40C:
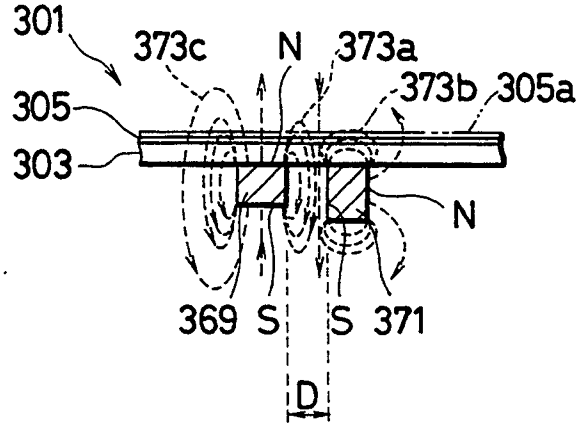
FIG. 40C is a cross sectional view along L—L line indicated in FIG. 40B.

Referring now to FIGS. 40A to 40C, other configurations of the magnets for forming the desired pattern on the product according to the present invention, which are suitable for the formation of more complicated patterns will be described in detail.

Here, the procedure and apparatus for forming the desired pattern are similar to those described above in conjunction with FIG. 33, except that instead of the first and second magnets 313 and 315, a first magnet 369 and a second magnet 371 are used. Here, as shown in FIGS. 40B and 40C, the magnet 369 is a rod shaped permanent magnet having the N pole side facing against the lower surface of the product body 303, while the second magnet 371 is another rod shaped permanent magnet having a line joining the N pole and the S pole parallel to the lower surface of the product body 303, which is located at a prescribed distance D away from the first magnet 369. This second magnet 371 functions to adjust the magnetic field produced by the first magnet 369 as will be described in detail later.

Consequently, as shown in FIG. 40C, the lines of magnetic force 373*c* in a vicinity of an outer side of the first magnet 369 located away from the second magnet 371 are oriented from the N pole side to the S pole side of the first magnet 369 at the paint layer 305, while in a vicinity of the region between the inner side of the first magnet 369 and the S pole side of the second magnet 371, there are lines of magnetic field 373*a* which are oriented from the N pole side to the S pole side of the first magnet 369 at the paint layer 305 and the lines of magnetic force 373*b* which are oriented from the N pole side to the S pole side of the second magnet 371 at the paint layer 305, where the lines of magnetic force 373*a* and the lines of magnetic force 373*b* are mutually crossing with respect to each other. The positions at which the lines of magnetic force 373*a*, 373*b*, and 373*c* are oriented to be parallel to the surface of the paint layer 305 correspond to the ridge portions of the contours 375 and 377 of the pattern VI shown in FIG. 40B.

Now, further detail of the formation of the desired pattern VI will be described.

Here, as shown in FIG. 40B, the desired pattern VI in this case includes the first contour 375 having an outer part with the width W10 and an inner part with the width W11, and the second contour 377 which have the width W12.

FIG. 40A indicates the color in which different parts of the pattern VI along line L—L depicted in FIG. 40B appear, where the middle line corresponds to the gray color of the product body 303 itself, and those portions above the middle line appear as colored in white and convexed in contrast to the surrounding portions, while those portions below the middle line appear as colored in black and concave in contrast to the surrounding portions. Thus, the first and second contours 375 and 377 appear as colored in white and convexed, while a region 348 between the outer and middle contours 343 and 345, a region 379 between the outer part and the inner part of the first contour 375, and a region 381 between the inner part of the first contour 375 and the second contour 377 appear as colored in black and concave, and a region outside of the outer part of the first contour 375 and the second contour 377 appear as colored in gray. Consequently, the pattern VI has the three dimensional perspective as the first and second contours 375 and 377 appear as if they are projected out of the surface of the product body 303 while the regions immediately surrounding these first and second contours 375 and 377 appear as if they are engraved into the surface of the product body 303, in contrast to the gray background formed by the surface of the product body 303 elsewhere.

Now, further detail of the formation of the first and second contours 375 and 377 by the first and second magnets 369 and 371 will be described.

Here, at a center of the first and second contours 375 and 377, the magnetic flakes in the paint layer 305 are oriented along the lines of magnetic force 373*a*, 373*b*, and 373*c* which are oriented to be parallel to the surface of the paint layer 305, so that the ridge portions are formed at the centers of the first and second contours 375 and 377. On the other hand, in the regions 379 and 381, the magnetic flakes in the paint layer 305 are oriented along the lines of magnetic force 373*a*, 373*b* and 373*c* which are oriented to be substantially perpendicular to the surface of the paint layer 305, so that these regions 379 and 381 appear as colored in black. Also, in the region outside of the first and second contours 375 and 377, the magnetic flakes in the paint layer 305 are oriented at random, as the magnetic field strength is negligibly weak there.

Figure 41A:
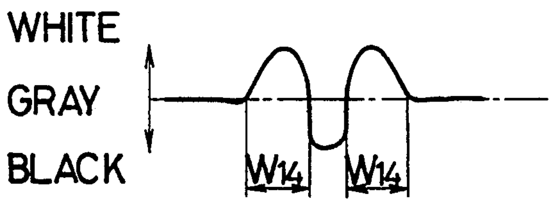
FIG. 41A is a diagram indicating the colors in which various parts of a pattern shown in FIG. 41B appear.
Figure 41B:
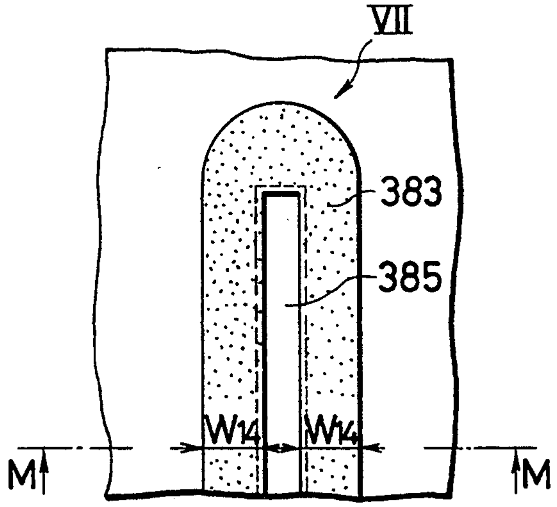
FIG. 41B is a top plan view of another pattern to be formed on the product by using only one magnet.
Figure 41C:
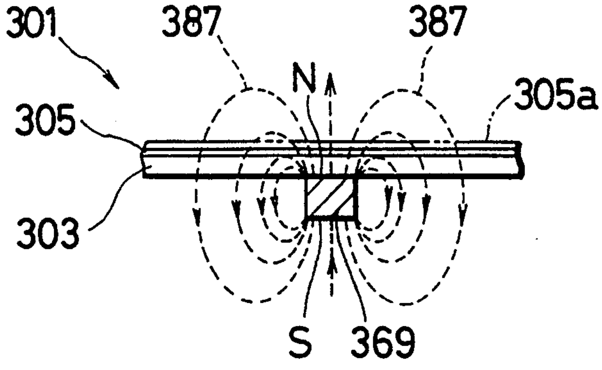
FIG. 41C is a cross sectional view along M—M line indicated in FIG. 41B.

Now, with reference to FIGS. 41A to 41C in contrast to FIGS. 40A to 40C described above, the difference between a case of forming the pattern by using two magnets as shown in FIGS. 40A to 40C and the case of forming the pattern by using only one magnet as shown in FIGS. 41A to 41C is described.

FIGS. 41A to 41C show a case of forming the pattern VII including a contour 383 which has two parts, each having the width W14, as shown in FIG. 41B, by using only the first magnet 369 as shown in FIG. 41C.

FIG. 41A indicates the color in which different parts of the pattern VII along M—M line depicted in FIG. 41B appear, where the middle line corresponds to the gray color of the product body 303 itself, and those portions above the middle line appear as colored in white and convexed in contrast to the surrounding portions, while those portions below the middle line appear as colored in black and concave in contrast to the surrounding portions.

Here, as indicated in FIG. 41A, the contours 383 appear as colored in white and convexed, while a region 385 between two parts of the contour 383 appears as colored in black and concave, and a region outside of the contour 383 appears as colored in gray, similarly to the case of the first contour 375 shown in FIGS. 40A to 40C.

Also, as indicated in FIG. 41C, the lines of magnetic force 387 in a vicinity of the outer sides of the first magnet 369 are oriented from the N pole side to the S pole side of the magnet 369 at the paint layer 305, in contrast to the lines of magnetic field 373*a*, 373*b*, and 373*c* shown in FIG. 40C.

By comparing the cases shown in FIGS. 41A to 41C and FIGS. 40A to 40C, it can be noticed that in the case of FIGS. 40A to 40C there are first and second contours 375 and 377 in contrast to the single contour 383 in the case of FIGS. 41A to 41C. Moreover, the first and second contours 375 and 377 have more sharply defined outer and inner edges compared with outer and inner edges of the contour 383, as can be seen by comparing FIG. 40A and FIG. 41A. In particular, the region 381 between the first and second contours 375 and 377 can appear as colored very dark in black, so that the parts of the first and second contours 375 and 377 located along this region 381 can have very sharply defined edges.

In addition, the outer and inner parts of the first contour 375 and the second contour 377 are formed in three different widths W10, W11, and W12, whereas two parts of the contour 383 are formed in the same width W14. These differences are probably caused by the fact that the magnetic field produced by the second magnet 371 has significant contribution to the formation of the first and second contours 375 and 377 so that the lines of magnetic field 373*a*, 373*b*, and 373*c* are significantly different from the lines of magnetic field 387.

Namely, by placing the second magnet 371 next to the first magnet 369 in the configuration as shown in FIG. 40C, two sets of the lines of magnetic field 373*b* and 373*c* are formed between the first and second magnets 369 and 371, compared with the single set of the lines of magnetic force 387, such that the magnetic flakes in the paint layer 305 above the region between the first and second magnets 369 and 371 are oriented to be substantially parallel to the surface of the paint layer 305 at two locations, with different width at each location, in a case shown in FIGS. 40A to 40C. The exact values for the widths W10 and W11 of the outer and inner parts of the first contours 375 depend on the distance D between the first magnet 369 and the second magnet 371, where the widths W10 and W11 are narrowed as the distance D becomes smaller whereas the widths W10 and W11 are widened as the distance D becomes larger.

Thus, by using two magnets as in a case shown in FIGS. 40A to 40C, it becomes possible to have the desired pattern with the contours with different widths and more sharply defined edges for the contour in the pattern.

It is to be noted that, although the various configurations for the magnets used for forming the desired pattern on the product have been described above wherein the desired pattern is formed by placing the magnets on the back side of the product to be painted, the magnets can be used on the front side. In particular, in a case where it is difficult to place the magnets on the back side of the product to be painted appropriately due to the complicated shape of the back side of the product to be painted, the magnets may be placed on the front side of the product. In such a case, the appropriate size and position of the magnets for forming the desired pattern on the front surface of the product can be determined by regarding a distance between the magnets and the surface of the painted layer provided on the front surface of the product as a thickness of an imaginary product to be painted. Consequently, the positions of the magnets with respect to the paint layer are not restricted by the thickness of the product.

It is also to be noted that, instead of the procedure described above in conjunction with FIG. 33, the various configurations of the magnets for forming the desired pattern on the product described above can equally be achieved by forming the paint layer on the front surface of the product first, and then applying the magnetic field by the magnets while the painted layer maintains its fluidity so that the magnetic flakes contained within the paint layer can change their orientations according to the applied magnetic field.

Referring now to FIGS. 42A to 55B, the actual observation of the cross section of the painted surface of the product painted according to the present invention will be reported in detail.

I. Materials Used

The observation was made by using the following specific materials.

(i) Product to be painted

A flat plate made of ABS (Acrylonitrile-Butadiene-Styrene) resin in a size of 100×150×2.0 mm, which has slightly yellowish ivory color.

(ii) Paint mixture (1) Base coat paint layer (a) Paint medium

Primary agent: "Soflex 5300N" and "Soflex 5000N" which are acrylic urethane resin paints manufactured by Kansai Paint Co. Ltd. (Japan).

Curing agent: "Soflex 5300 Curing Agent" for "Soflex 5300N" and "Soflex 120 Curing Agent" for "Soflex 5000N", both of which are acrylic urethane resin paint curing agents manufactured by Kansai Paint Co. Ltd. (Japan).

Mixing rate (in units of parts by weight): "Soflex 5300N":"Soflex 5300 Curing Agent"=100:15

"Soflex 5000N":"Soflex 120 Curing Agent"=100:10

Solvent: "Retan PG Thinner" which is a xylene thinner manufactured by Kansai Paint Co. Ltd. (Japan), which was used to dilute the mixture of the primary agent and the curing agent until a viscosity of 12.0 to 12.5 sec for the Ford cup #4 was obtained.

(b) Magnetic flakes

"Novamet Fine Water Grade" which is flake shaped Ni fine powder sold by Inco Inc. (Canada), each having a surface with a metallic luster in silver white. These magnetic flakes which originally have the particle sizes equal to 3 to 30 μm were classified to obtain an average particle size equal to 20 μm by selecting 94% by weight of the original particles through No. 325 sieve mesh.

Mixing rate (in units of parts by weight):

Vehicle:Magnetic flakes=100:35

(2) Top coat layer (a) Paint medium

Primary agent: "Soflex 5000 Top Clear" which is a transparent acrylic urethane resin paint manufactured by Kansai Paint Co. Ltd. (Japan).

Curing agent: "Soflex 120 Curing Agent" which is an acrylic urethane resin paint curing agent manufactured by Kansai Paint Co. Ltd. (Japan).

Mixing rate (in units of parts by weight):

Primary agent:Curing agent=100:10

(iii) Magnet

"Magrubber 14 VS" which is a sheet shaped rubber magnet with thickness equal to 2.0 mm manufactured by Nichiray Magnet Co. Ltd. (Japan), which was prepared in a desired shape by the die cutting, and had the residual magnetic flux density equal to 2342G, the magnetic coercive force equal to 2.2 KOe, specific magnetic coercive force equal to 2.7 KOe, and the maximum energy product equal to 1.30 MGOe.

II. Formation of Pattern

The desired doughnut shaped pattern X was formed by using the above described materials, according to the following procedure.

Figure 42A:
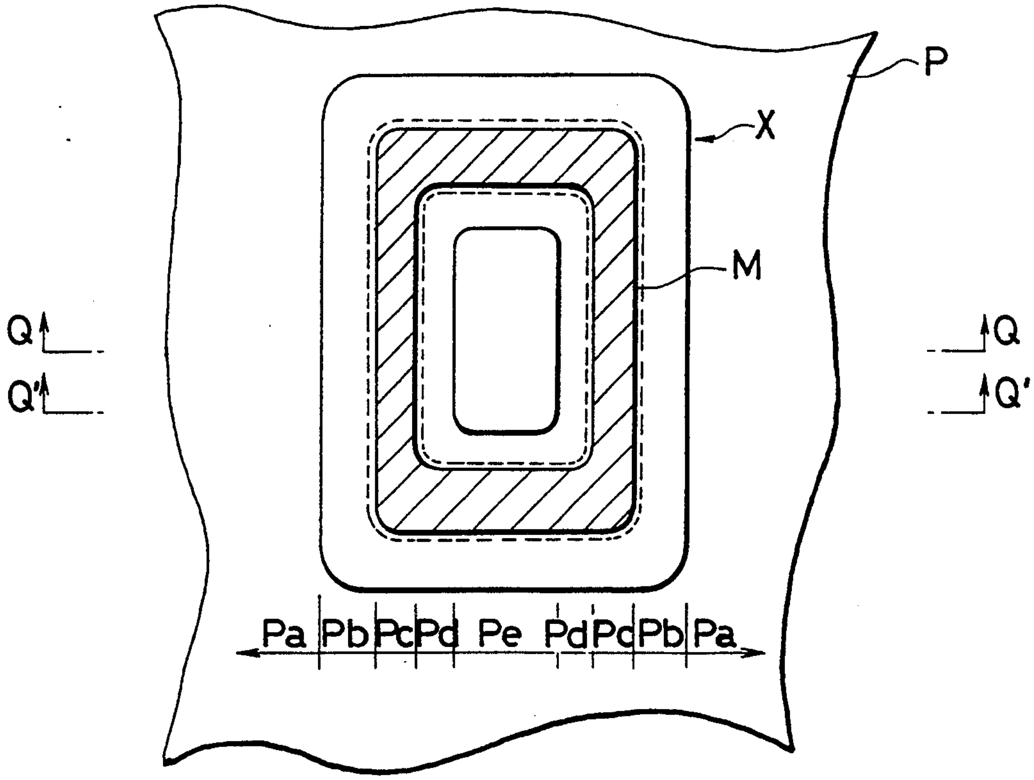
FIG. 42A is a top plan view of a product with the desired pattern formed thereon, whose cross section had been microscopically observed.
Figure 42B:
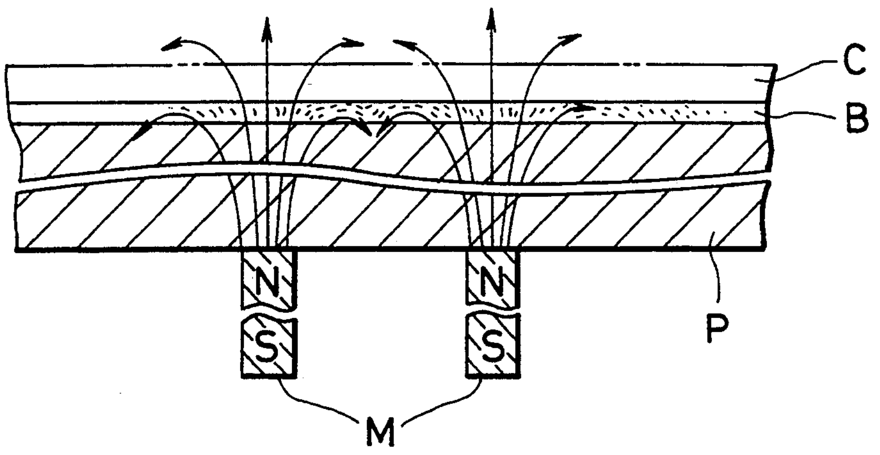
FIG. 42B is a cross sectional view of a product and a magnet during the formation of the desired pattern shown in FIG. 42A.

First, the sheet shaped rubber magnet M was die cut into a doughnut like shape in correspondence to the shape of the desired pattern X, as shown in FIG. 42A, and then attached on the back surface of the product body P by using adhesive tapes, as shown in FIG. 42B.

Then, the paint mixture described above was spray painted uniformly on the front surface of the product body P by using a spray gun, so as to form the base coat paint layer B which has the thickness equal to 20 to 30 μm after the paint mixture is dried.

After waiting for two to three minutes, the magnetic flakes in the base coat paint layer B became immovable, and after further waiting for approximately thirsty minutes, the volatile solvents used in the paint mixture were naturally volatilized. Then, after the magnet M was removed from the back surface of the product P, a drier device was applied to the painted product P, in order to solidify the base coat paint layer B formed on the front surface of the product P.

Then, the top coat paint medium was also spray painted over the solidified base coat paint layer B to form the clear top coat layer C with the thickness approximately equal to 40 μm after the top coat paint medium is dried. In FIGS. 45 to 55, D represents the solidified resin mentioned in section III which follows.

The formation of the pattern on the front surface of the product P was observed as soon as the paint mixture was spray painted. Similar results were obtained by using "Soflex 5300N" and "Soflex 5000N" as the primary agent of the paint mixture.

According to this observation, the convexity/concavity, color, and appearance of the front surface of the product P with the pattern X formed thereon, at different portions Pa, Pb, Pc, Pd, and Pe indicated in FIG. 42A, were as follows.

| Portion | Convexity/ Concavity | Color | Appearance |
|---|---|---|---|
| Pa | Flat | Gray | Background |
| Pb | Convexed | White | Outer contour |
| Pc | Concave | Black | Groove |
| Pd | Convexed | White | Inner contour |
| Pe | Concave | Black | Central hole |

III. Preparation for Microscope Observation

A sample S for the microscope observation of the cross section of the painted surface of the product P was prepared by using the product P painted by the paint mixture having "Soflex 5300N" as the primary agent, as follows.

Figure 43A:
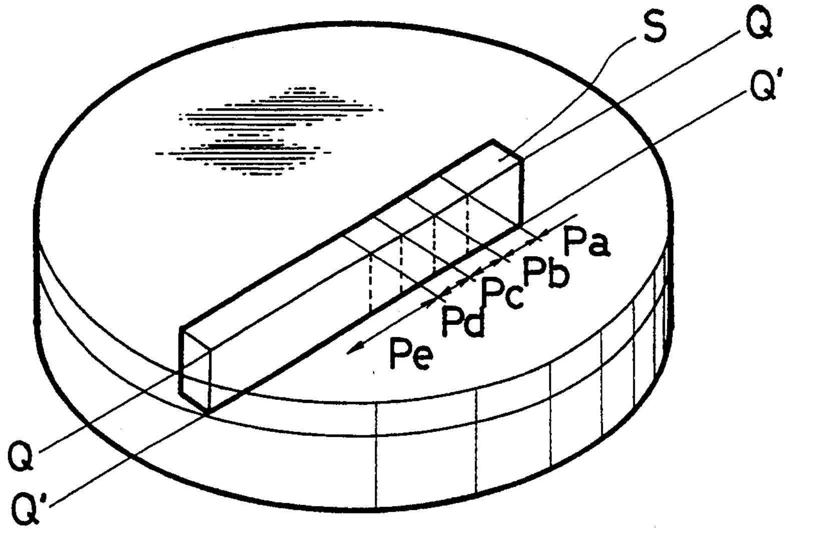
FIG. 43A is a perspective view of a sample for microscope observation prepared from the product shown in FIG. 42A.

The sample S in a rectangular parallel-piped shape as shown in FIG. 43A was obtained by cutting the product P at line Q—Q and line Q'—Q' shown in FIG. 42A. Then, as shown in FIG. 43A, this sample S was placed inside the petri dish with the cross section at line Q—Q facing upwards. Next, the melted resin was poured into the petri dish until the cross section at line Q—Q was immersed into the melted resin, and the resin were solidified. Then, the sample S was taken out of the petri dish together with the solidified resin D, and the cross section at line Q—Q was polished by sandpaper in order to obtain a smooth observation surface.

IV. Microscope Observation and Photomicrograph Images

Figure 43B:
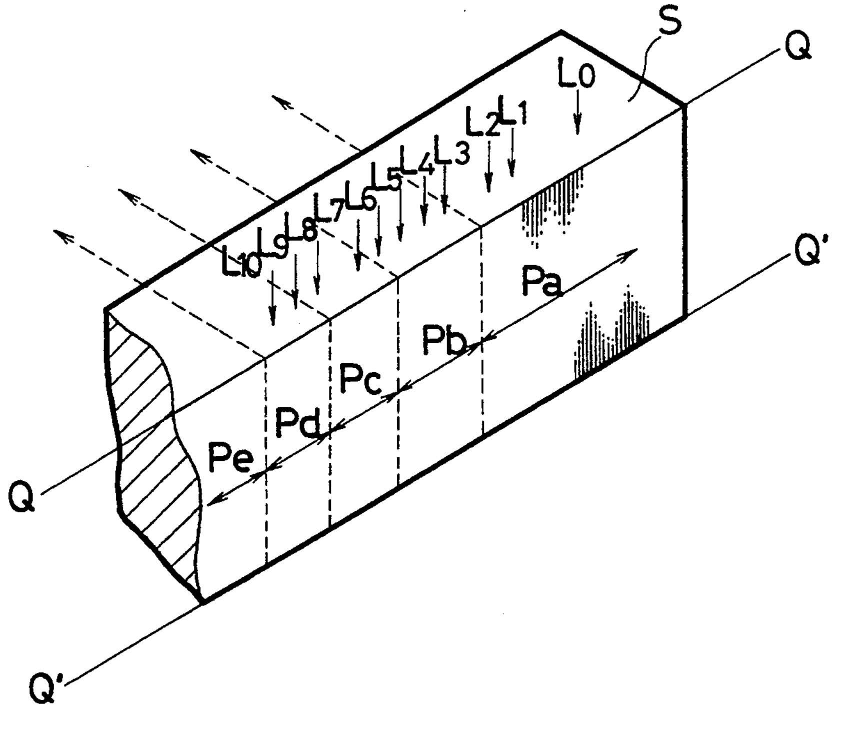
FIG. 43B is an enlarged partial perspective view of the sample shown in FIG. 43A, indicating locations at which the microscope observation of the cross section of the sample shown in FIG. 43A had been made.
Figure 45A:
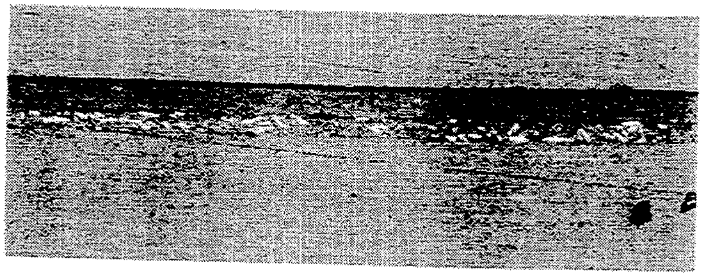
FIG. 45A is a photomicrographic image taken at a location L0 indicated in FIG. 43B.
Figure 45B:
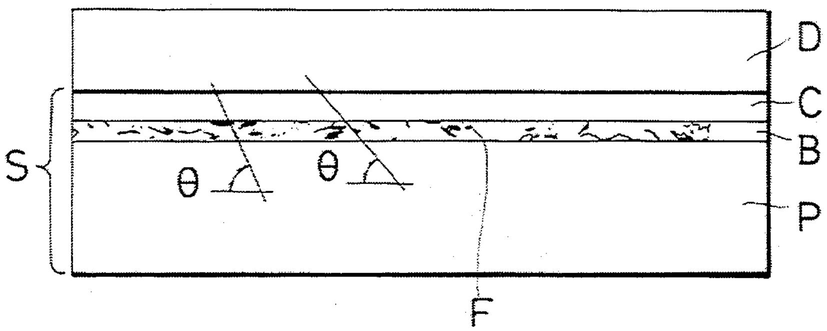
FIG. 45B is a diagram for explaining the photomicrographic image shown in FIG. 45A.
Figure 46A:
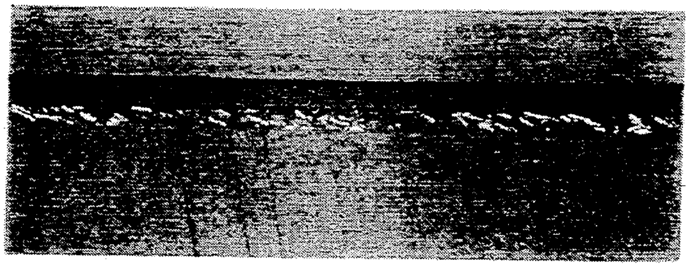
FIG. 46A is a photomicrographic image taken at a location L1 indicated in FIG. 43B.
Figure 46B:
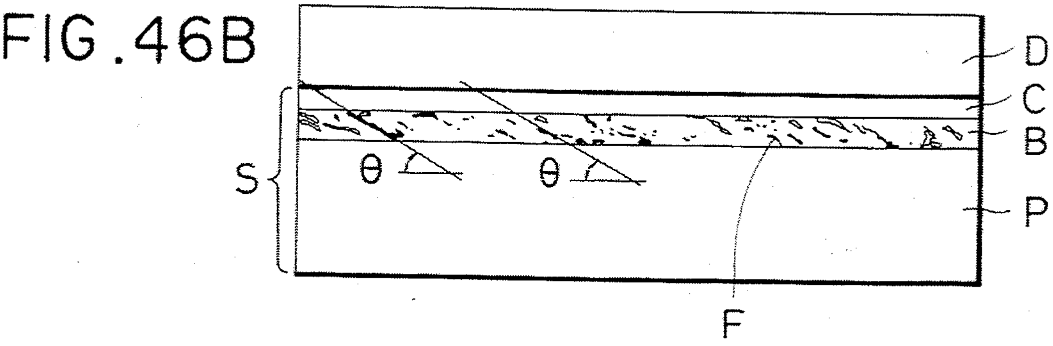
FIG. 46B is a diagram for explaining the photomicrographic image shown in FIG. 46A.
Figure 47A:
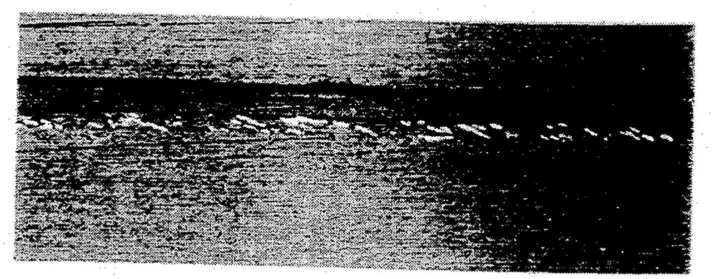
FIG. 47A is a photomicrographic image taken at a location L2 indicated in FIG. 43B.
Figure 47B:
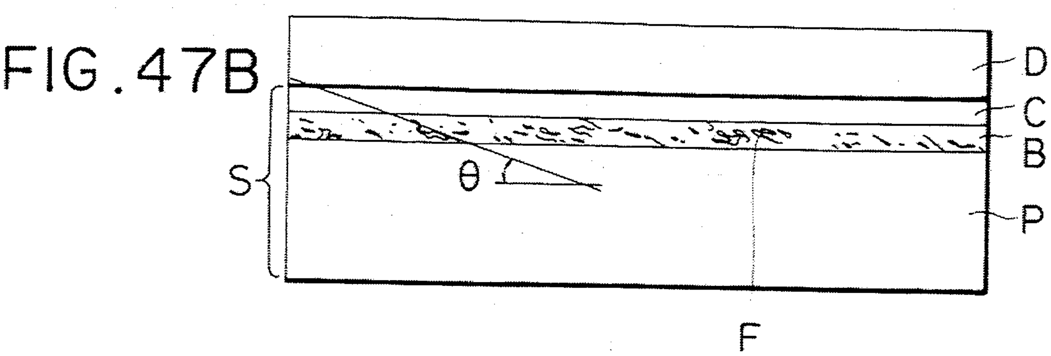
FIG. 47B is a diagram for explaining the photomicrographic image shown in FIG. 47A.
Figure 48A:
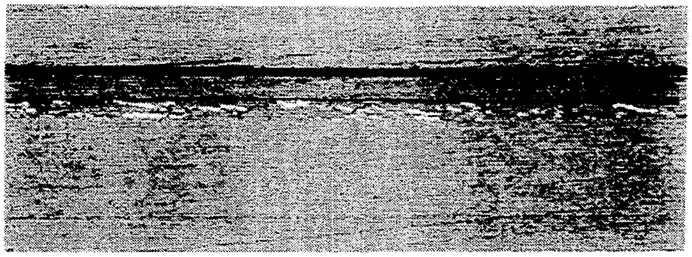
FIG. 48A is a photomicrographic image taken at a location L3 indicated in FIG. 43B.
Figure 48B:
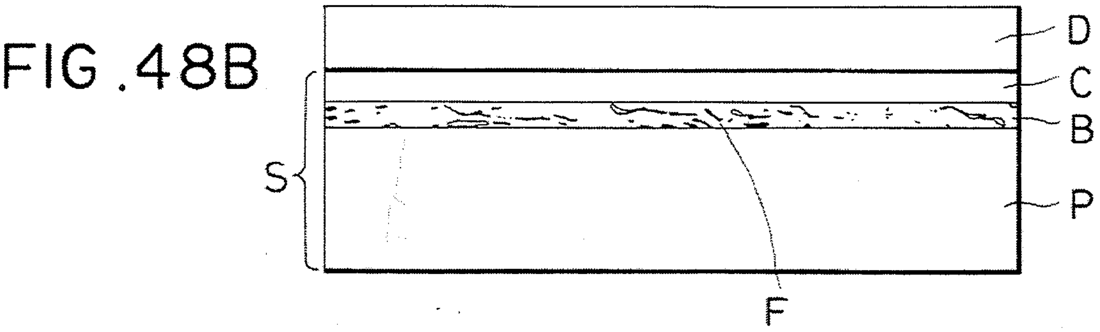
FIG. 48B is a diagram for explaining the photomicrographic image shown in FIG. 48A.
Figure 49A:
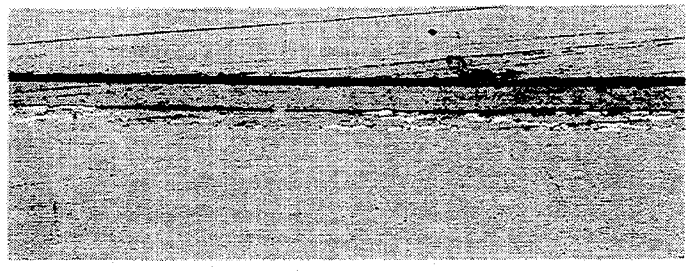
FIG. 49A is a photomicrographic image taken at a location L4 indicated in FIG. 43B.
Figure 49B:
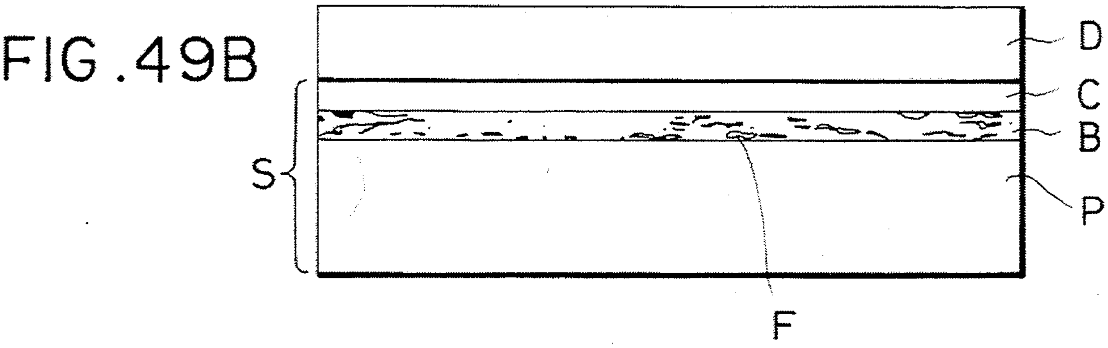
FIG. 49B is a diagram for explaining the photomicrographic image shown in FIG. 49A.
Figure 50A:
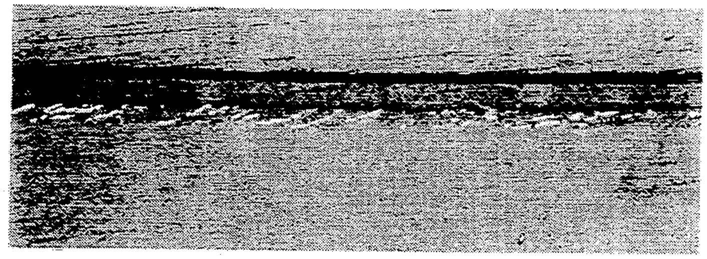
FIG. 50A is a photomicrographic image taken at a location L5 indicated in FIG. 43B.
Figure 50B:
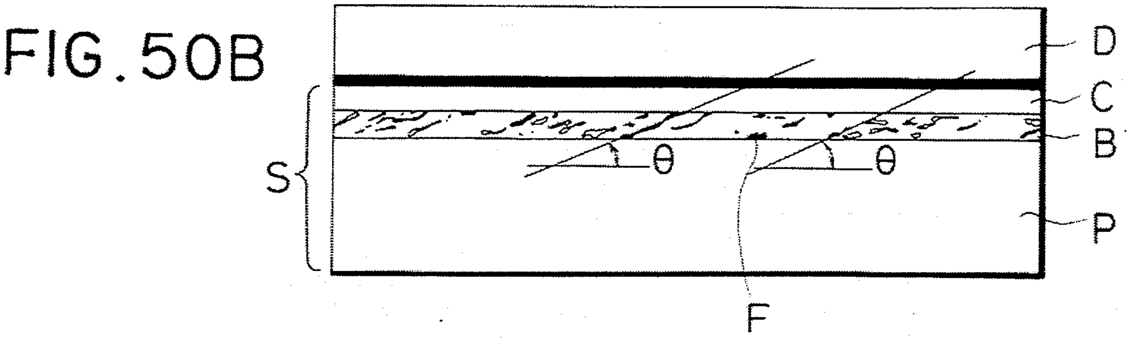
FIG. 50B is a diagram for explaining the photomicrographic image shown in FIG. 50A.
Figure 51A:
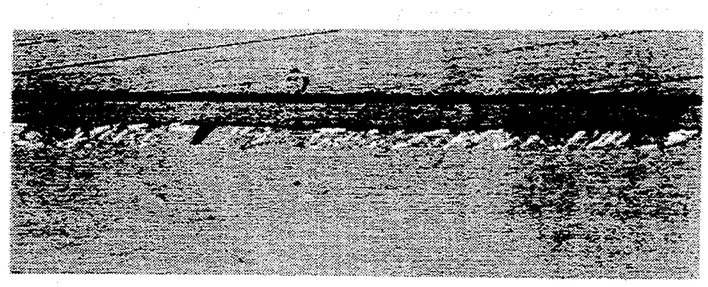
FIG. 51A is a photomicrographic image taken at a location L6 indicated in FIG. 43B.
Figure 51B:
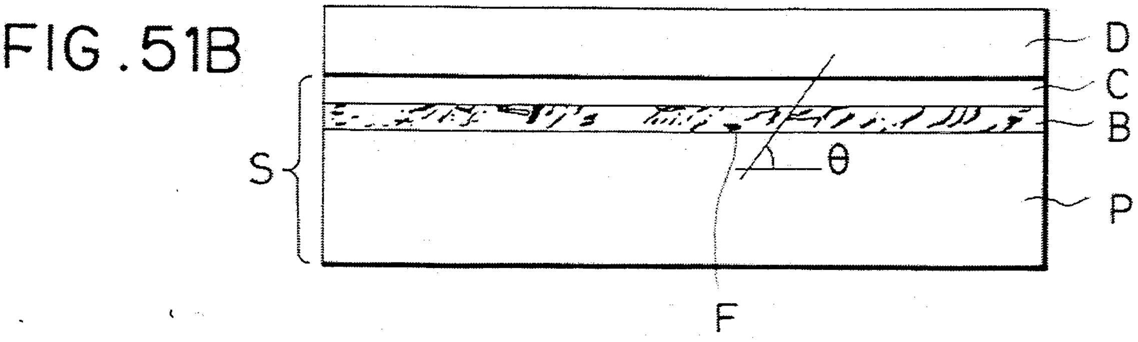
FIG. 51B is a diagram for explaining the photomicrographic image shown in FIG. 51A.
Figure 52A:
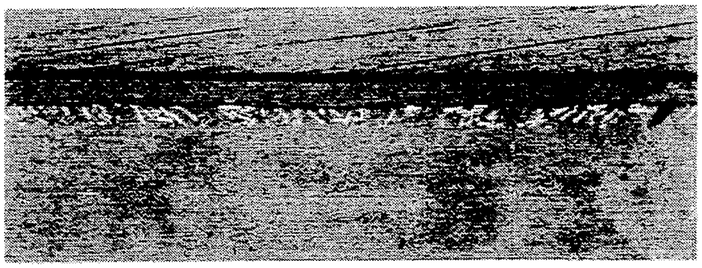
FIG. 52A is a photomicrographic image taken at a location L7 indicated in FIG. 43B.
Figure 52B:
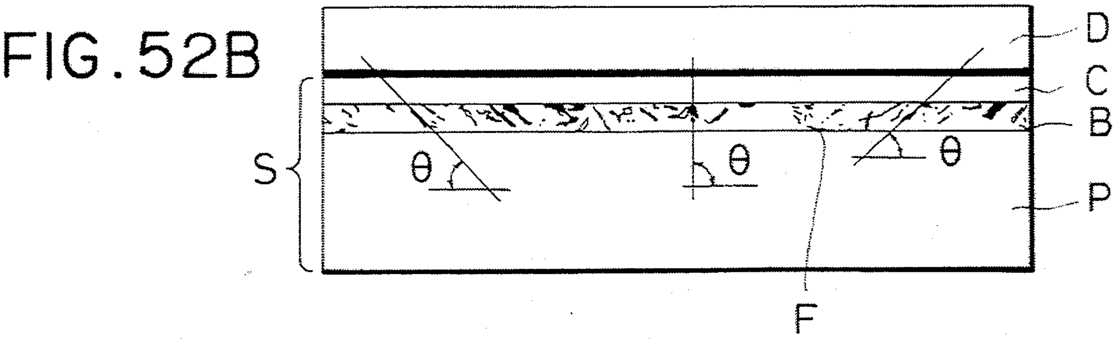
FIG. 52B is a diagram for explaining the photomicrographic image shown in FIG. 52A.
Figure 53A:
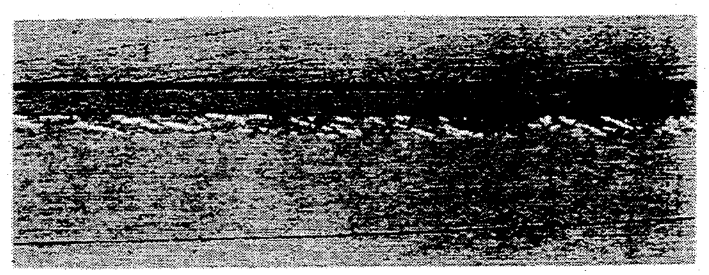
FIG. 53A is a photomicrographic image taken at a location L8 indicated in FIG. 43B.
Figure 53B:
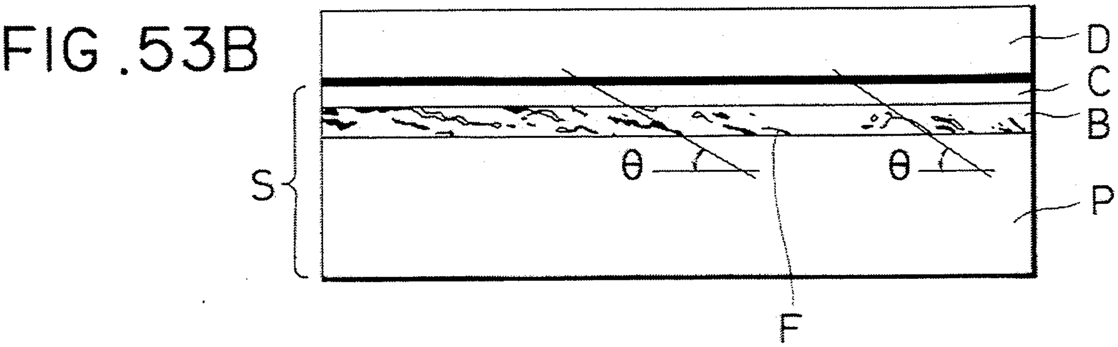
FIG. 53B is a diagram for explaining the photomicrographic image shown in FIG. 53A.
Figure 54A:
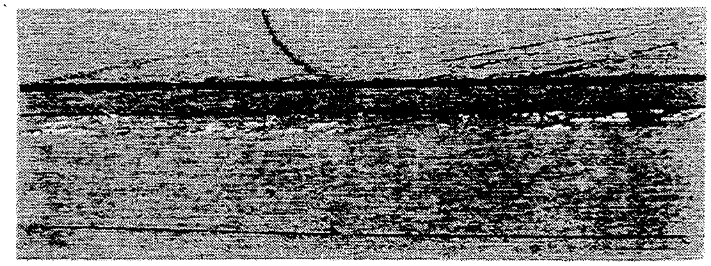
FIG. 54A is a photomicrographic image taken at a location L9 indicated in FIG. 43B.
Figure 54B:
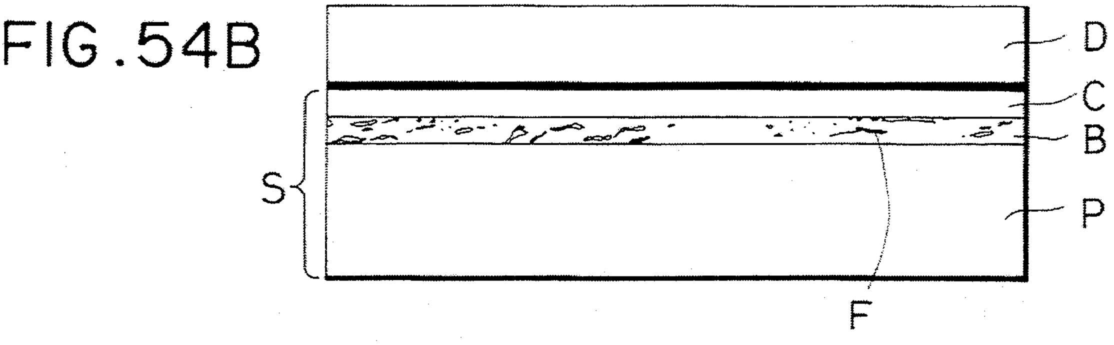
FIG. 54B is a diagram for explaining the photomicrographic image shown in FIG. 54A.
Figure 55A:
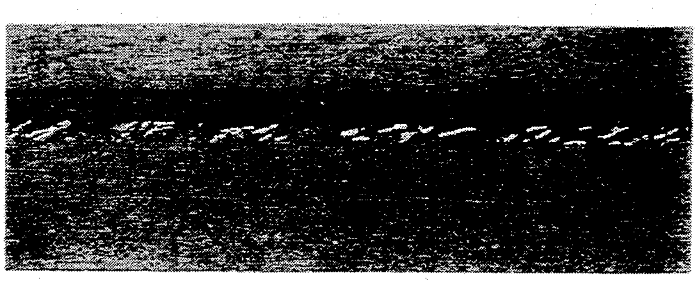
FIG. 55A is a photomicrographic image taken at a location L10 indicated in FIG. 43B.
Figure 55B:
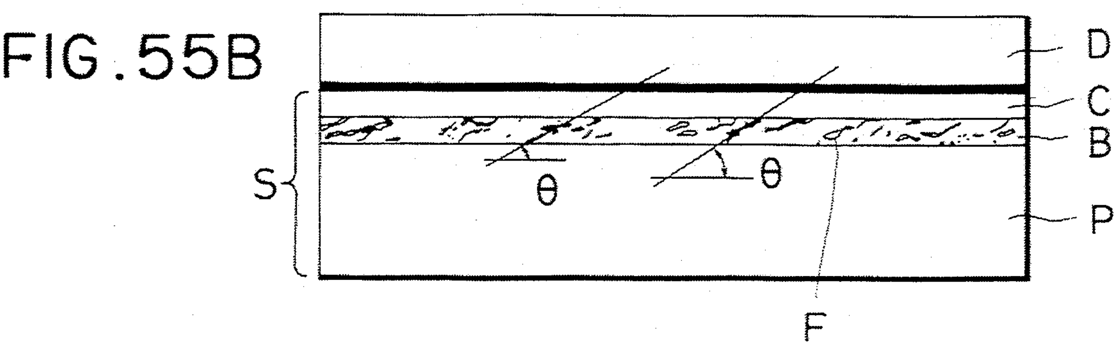
FIG. 55B is a diagram for explaining the photomicrographic image shown in FIG. 55A.

The observation surface of the sample S prepared as described above was observed at eleven different locations L0 to L10 on the observation surface as indicated in FIG. 43B, by using a microscope with the magnification equal to 100 and photomicrograph images were taken at these locations L0 to L10. The result of this microscope observation is summarized in the table shown in FIG. 44, while the photomicrograph images taken at the locations L0 to L10 are shown in FIGS. 45A to 55A, respectively, accompanied by explanatory diagrams shown in FIGS. 45B to 55B, respectively.

In these FIGS. 45B to 55B, even though the orientation angle $\theta$ is indicated with respect to a plane in a middle of the sample S, the orientation angle $\theta$ is actually measured with respect to the surface of the base coat layer B.

It is to be noted that in the description of various embodiments above, the descriptions concerning overall orientations of various features shown in the drawings have been adopted for the sake of definiteness of the description, but they can be modified according to the need.

For instance, the apparatus for forming the paint layer on the surface of the product may be used sideways in which case the paint layer can be formed on the vertically held surface of the product by applying the spray painting in sideways.

It is also to be noted that, even though the multiplicity of tiny magnetic bodies to be mixed in the paint medium are described as the magnetic flakes in the above description of the preferred embodiments, the shape of the magnetic bodies to be mixed in the paint medium is not limited to the flake-like shape, and the present invention is equally valid for any desired non-spherical particle shapes of the magnetic bodies mixed in the paint medium.

Furthermore, although the above examples describe the appearance of color as one of gray, white, or black, the colors of the product can be varied by adding appropriate colorants to the paint layer and/or the overcoat layer. The colors observed can also be affected by the type of magnetic flake used in the paint layer.

It is also to be noted that besides those already mentioned above, many modifications and variations of the above embodiments may be made without departing from the novel and advantageous features of the present invention. Accordingly, all such modifications and variations are intended to be included within the scope of the appended claims.

What is claimed is:

1. A painted product with a desired pattern having a three-dimensional appearance formed thereon, comprising:

a magnetic or non-magnetic product body; and a paint layer formed on a surface of the product body, wherein the paint layer comprises:

a paint medium capable of transmitting light rays incident on the paint layer, and a multiplicity of magnetic non-spherical particles mixed into the paint medium, wherein the magnetic nonspherical particles includes a first group of magnetic nonspherical particles which are predeterminately oriented to be substantially parallel to a surface of the paint layer and arranged in a shape corresponding to the desired pattern to be formed on the painted product, and a second group of magnetic non-spherical particles which are predeterminately oriented to be substantially non-parallel to the surface of the paint layer and arranged with respect to the first group of magnetic non-spherical particles, wherein the amount of said first and second group of particles and the spatial relationship of their predetermined orientations are such that the desired pattern having a three-dimensional appearance is visible on the surface of the product body as the light rays incident on the paint layer are influenced differently by one or more of reflection and absorption by the first and second group of magnetic non-spherical particles.

2. A painted product of claim 1, wherein the second group of magnetic non-spherical particles include particles which are oriented to be substantially perpendicular to the surface of the paint layer.

3. A painted product of claim 1, wherein the second group of magnetic non-spherical particles include particles which are oriented to be substantially oblique to the surface of the paint layer.

4. A painted product of claim 1, wherein the second group of magnetic non-spherical particles include particles which are oriented to be substantially at random with respect to the surface of the paint layer.

5. A painted product of claim 1, wherein the multiplicity of magnetic non-spherical particles comprise particles comprised of one or more of nickel, cobalt, and iron, or alloys including at least one of nickel, cobalt, and iron.

6. A painted product of claim 1, wherein the multiplicity of magnetic non-spherical particles comprise non-spherical particle shaped magnetic bodies covered by a surface coating.

7. A painted product of claim 1, further comprising a top coat layer formed on the paint layer, which is capable of transmitting the incident light rays.

8. A painted product of claim 7, wherein at least one of the paint layer and the top coat layer is colored.

9. A painted product of claim 1, wherein the product body comprises a non-magnetic material.

10. A painted product of claim 9, wherein the product body comprises a plastic material.

11. A painted product of claim 1, wherein the product body is formed in a shape of a substantially disk shaped automobile wheel cover.

12. A painted product of claim 11, wherein the desired pattern to be formed includes a plurality of identical figures arranged on an identical circle at constant interval.

13. A painted product of claim 12, wherein each of the plurality of identical figures has a hexagonal contour.

14. A painted product of claim 1, wherein the desired pattern formed on the surface of the product body is arranged to be symmetrical with respect to a central point of an arrangement of the desired pattern.

15. A painted product of claim 1, which is formed by a process comprising the steps of:

a) forming the paint layer in a liquid state on a surface of the product, the paint layer including:
   - a paint medium capable of transmitting light rays incident on the paint layer; and
   - a multiplicity of magnetic non-spherical particles mixed into the paint medium;

b) applying a magnetic field to the product, the magnetic field having a first region containing lines of magnetic force which are oriented to be substantially parallel to a surface of the painted product and arranged in a shape corresponding to the desired pattern to be formed on the painted product, and second region containing lines of magnetic field which are oriented to be substantially non-parallel to the surface of the painted product and arranged with respect to the first region; and c) solidifying the paint layer in a state in which the first group of magnetic non-spherical particles located in the first region at the applying step are oriented to be substantially parallel to a surface of the paint layer and arranged in a shape corresponding to the desired pattern to be formed on the painted product, while a second group of magnetic non-spherical particles located in the second region at the applying step are oriented to be substantially non-parallel to the surface of the paint layer and arranged around the first group of magnetic non-spherical particles, such that the desired pattern is visible on the surface of the painted product as the light rays incident on the paint layer are influenced differently by one or both of absorption and reflection by the first and second group of magnetic non-spherical particles.

16. A painted product of claim 15, wherein at the solidifying step, the second group of magnetic non-spherical particles include particles which are oriented to be substantially perpendicular to the surface of the paint layer.

17. A painted product of claim 15, wherein at the solidifying step, the second group of magnetic non-spherical particles include particles which are oriented to be substantially oblique to the surface of the paint layer.

18. A painted product of claim 15, wherein at the solidifying step, the second group of magnetic non-spherical particles include particles which are oriented to be substantially at random with respect to the surface of the paint layer.

19. A painted product of claim 15, which is product by a process further comprising the step of forming a top coat paint layer capable of transmitting the light rays on the surface of the paint layer solidified at the solidifying step.

20. A painted product of claim 15, wherein the forming step takes place while the magnetic field is applied by the applying step.

21. A painted product of claim 15, wherein the applying step takes place after the paint layer is formed on the surface of the product by the forming step.

22. A painted product of claim 15, wherein at the applying step, the magnetic field is applied by placing a magnetic field production means, having a shape corresponding to the desired pattern to be formed, for producing the magnetic field in a vicinity of the surface of the painted product.

23. A painted product of claim 22, wherein said magnetic field production means includes:
- a primary magnet member for producing a primary magnetic field approximating the magnetic field in a configuration corresponding to the desired pattern to be formed; and
- a magnetic field adjustment member for adjusting the primary magnetic field produced by the primary magnet member, so as to produce the magnetic field in the desired configuration.

24. A painted product of claim 23, wherein the magnetic field adjustment member is a magnet having poles oriented in opposite directions to directions of poles of the primary magnet member.

25. A painted product of claim 23, wherein the magnetic field adjustment member is a magnet having poles oriented in identical directions as directions of poles of the primary magnet member.

26. A painted product of claim 23, wherein the magnetic field adjustment member is a magnet having poles oriented in directions crossing with directions of poles of the primary magnet member.

27. A painted product of claim 23, wherein the magnetic field adjustment member is a magnetic field deforming member made from magnetic material.

28. A painted product of claim 22, wherein the magnetic field production means has a contour size smaller than a contour size of the desired pattern to be formed.

29. A painted product of claim 15, wherein at the applying step, the first region of the magnetic field is arranged along a contour of the desired pattern to be formed.

30. A painted product of claim 15, wherein at the applying step, the first region of the magnetic field forms a line along the contour of the desired pattern to be formed.

31. A painted product of claim 1, wherein the product body comprises a ferromagnetic material.

32. A painted product of claim 1, wherein the paint layer is colored.

33. A painted product of claim 7, wherein the top coat layer is colored.

34. A painted product of claim 31, wherein the ferromagnetic material is iron or an alloy containing iron.

35. A painted product of claim 31, wherein the multiplicity of magnetic non-spherical particles comprise particles having a flake-like thin plate shape.

36. A painted product of claim 1, wherein the multiplicity of magnetic non-spherical particles comprise particles made of one or more of bismuth, antimony, copper, and zinc.

37. A painted product of claim 6, wherein the surface coating comprises gold or silver.

38. A painted product of claim 1, wherein the multiplicity of magnetic non-spherical particles comprise non-magnetic particles which have been coated with a magnetic coating.

39. A painted product of claim 1, wherein the multiplicity of magnetic non-spherical particles comprises particles having a thickness of about 0.1 to about 1.0 micrometers and a length of about 10 to about 100 micrometers.

40. A painted product of claim 1, wherein the multiplicity of magnetic non-spherical particles comprise particles which have been colored.

41. A painted product of claim 1, wherein the paint medium comprises a resin.

42. A painted product of claim 41, wherein the paint medium comprises a resin selected from the group consisting of alkyd resins, polyester resins, acrylic resins, polyurethane resins, and vinyl resins.

43. A painted product of claim 1, wherein the paint layer comprises about 1 to about 60 parts by weight of said magnetic non-spherical particles per 100 parts by weight of said paint medium.

44. A painted product of claim 1, wherein the paint layer comprises about 30 to about 40 parts by weight of said magnetic non-spherical particles per 100 parts by weight of said paint medium.

45. A painted product of claim 1, wherein there is a reflective layer between the surface of the product body and the lower surface of the paint body.

46. A painted product of claim 1, wherein the paint layer comprises about 30 to about 60 parts by weight of said magnetic non-spherical particles per 100 parts by weight of said paint medium.

47. A painted product of claim 1, wherein the desired pattern appears to have both concaved and convexed portions.

48. A painted product of claim 7, wherein the top coat layer does not contain magnetic particles.

49. A painted product of claim 1, wherein the paint layer comprises more than one sublayer formed by painting more than one paint layer on the product body.

50. A painted product of claim 1, wherein the multiplicity of magnetic non-spherical particles includes a group which are oriented to be substantially perpendicular to the surface of the paint layer, a group which are oriented to be substantially oblique to the surface of the paint layer, and a group which are oriented to be substantially random with respect to the surface of the paint layer.

51. A painted product of claim 1, wherein the multiplicity of magnetic particles comprises a group of substantially parallel particles located between two groups of substantially oblique particles.

52. A painted product of claim 1, wherein the multiplicity of magnetic particles comprises a group of substantially perpendicular particles located between two groups of substantially oblique particles.

53. A painted product of claim 1, wherein the paint layer comprises about 35 to about 60 parts by weight of said magnetic non-spherical particles per 100 parts by weight of said paint medium.

54. A painted product of claim 1, wherein the multiplicity of magnetic particles comprises a group of substantially parallel particles located between and adjacent to two groups of substantially oblique particles.

55. A painted product of claim 1, wherein the multiplicity of magnetic particles comprises a first group of substantially oblique particles adjacent to a first group of substantially parallel particles, which is adjacent to a second group of substantially oblique particles, which is adjacent to a first group of substantially perpendicular particles.

56. A painted product of claim 55, wherein the multiplicity of magnetic particles further comprises adjacent to the first group of substantially perpendicular particles a third group of substantially oblique particles, which is adjacent to a second group of substantially parallel particles, which is adjacent to a fourth group of substantially oblique particles.

57. A painted product of claim 56, wherein the multiplicity of magnetic particles comprises at least two sets of the recited adjacent groups of particles.

58. A painted product of claim 56, wherein the multiplicity of magnetic particles comprises at least three sets of the recited adjacent groups of particles.

* * * * *

UNITED STATES PATENT AND TRADEMARK OFFICE

CERTIFICATE OF CORRECTION

PATENT NO. : 5,364,689

DATED : November 15, 1994

INVENTOR(S) : Takeshi KASHIWAGI et al.

It is certified that error appears in the above-indentified patent and that said Letters Patent is hereby corrected as shown below:

On the Title Page, item [75], delete "Mitsuaki Narita"; and change "Tutsuya" to --Tatsuya--.

Signed and Sealed this

Twenty-eight Day of February, 1995

*Attest:*

BRUCE LEHMAN

*Attesting Officer* *Commissioner of Patents and Trademarks*